US009712367B2

(12) United States Patent
Dutronc et al.

(10) Patent No.: US 9,712,367 B2
(45) Date of Patent: Jul. 18, 2017

(54) RADIO COMMUNICATIONS SYSTEM AND METHOD WITH INCREASED TRANSMISSION CAPACITY BASED ON FREQUENCY TWISTED WAVES

(71) Applicant: EUTELSAT S A, Paris (FR)

(72) Inventors: Jacques Dutronc, Paris (FR); Antonio Saitto, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 15/317,577

(22) PCT Filed: Jun. 10, 2015

(86) PCT No.: PCT/IB2015/001480
§ 371 (c)(1),
(2) Date: Dec. 9, 2016

(87) PCT Pub. No.: WO2015/189704
PCT Pub. Date: Dec. 17, 2015

(65) Prior Publication Data
US 2017/0126460 A1    May 4, 2017

(30) Foreign Application Priority Data

Jun. 10, 2014  (WO) .................. PCT/IB2014/002103

(51) Int. Cl.
*H04L 27/26*    (2006.01)
*H04L 5/00*    (2006.01)

(52) U.S. Cl.
CPC ........ *H04L 27/2659* (2013.01); *H04L 5/0048* (2013.01); *H04L 27/266* (2013.01);
(Continued)

(58) Field of Classification Search
CPC .............. H04L 27/2659; H04L 5/0048; H04L 27/2634; H04L 27/266; H04L 27/2671;
(Continued)

(56) References Cited

U.S. PATENT DOCUMENTS

2012/0207470 A1*  8/2012  Djordjevic ............. H04B 10/25
                                                    398/44
2013/0177009 A1*  7/2013  Ashrafi .................... H04L 5/04
                                                    370/343
(Continued)

FOREIGN PATENT DOCUMENTS

GB        2 410 130 A    7/2005
WO    WO 2012/084039 A1    6/2012
(Continued)

OTHER PUBLICATIONS

International Search Report as issued in International Patent Application No. PCT/IB2015/001480, dated Dec. 9, 2015.
(Continued)

*Primary Examiner* — Freshteh N Aghdam
(74) *Attorney, Agent, or Firm* — Pillsbury Winthrop Shaw Pittman LLP

(57) ABSTRACT

A method of implementing Orbital Angular Momentum (OAM) for radio communications in general and LTE in particular. Common prior art so far recreate the vorticity (axial rotation of the Poynting vector) by using ring-shaped antenna arrays. This application proposes to create the vorticity in signal processing without the need of any space diversity (i.e. work with a single antenna). An Hilbert transform is applied in frequency domain to the Fourier transform of the analytical representation of a band-limited OFDM signal. The Hilbert transform is then approximated by a development in series into orthogonal twisted modes. This can be seen as an inverse Fourier transform of the complex analytical signal. Therefore an OAM IFFT based
(Continued)

transmitter is proposed where parallel IFFTs are performed for each OAM mode and superimposed.

25 Claims, 25 Drawing Sheets

(52) U.S. Cl.
CPC ...... *H04L 27/2634* (2013.01); *H04L 27/2666* (2013.01); *H04L 27/2671* (2013.01); *H04L 27/2672* (2013.01); *H04L 27/2678* (2013.01); *H04L 27/2697* (2013.01)

(58) Field of Classification Search
CPC ............. H04L 27/2666; H04L 27/2672; H04L 27/2678; H04L 27/2697
See application file for complete search history.

(56) References Cited

U.S. PATENT DOCUMENTS

| | | | | |
|---|---|---|---|---|
| 2013/0235885 | A1* | 9/2013 | Chen | H04L 5/0044 370/468 |
| 2014/0355624 | A1* | 12/2014 | Li | H04L 27/00 370/468 |
| 2015/0104139 | A1* | 4/2015 | Brunet | G02B 6/03611 385/124 |
| 2015/0349910 | A1* | 12/2015 | Huang | H04J 14/00 398/44 |
| 2016/0277173 | A1* | 9/2016 | Dutronc | H04W 72/0446 |

FOREIGN PATENT DOCUMENTS

| | | |
|---|---|---|
| WO | WO 2014/016655 A1 | 1/2014 |
| WO | WO 2015/067987 A1 | 5/2015 |

OTHER PUBLICATIONS

Tamburini, F., et al., "Encoding many channels in the same frequency through radio vorticity: first experimental test," Radio vorticity channels: transmission tests, arXiv.org, Jul. 12, 2011, 17 pages.

Mohammadi, S. M., et al., "Orbital Angular Momentum in Radio—A System Study," IEEE Transactions on Antennas and Propagation, vol. 58, No. 2, Feb. 1, 2010, pp. 565-572.

Kishi, M., "The Application of a Short-Time DFT to a Hilbert Transformer*," Electronics and Communications in Japan, Part I—Communications, vol. 75, No. 5, May 1, 1992, XP000311464, ISSN: 8756-6621, pp. 13-22.

Johansson, M., "The Hilbert transform," Jan. 1, 1999, Retrieved from the Internet: URL: http://www.fuchs-braun.com/media/d9140c7b3d5004fbffff8007ffffff0.pdf [retrieved on Nov. 30, 2015], pp. 1-33.

* cited by examiner

Mode 0 with reference frequency pulse positioned at the middle frequency $f_0=10/T$ (T being the length of the time window)

Mode 1 with reference frequency pulses positioned at frequencies $f_9=9/T$ and $f_{11}=11/T$ (T being the length of the time window)

Mode 2 with reference frequency pulses positioned at frequencies $f_8=8/T$ and $f_{12}=12/T$ (T being the length of the time window)

Approximation of the frequency Hilbert Transform impulse response using 3 modes

RADIO COMMUNICATIONS SYSTEM AND METHOD WITH INCREASED TRANSMISSION CAPACITY BASED ON FREQUENCY TWISTED WAVES

CROSS-REFERENCE TO RELATED APPLICATIONS

This is the U.S. National Stage of PCT/IB2015/001480, filed Jun. 10, 2015, which in turn claims priority to International Application No. PCT/IB2014/002103, filed Jun. 10, 2014, the entire contents of all applications are incorporated herein by reference in their entireties.

TECHNICAL FIELD OF THE INVENTION

The present invention relates, in general, to a radio communications system and method, namely a system and a method for implementing communications at Radio Frequency (RF) (including frequencies from a few KHz to hundreds of GHz) with increased transmission capacity.

In particular, the present invention concerns a radio communications system and method exploiting twisted signals in frequency domain for increasing transmission capacity.

The present invention can be advantageously exploited, in general, in all kinds of radio communications, such as satellite communications and terrestrial wireless communications, and, in particular, in radio communications based:
in general, on Orthogonal Frequency-Division Multiplexing (OFDM) and/or Orthogonal Frequency-Division Multiple Access (OFDMA); and,
specifically, on Long Term Evolution (LTE) standard and/or Worldwide Interoperability for Microwave Access (WiMAX) standard.

It is worth noting that, in the present application, the expressions "twisted modes/signals/waves" are used to denote orbital angular momentum modes with topological charge different than zero, and the expressions "main/conventional/traditional/plane mode/signal/wave" are used to denote the orbital angular momentum mode with topological charge equal to zero.

BACKGROUND ART

In consideration of Orbital Angular Momentum (OAM) potentialities of increasing transmission capacity and since RF spectrum shortage problem is deeply felt in radio communications sector, recently a lot of experimental studies have been carried out on the use of OAM states, or modes, at RF (also known as radio vortices) in order to try to enhance RF spectrum reuse.

In this connection, reference may, for example, be made to:
Mohammadi S. M. et al., "*Orbital Angular Momentum in Radio—A System Study*", IEEE TRANSACTIONS ON ANTENNAS AND PROPAGATION, IEEE SERVICE CENTER, PISCATAWAY, N.J., US, vol. 58, no. 2, 1 Feb. 2010, pages 565-572, which shows that standard antennas arranged in circular arrays can be used to generate RF beams carrying OAM;
Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques);
GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array; and
WO 2012/084039 A1, which discloses a transmit antenna arrangement comprising N antenna elements arranged along a circumference with an angular separation of α degrees between neighboring antenna elements, the antenna arrangement comprising an OAM encoder arranged to receive N input signals for transmission, indexed from M=−(N−1)/2 up to M=(N−1)/2 for odd N and from M=−(N−2)/2 up to N/2 for even N; the OAM encoder connecting each input signal to each antenna element and giving each input signal M at each antenna element a phase shift of M*α relative to the phase of the same input signal M at an adjacent antenna element; wherein two or more antenna elements are directional, have their directivity in the same direction, and have an antenna aperture higher than, or equal to, 5λ, where λ is the wavelength of the N input signals.

From a mathematical perspective, the transmission of an OAM mode (or state) at a single RF (i.e., by using a pure tone) implies that the electrical field on the radiating aperture can be represented as:

$$F=(\rho,\phi)=F(\rho)e^{jk\phi},$$

where $\rho$ and $\phi$ are the cylindrical coordinates on the radiating aperture, j is the imaginary unit, and k is a positive or negative integer.

The radiated field can be represented in the far zone as:

$$E(\vartheta, \varphi) = \frac{1}{R} \int\int_S F(\rho, \phi) e^{-j2\pi \frac{\rho}{\lambda}\sin(\vartheta)\cos(\varphi-\phi)} \rho\, d\rho\, d\phi,$$

where ν and φ are the spherical coordinates in the far field, R denotes the radius of the sphere centered on the radiating aperture, S denotes the integration surface used at reception side, and λ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0)=0.$$

In order for said phase singularity to be compensated, the integration surface S used at reception side should be sized so as to include the crown peak generated by the OAM mode.

In particular, the integration surface S used at reception side should be different for each OAM mode and, considering the sampling theorem applied to the radiating antenna, should have an area given by:

$$\Delta S = \Delta\Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna.

This solution is impractical for satellite communications, where the aperture efficiency and the size of the antennas are very critical issues. For example, in geostationary-satellite-based communications in Ka band, for a ground antenna having a diameter D of about 9 m, the diameter of the receiving ring on board the geostationary satellite should be of the order of 50 Km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis (as, for example, disclosed in the aforesaid papers "*Orbital Angular Momentum in Radio—A System Study*" and "*Encoding many channels in the same frequency through radio Vorticity: first experimental test*", in GB 2 410 130 A and in WO 2012/084039 A1). These constraints result in OAM-based radio communication systems which are inefficient and unusable for very long distances, such as the ones involved in satellite communications.

Moreover, further criticalities in the use of radio vorticity for satellite communications are represented by the need of an extremely accurate mutual pointing of the transmitting and receiving antennas, and by the unfeasibility of the geometry for Earth-satellite configurations due to the criticality of the positioning of the receiving antennas (or the receiving antenna elements).

A solution to the aforesaid technical problems is provided in the International Application No. PCT/IB2012/056804 (whose content is herewith enclosed by reference) filed on 28 Nov. 2012 in the name of EUTELSAT S. A., published on 30 Jan. 2014 with publication number WO 2014/016655 A1, and concerning a multidimensional space modulation technique for transmitting and/or receiving radio vortices at frequencies ranging from a few KHz to hundreds of GHz. Specifically, the multidimensional space modulation technique according to WO 2014/016655 A1 allows to transmit and/or receive orthogonal RF OAM modes in one and the same direction (i.e., the bore-sight direction) and to overcome, at the same time, the aforesaid technical problems caused by OAM phase singularity at the bore-sight direction, thereby allowing the use of radio vortices also for long-distance radio communications, such as satellite communications.

In particular, the multidimensional space modulation according to WO 2014/016655 A1 is actually a phase modulation applied to signals to be transmitted at RF such that to result in orthogonal radio vortices along the bore-sight direction. Therefore, the modulation according to WO 2014/016655 A1 is called multidimensional space modulation because it allows orthogonal RF OAM modes to be transmitted and/or received in one and the same direction, namely the bore-sight direction, wherein each OAM mode represents a specific space channel along the bore-sight direction, which specific space channel is orthogonal to all the other space channels represented by the other OAM modes.

In order for the multidimensional space modulation according to WO 2014/016655 A1 to be better understood, attention is drawn, by way of example, to the fact that, as is known, a twisted RF signal having, or carrying, the OAM mode m=+1 (where m, as is known, is called topological charge) is characterized by only one clockwise rotation of 360° of the Poynting vector around the propagation axis per period T and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, WO 2014/016655 A1 proves that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T=T/4. This possibility increases the efficiency of the transmitting and receiving configuration, which can work regardless of the elementary antenna element spacing in an antenna array.

From a conceptual perspective, according to WO 2014/016655 A1, in order to manage OAM rotation, namely in order to control the speed of rotation of an RF OAM mode about the bore-sight direction, a supplementary phase modulation is introduced, which leaves only a residue of the OAM twist and keeps the OAM signature in a limited bandwidth. This residual rotation achieved by means of the supplementary phase modulation allows a signal having a proper bandwidth to be orthogonal to another signal having a different rotation (multiple of the minimum one). Therefore, an RF twisted wave can be transmitted by means of a modulated waveform and can be received by an antenna operating in the complex conjugate mode. The received signal is equal to the transmitted one, apart from standard attenuation and transmission and reception gains in a time period $T_{mod}$. The bandwidth increase does not prevent the transmission of plane waves (i.e., the OAM mode m=0), but limits the number of OAM modes at different central frequencies in the available bandwidth. The multidimensional space modulation according to WO 2014/016655 A1 allows to use a standard antenna in place of a phased array antenna, since the used signals are native orthogonal.

It is important to underline the fact that the generation of RF OAM modes by means of the multidimensional space modulation according to WO 2014/016655 A1 allows to drastically simplify the antenna design. In fact, the antenna does not need to take memory at the period of the carrier frequency of the phase between elements $f_0=1/T_0$. This duty is performed by the sampling frequency of the twisted waves, which is higher than the signal bandwidth; therefore the phase shift assigned to the sampling is already orthogonal in time; it follows that the antenna can be a standard one without the need of using a phased array configuration on either the antenna aperture, or, in case of a reflector antenna, the focal plane. Therefore, the multidimensional space modulation according to WO 2014/016655 A1 can be exploited in satellite communications by using already existing satellite and ground antennas.

In order for the multidimensional space modulation according to WO 2014/016655 A1 to be better understood, reference is made to FIG. 1, which shows a functional block diagram of a transmitting system (denoted as whole by 1), which is disclosed in WO 2014/016655 A1 and which exploits the aforesaid multidimensional space modulation for transmitting radio vortices at frequencies ranging from a few KHz to hundreds of GHz.

In particular, the transmitting system 1 comprises:

- a signal generation section 10 designed to generate
  - a first digital signal $s_0(t)$ carrying an information stream, having a given sampling period $T_0$ and occupying a given frequency bandwidth W centered on a predefined frequency $f_0$, and
  - up to 2N second digital signals $s_m(t)$, with $-N \le m \le +N$ and $N \ge 1$ (for the sake of illustration simplicity in FIG. 1 only signals $s_{+1}(t)$, $s_{-1}(t)$, $s_{+N}(t)$ and $s_{-N}(t)$ are shown), each carrying a respective information stream, having a respective sampling period $T_m = 4|m|T_0$ (or $T_m = 3|m|T_0$) and occupying a respective frequency bandwidth $W/4|m|$ (or $W/3|m|$) centered on said predefined frequency $f_0$ (which can, conveniently, be an Intermediate Frequency (IF) thereby resulting that the first and second digital signals are IF digital signals);
- a device 100 for generating OAM modes, which is coupled with said signal generation section 10 to receive the first and second digital signals generated by the latter, and which is designed to
  - apply, to each second digital signal $s_m(t)$ received from the signal generation section 10, a respective space modulation associated with a respective OAM mode m so as to generate a corresponding modulated digital signal carrying said respective OAM mode m, having the given sampling period $T_0$, and occupying the given frequency bandwidth W, and
  - provide an output digital signal $s_{out}(t)$ based on the modulated digital signals and on the first digital signal $s_0(t)$ received from the signal generation section 10; and
- an RF transmission section 1000, which is coupled with the device 100 to receive therefrom the output digital signal $s_{out}(t)$, and which is designed to transmit at predefined radio frequencies the output digital signal $s_{out}(t)$ by means of a single antenna (which is not shown in FIG. 1 for the sake of illustration simplicity and which can be also a reflector antenna with a single feed) or an antenna array (which is not shown in FIG. 1 for the sake of illustration simplicity and which can be also a multi-feed reflector antenna), thereby transmitting an overall RF signal carrying
  - said first digital signal $s_0(t)$ by means of a plane wave, and
  - said second digital signals $s_m(t)$, each by means of a corresponding radio vortex having the respective OAM mode m.

The aforesaid predefined radio frequencies can conveniently range from a few KHz to hundreds of GHz depending on the specific application for which the overall transmitting system 1 is designed.

Conveniently, the signal generation section 10 can be a signal generation section of a transmitting system for satellite communications (such as a transmitting system of a feeder link Earth station, of a satellite, or of a ground apparatus for satellite communications), or of a device for wireless communications, such as LTE-based communications.

Accordingly, the RF transmission section 1000 can conveniently be an RF transmission section of a transmitting system for satellite communications (such as a transmitting system of a feeder link Earth station, of a satellite, or of a ground apparatus for satellite communications), or of a device for wireless communications, such as LTE-based communications.

Additionally, FIG. 2 shows in greater detail the device 100 for generating OAM modes, which device 100 comprises 2N OAM mode generation modules. In particular, FIG. 2 shows, for the sake of illustration simplicity, only:

- an OAM mode generation module 110 for generating OAM mode m=+1;
- an OAM mode generation module 120 for generating OAM mode m=−1;
- an OAM mode generation module 130 for generating OAM mode m=+N; and
- an OAM mode generation module 140 for generating OAM mode m=−N.

In detail, a generic OAM mode generation module for generating OAM mode m is operable to apply to a respective second digital signal $s_m(t)$ received from the signal generation section 10 a respective space modulation associated with said OAM mode m so as to generate a corresponding space-modulated digital signal $sms_m(t)$ carrying said OAM mode m, having the given sampling period $T_0$, and occupying the whole given frequency bandwidth W centered on said predefined frequency $f_0$.

More in detail, the generic OAM mode generation module for generating the OAM mode m is operable to:

- receive a synchronization signal $synch_m$ (not shown in FIG. 2 for the sake of illustration clarity) indicating the given sampling period $T_0$ and, conveniently, also the sampling period $T_m$ of the respective second digital signal $s_m(t)$ received from the signal generation section 10; and
- apply the respective space modulation to said respective digital signal $s_m(t)$ by
  - digitally interpolating said respective second digital signal $s_m(t)$ on the basis of the received synchronization signal $synch_m$ so as to generate a corresponding digitally-interpolated signal having the given sampling period $T_0$;
  - applying to the digitally-interpolated signal a respective digital phase modulation associated with said OAM mode m such that to generate a corresponding phase-modulated signal carrying said OAM mode m with a predefined OAM mode rotation speed; and
  - digitally filtering the phase-modulated signal thereby obtaining a filtered signal which represents the aforesaid space-modulated digital signal $sms_m(t)$.

For example, the OAM mode generation module 110 is conveniently configured to:

- receive, from the signal generation section 10, the second digital signal $s_{+1}(t)$ and a synchronization signal $synch_{+1}$ indicating the given sampling period $T_0$ and, conveniently, also the sampling period $T_{+1} = 4T_0$ (or $T_{+1} = 3T_0$) of the second digital signal $s_{+1}(t)$;
- digitally interpolate the second digital signal $s_{+1}(t)$ by outputting, for each digital sample of said second digital signal $s_{+1}(t)$, four corresponding digital samples with time step (i.e., time distance) $T_0$, thereby generating a corresponding digitally-interpolated signal having the given sampling period $T_0$;
- apply, to each set of four digital samples obtained by means of the digital interpolation, digital phase shifts related to the OAM mode +1 with the predefined OAM mode rotation speed (namely, digital phase shifts related to phase values 0, $\pi/2$, $\pi$ and $3\pi/2$) so as to generate a corresponding set of four phase-shifted digital samples, which corresponding set of four phase-shifted digital samples carries said OAM mode +1 with the predefined OAM mode rotation speed;

digitally filter each set of four phase-shifted digital samples obtained by means of the digital phase shifting so as to output a corresponding set of four filtered digital samples; and combine the sets of four filtered digital samples obtained by means of the digital filtering into a single filtered signal which represents the space-modulated digital signal $sms_{+1}(t)$.

Accordingly, the OAM mode generation module 120 is conveniently configured to:

receive, from the signal generation section 10, the second digital signal $s_{-1}(t)$ and a synchronization signal $synch_{-1}$ indicating the given sampling period $T_0$ and, conveniently, also the sampling period $T_{-1}=4T_0$ (or $T_{-1}=3T_0$) of the second digital signal $s_{-1}(t)$;

digitally interpolate the second digital signal $s_{-1}(t)$ by outputting, for each digital sample of said second digital signal $s_{-1}(t)$, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode −1 with the predefined OAM mode rotation speed (namely, digital phase shifts related to phase values 0, $3\pi/2$, $\pi$; and $\pi/2$) so as to generate a corresponding set of four phase-shifted digital samples, which corresponding set of four phase-shifted digital samples carries said OAM mode −1 with the predefined OAM mode rotation speed;

digitally filter each set of four phase-shifted digital samples obtained by means of the digital phase shifting so as to output a corresponding set of four filtered digital samples; and combine the sets of four filtered digital samples obtained by means of the digital filtering into a single filtered signal which represents the space-modulated digital signal $sms_{-1}(t)$.

The OAM mode generation modules for generating higher-order OAM modes (i.e., with |m|>1) operate, mutatis mutandis, conceptually in the same way as the OAM mode generation modules 110 and 120.

Moreover, again with reference to FIG. 2, the device 100 further comprises:

a combining module 150 operable to combine the first digital signal $s_0(t)$ received from the signal generation section 10 and all the space-modulated digital signals $sms_m(t)$ generated by the OAM mode generation modules into a corresponding combined digital signal $s_c(t)$; and a transmission filtering module 160, which is operable to digitally filter the combined digital signal $s_c(t)$ by means of a predefined transmission filter such that to adjust the signal bandwidth to the bandwidth of transmission radio channel (i.e., the specific radio channel used in transmission) so as to reduce Inter-Symbol Interference (ISI), thereby obtaining a corresponding output digital signal $s_{out}(t)$; wherein the transmission filtering module 160 is coupled with the RF transmission section 1000 to provide the latter with the output digital signal $s_{out}(t)$.

For example, in case of (free-space) satellite communications on a radio channel having the given frequency bandwidth W, the transmission filter can be a predefined root raised cosine filter adapted to said given frequency bandwidth W.

As for reception side, reference is made to FIG. 3, which shows a functional block diagram of a receiving system (denoted as whole by 2), which is disclosed in WO 2014/016655 A1 and which exploits the aforesaid multidimensional space modulation for receiving radio vortices at frequencies ranging from a few KHz to hundreds of GHz.

In particular, the receiving system 2 comprises:

an RF reception section 2000, which is designed to receive signals at predefined radio frequencies by means of a single antenna (which is not shown in FIG. 3 for the sake of illustration simplicity and which can be also a reflector antenna with a single feed) or an antenna array (which is not shown in FIG. 3 for the sake of illustration simplicity and which can be also a multi-feed reflector antenna), and which is designed to obtain an incoming digital signal $u_{in}(t)$ on the basis of the received signals;

a device 200 for demodulating CAM modes, which is coupled with said RF reception section 2000 to receive the incoming digital signal $u_{in}(t)$ therefrom, and which is designed to process said incoming digital signal $u_{in}(t)$ so as to output useful signals (in FIG. 3 useful signals $u_0(t)$, $u_{+1}(t)$, $u_{-1}(t)$, $u_{+N}(t)$ and $u_{-N}(t)$ outputted by the device 200 are shown); and a signal processing section 20, which is coupled with said device 200 to receive the useful signals outputted by the latter and which is designed to process said useful signals.

The aforesaid predefined radio frequencies can conveniently range from a few KHz to hundreds of GHz depending on the specific application for which the overall receiving system 2 is designed.

Conveniently, the RF reception section 2000 can be an RF reception section of a receiving system for satellite communications (such as a receiving system of a feeder link Earth station, of a satellite, or of a ground apparatus for satellite communications), of a device for wireless communications (such as LTE-based communications), of a radar system, of a Synthetic Aperture Radar (SAR) system, or of a radio astronomy receiving system.

Accordingly, the signal processing section 20 can conveniently be a signal processing section of a receiving system for satellite communications (such as a receiving system of a feeder link Earth station, of a satellite, or of a ground apparatus for satellite communications), of a device for wireless communications (such as LTE-based communications), of a radar system, of a SAR system, or of a radio astronomy receiving system.

Additionally, FIG. 4 shows in greater detail the device 200 for demodulating OAM modes. In particular, as shown in FIG. 4, the device 200 comprises a reception filtering module 210, which is operable to digitally filter the incoming digital signal $u_{in}(t)$ by means of a predefined reception filter such that to equalize the incoming digital signal $u_{in}(t)$ with respect to reception radio channel (i.e., the specific radio channel used in reception) and, conveniently, also with respect to transmission filter (i.e., the specific filter used in transmission), thereby obtaining a corresponding filtered incoming digital signal $u_f(t)$.

For example, in case of (free-space) satellite communications on a radio channel having the given frequency bandwidth W, wherein the transmission filter is a predefined root raised cosine filter adapted to said given frequency bandwidth W, the reception filter can be the complex conjugate of said predefined root raised cosine filter so as to reduce ISI.

Additionally, again with reference to FIG. 4, the device 200 further comprises a digital oversampling module 220 operable to digitally oversample the filtered incoming digital signal $u_f(t)$ on the basis of a predefined oversampling period $T_{over}$, thereby outputting a corresponding set of digital samples.

For example, in case the receiving system 2 is configured to receive the RF signals transmitted by the transmission system 1, the predefined oversampling period $T_{over}$ can conveniently be equal to $T_0/Q$, wherein $T_0$ is the given sampling period previously introduced in connection with the transmission system 1, and Q denotes an integer higher than one.

Furthermore, again with reference to FIG. 4, the device 200 comprises also a processing module 230 configured to:
- provide a linear system of M equations (where M denotes an integer higher than one) relating
  - the set of digital samples outputted by the digital oversampling module 220
  - to X unknown digital values (where X denotes an integer higher than one and lower than M) of useful signals associated, each, with a respective predefined OAM mode m with a predefined OAM mode rotation speed;
  - wherein said linear system of M equations relates the set of digital samples outputted by the digital oversampling module 220 to the X unknown digital values through
    - first predefined parameters related to the predefined OAM modes with the predefined OAM mode rotation speed, and
    - second predefined parameters related to the predefined reception filter, to the reception radio channel and, conveniently, also to the transmission filter;
- compute the X digital values by solving the linear system of M equations; and
- digitally generate and output the useful signals (for example the useful signals $u_0(t)$, $u_{+1}(t)$, $u_{-1}(t)$, $u_{+N}(t)$ and $u_{-N}(t)$ shown in FIG. 4) on the basis of the corresponding digital values computed.

In this connection, it is important to underline the fact that, in order to extract the useful signals (i.e., in order to solve the linear system of M equations thereby computing the X digital values, and, thence, to generate and output the useful signals), the processing module 230 is conveniently configured to operate as a generalized matched filter which exploits one or more mathematical processing techniques, such as the pseudo-inverse technique.

Moreover, it is also important to underline the fact that the oversampling operation performed by the digital oversampling module 220 allows to increase redundancy of the linear system of M equations (i.e., it allows to obtain a number M of independent equations higher and higher than the number X of the unknown digital values), thereby allowing to find more robust solutions to said linear system of M equations.

Furthermore, the better the characterization of the OAM modes and of the radio channel in the linear system of M equations, the more robust the resolution of said linear system of M equations. Specifically, an increase in the number of first and second predefined parameters used in the linear system of M equations allows to increase redundancy of said linear system of M equations (i.e., it allows to obtain a number M of independent equations higher and higher than the number X of the unknown digital values), thereby allowing to optimize the resolution of, i.e., to find optimum solutions to, said linear system of M equations in terms of energy per bit to noise power spectral density ratio $E_b/N_0$.

In case the receiving system 2 is configured to receive the RF signals transmitted by the transmission system 1, the first predefined parameters are related to the sampling periods $T_0$ and $T_m$ previously introduced in connection with the device 100, and to the digital phase shifts applied by the OAM mode generation modules of the device 100 to the digital samples of the digitally-interpolated signals.

Moreover, again in case the receiving system 2 is configured to receive the RF signals transmitted by the transmission system 1, the useful signals generated and outputted by the processing module 230 (such as the signals $u_0(t)$, $u_{+1}(t)$, $u_{-1}(t)$, $u_{+N}(t)$ and $u_{-N}(t)$ shown in FIG. 4) are the digital signals transmitted by said transmission system 1 by means of the plane wave and the several radio vortices (namely the signals $s_0(t)$, $s_{+1}(t)$, $s_{-1}(t)$, $s_{+N}(t)$ and $s_{-N}(t)$ shown in FIGS. 1 and 2).

Preferably, the device 100 for generating OAM modes and the device 200 for demodulating OAM modes are implemented by means of Field-Programmable Gate Array (FPGA), Application-Specific Integrated Circuit (ASIC), and Software Defined Radio (SDR) technologies.

Finally, according to a further aspect of WO 2014/016655 A1, an overall radio communication system including both the transmission system 1 and the receiving system 2 is preferably designed to:
- monitor interference experienced by the radio vortices transmitted; and,
- if the interference experienced by a radio vortex carrying a given digital signal $s_m(t)$ by means of a given OAM mode m meets a given interference-related condition (for example, if it exceeds a given interference level), start using an OAM mode m* different from the given OAM mode m for transmitting the information stream previously carried by said given digital signal $s_m(t)$ by means of said given OAM mode m, and stop using said given OAM mode m.

In case said further aspect of WO 2014/016655 A1 is used for satellite communications, it is possible to mitigate jammer, since said further aspect of WO 2014/016655 A1 allows to reject a jammed OAM mode. Moreover, said further aspect of WO 2014/016655 A1 can be used also in combination with other anti-jamming capabilities of the receiving system.

OBJECT AND SUMMARY OF THE INVENTION

The Applicant has carried out an in-depth study in order to develop a practical, efficient mode for carrying out the multidimensional space modulation disclosed in WO 2014/016655 A1, and this in-depth study has led the Applicant to develop a new, inventive system and method for transmitting and receiving signals at Radio Frequency (RF) (including frequencies from a few KHz to hundreds of GHz) with increased transmission capacity.

Therefore, an object of the present invention is that of providing a system and a method for transmitting and receiving RF signals with increased transmission capacity.

This and other objects are achieved by the present invention in so far as it relates to a method and a system for radio communications, as defined in the appended claims.

In particular, the radio communications method according to the present invention comprises carrying out, by a transmitter, the following steps:
a) generating a digital time signal, that is time-limited, carries a limited sequence of digital symbols to be transmitted and results from an approximation of the Hilbert transform in frequency domain, which approximation is based on
- a frequency main mode, that is associated with an orbital angular momentum mode with topological charge equal to zero, and that includes main mode frequency samples carrying respective digital symbols of said limited sequence via said orbital angular momentum mode with topological charge equal to zero, and
- one or more frequency twisted modes carrying the other digital symbols of said limited sequence, wherein each frequency twisted mode is associated with a corresponding orbital angular momentum mode with a respective topological charge different than zero, and includes respective twisted mode frequency samples carrying one or more respective digital symbols of said limited sequence via said corresponding orbital angular momentum mode with said respective topological charge different than zero; and b) transmitting a radio frequency signal carrying the digital time signal generated.

Moreover, the method according to the present invention further comprises carrying out, by a receiver, the following steps:
c) receiving the radio frequency signal transmitted by the transmitter;
d) processing the received radio frequency signal so as to obtain a corresponding incoming digital signal; and
e) extracting, from the incoming digital signal, the digital symbols carried by said incoming digital signal.

Preferably, for each frequency twisted mode, the respective twisted mode frequency samples are mutually phase-shifted on the basis of phase shifts related to the corresponding orbital angular momentum mode with the respective topological charge different than zero.

Conveniently, the main mode frequency samples are at main mode frequencies spaced apart by a predetermined frequency spacing, and the respective twisted mode frequency samples of each frequency twisted mode are at respective twisted mode frequencies that are:
- related to said frequency twisted mode;
- spaced apart by said predetermined frequency spacing; and
- different from the main mode frequencies.

More conveniently, the one or more frequency twisted modes comprise 2N frequency twisted modes, each identified by a respective topological-charge-related index n, that is an integer comprised between −N and +N and different than zero, N being an integer higher than zero; the limited sequence of digital symbols to be transmitted comprises $S_{TOT}$ digital symbols, $S_{TOT}$ being equal to $2^{N+2}-1$; the frequency main mode carries $M_{MFS}$ of said $S_{TOT}$ digital symbols by means of $M_{MFS}$ main mode frequency samples at corresponding main mode frequencies, that are spaced apart by said predetermined frequency spacing and that range from $B_S$ to $M_{MFS}$ times $B_S$, $B_S$ denoting said predetermined frequency spacing and $M_{MFS}$ being equal to $2^{N+1}+1$; said 2N frequency twisted modes carry the $S_{TOT}-M_{MFS}$ digital symbols not carried by the frequency main mode; and each frequency twisted mode n carries $2^{N-|n|}$ respective digital symbol(s) by means of $2^{N+1}$ respective twisted mode frequency samples at corresponding twisted mode frequencies, that are spaced apart by said predetermined frequency spacing and that are located, in frequency domain, at $$B_S\left(\frac{2^{|n|}-1}{2^{|n|}}+k\right),$$

where k denotes an integer ranging from zero to $2^{N+1}-1$, or from one to $2^{N+1}$.

More and more conveniently, each of said $S_{TOT}$ digital symbols to be transmitted is represented by a respective symbol complex value; and, for each frequency twisted mode n, the $2^{N+1}$ respective twisted mode frequency samples comprise, for each of the $2^{N-|n|}$ respective digital symbol(s), $2^{|n|+1}$ frequency samples, that:
- carry said digital symbol;
- are at frequencies that are located, in frequency domain, at $$B_S\left[\frac{2^{|n|}-1}{2^{|n|}}+(k^*+i\cdot 2^{|n|+1})\right],$$

where k* denotes an integer ranging from zero to $2^{|n|+1}-1$, or from one to $2^{|n|+1}$, and where i is an index that identifies said digital symbol and is comprised between zero and $2^{N-|n|}-1$; and
- have, each, a respective complex value obtained by multiplying the symbol complex value representing said digital symbol by a respective complex factor related to said frequency twisted mode n and to the frequency of said frequency sample.

Very conveniently, for each frequency twisted mode n and for each of the $2^{N-|n|}$ respective digital symbol(s), the $2^{|n|+1}$ respective frequency samples carrying said digital symbol have, each, a respective complex value obtained by multiplying the symbol complex value representing said digital symbol by a respective complex factor which:
if n is higher than zero, is equal to $$\frac{e^{+jk^*\frac{\pi}{2^{|n|}}}}{2^{\frac{|n|+1}{2}}}$$

or, if n is lower than zero, is equal to $$\frac{e^{-jk^*\frac{\pi}{2^{|n|}}}}{2^{\frac{|n|+1}{2}}}$$

where j denotes the imaginary unit.

Preferably, said step a) includes generating the digital time signal by using a predefined transmission matrix that relates
- the $S_{TOT}$ digital symbols to be transmitted
- to time samples of the digital time signal
- through coefficients related to a transform from frequency domain to time domain of the main mode frequency samples and the twisted mode frequency samples;
- and said step e) includes extracting the digital symbols carried by the incoming digital signal by using a reception matrix derived from the predefined transmission matrix.

Preferably, the main mode frequency samples are frequency samples of Orthogonal Frequency-Division Multiplexing (OFDM) type, or of Orthogonal Frequency-Division Multiple Access (OFDMA) type.

Conveniently, said step a) includes generating a digital time signal that includes a cyclic prefix followed by a time signal portion; said time signal portion results from the approximation of the Hilbert transform in frequency domain based on the frequency main and twisted modes; and the cyclic prefix is a replica of an end portion of said time signal portion.

Preferably, said step e) includes:
  e1) performing synchronization operations on the basis of the incoming digital signal; and
  e2) extracting, on the basis of the synchronization operations performed, the digital symbols carried by the incoming digital signal.

More preferably, said step e1) includes performing a symbol timing synchronization based on the presence of the cyclic prefix in the incoming digital signal.

Again more preferably, said step e1) includes performing a carrier frequency synchronization by carrying out a carrier frequency offset estimation based on the presence of the cyclic prefix in the incoming digital signal.

Conveniently, said step e1) includes performing a carrier frequency synchronization by carrying out a carrier frequency offset estimation based on training symbols transmitted by the transmitter and/or pilot frequencies used by the transmitter.

Conveniently, said step e1) includes performing a carrier frequency synchronization by carrying out a carrier frequency offset estimation based on the presence of the frequency main and twisted modes in the incoming digital signal.

Conveniently, said step e1) includes performing a carrier frequency synchronization by carrying out:
  a carrier frequency offset integer part estimation in frequency domain;
  a carrier frequency offset coarse decimal part estimation in time domain; and
  a carrier frequency offset fine decimal part estimation in frequency domain.

Preferably, said step e1) includes performing a sampling clock synchronization by carrying out a sampling clock offset estimation.

More preferably, the sampling clock offset estimation includes a sampling clock phase offset estimation and a sampling clock frequency offset estimation.

BRIEF DESCRIPTION OF THE DRAWINGS

For a better understanding of the present invention, preferred embodiments, which are intended purely by way of non-limiting example, will now be described with reference to the attached drawings (all not to scale), where.

DETAILED DESCRIPTION OF PREFERRED EMBODIMENTS OF THE INVENTION

Figure 1:
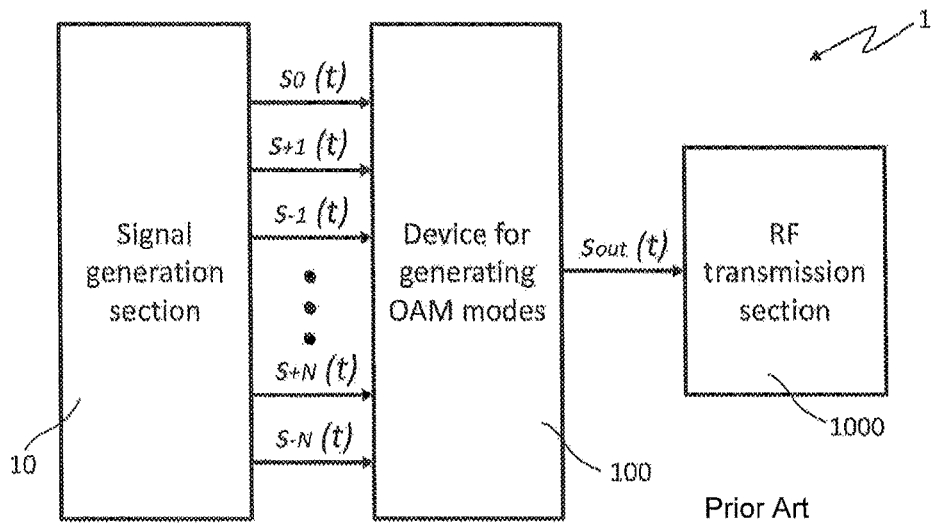
FIG. 1 schematically illustrates a transmitting system for transmitting radio vortices according to the background art.
Figure 2:
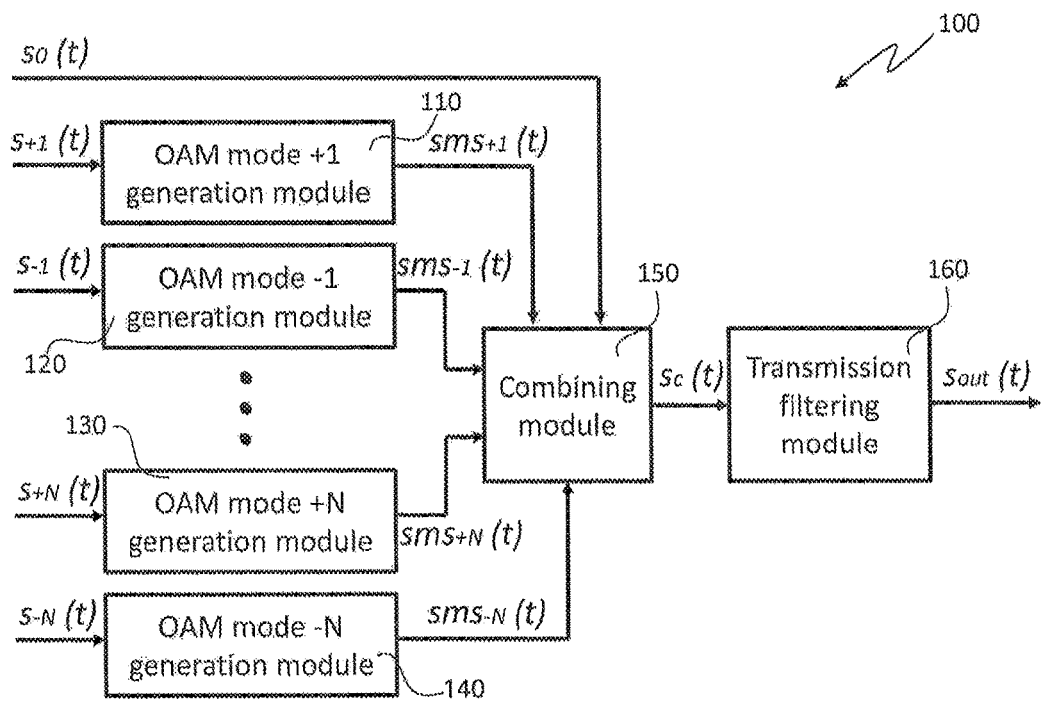
FIG. 2 schematically illustrates a device for generating OAM modes, which device is exploited by the transmitting system shown in FIG. 1.
Figure 3:
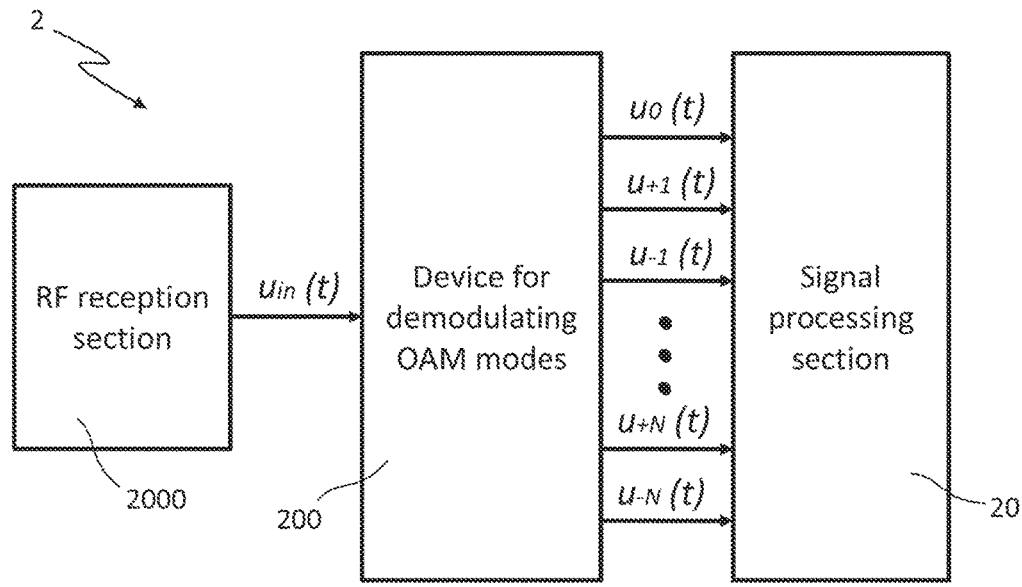
FIG. 3 schematically illustrates a receiving system for receiving radio vortices according to the background art.
Figure 4:
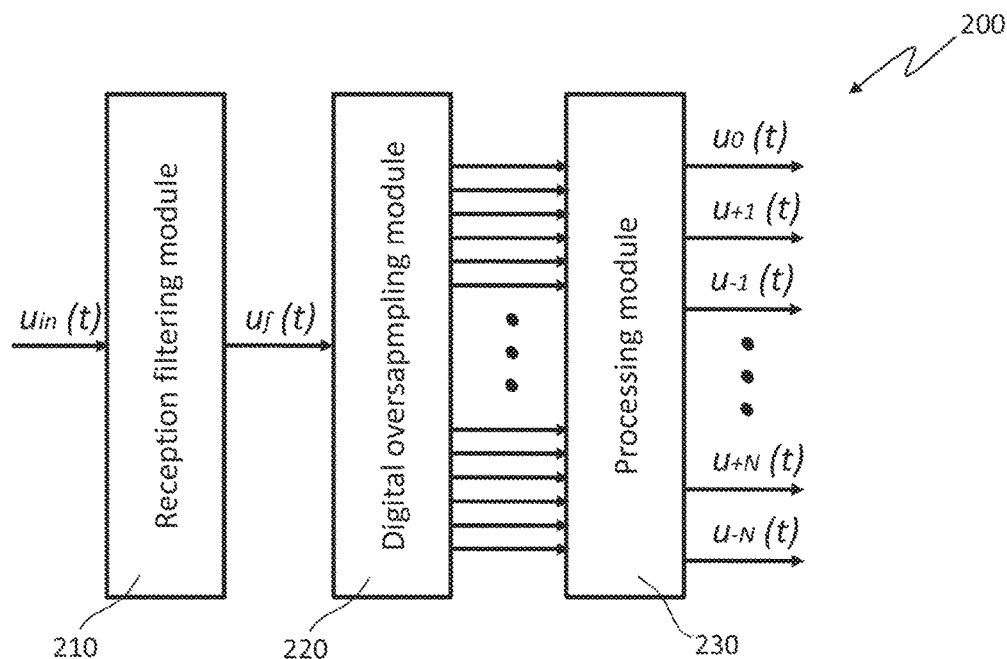
FIG. 4 schematically illustrates a device for demodulating OAM modes, which device is exploited by the receiving system shown in FIG. 3.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

As previously explained, in the present application, for the sake of description simplicity, the expressions "twisted modes/signals/waves" are used to denote orbital angular momentum (OAM) modes with topological charge different than zero, and the expressions "main/conventional/traditional/plane mode/signal/wave" are used to denote the orbital angular momentum (OAM) mode with topological charge equal to zero.

International Application No. PCT/IB2013/003156 (whose content is herewith enclosed by reference), filed on 5th Nov. 2013 in the name of EUTELSAT S.A. and published on 14 May 2015 with publication number WO 2015/067987 A1, discloses the feasibility of increasing transmission capacity at Radio Frequency (RF) (including frequencies from a few KHz to hundreds of GHz) by exploiting a proper approximation in time domain of the Hilbert transform of digital analytical signals, wherein said approximation of the Hilbert transform is obtained by using twisted waves, specifically OAM modes.

In particular, WO 2015/067987 A1 describes a radio communications system, which comprises a transmitter and a receiver, wherein the transmitter is configured to:
- generate or receive digital symbols having a given symbol rate associated with a corresponding symbol period;
- generate, every S digital symbols generated/received, a respective multi-mode digital signal, which has a predefined time length shorter than S times the symbol period, which is sampled with a predefined sampling rate higher than the symbol rate, and which carries said S digital symbols by means of a plurality of (orthogonal) time OAM modes comprising
    - a time main mode (i.e., an OAM mode with topological charge equal to zero), which is a real harmonic mode and carries P of said S digital symbols, and
    - one or more time twisted modes (i.e., OAM modes with topological charge different than zero) carrying the other S-P digital symbols, each time twisted mode being a complex harmonic mode time-shifted by half the symbol period with respect to the main mode (wherein S is an integer higher than three and P is an integer lower than S); and
- transmit a radio frequency signal carrying a sequence of the generated multi-mode digital signals.

Moreover, the receiver of the radio communications system according to WO 2015/067987 A1 is configured to:
- receive the radio frequency signal transmitted by the transmitter;
- process the received radio frequency signal so as to obtain a corresponding incoming digital signal; and
- extract, from successive, non-overlapped portions of the incoming digital signal sampled with the predefined sampling rate, the S digital symbols respectively carried by each incoming digital signal portion by means of the (orthogonal) time OAM modes; wherein each of the successive, non-overlapped portions of the incoming digital signal has the predefined time length.

Preferably, the transmitter according to WO 2015/067987 A1 is configured to generate a multi-mode digital signal carrying S digital symbols by:
- allocating P of the S digital symbols to the time main mode by providing, for each of said P digital symbols, a corresponding complex value which represents said digital symbol and is related to the time main mode;
- allocating each of the other S-P digital symbols to a corresponding time twisted mode by providing, for each of said S-P digital symbols, a corresponding complex value which represents said digital symbol and is related to the time twisted mode to which said digital symbol is allocated;
- computing, by using a predefined transmission matrix, M multi-mode complex values related to M successive time instants which, within the predefined time length, are separated by half the symbol period, wherein M is an integer equal to or higher than S, and wherein the predefined transmission matrix relates
    the S complex values representing the S digital symbols and related to the time OAM modes
    to the M successive time instants
    through complex coefficients each of which is related to a respective time OAM mode and to a respective time instant; and
- generating a multi-mode digital signal having the predefined time length and sampled with the predefined sampling rate on the basis of the M multi-mode complex values computed.

Again preferably, the receiver according to WO 2015/067987 A1 is configured to extract the S digital symbols carried by an incoming digital signal portion having the predefined time length and sampled with the predefined sampling rate by:
- extracting, from said incoming digital signal portion, M multi-mode complex values related to M successive time instants which are, within the predefined time length, separated by half the symbol period;
- computing, by using a reception matrix derived from the predefined transmission matrix, S complex values representing the S digital symbol carried by said incoming digital signal portion by means of the (orthogonal) time OAM modes, wherein said reception matrix relates the M extracted multi-mode complex values related to the M successive time instants to the S complex values to be computed through complex coefficients each of which is related to a respective time OAM mode and to a respective time instant; and determining the S digital symbols represented by the S complex values computed.

Conveniently, the receiver according to WO 2015/067987 A1 is designed to operate as a generalized matched filter and the reception matrix used by said receiver is derived from the predefined transmission matrix through a generalized inversion technique.

More conveniently, according to WO 2015/067987 A1, the predefined transmission matrix is such that the matrix resulting from the multiplication of the transpose of said predefined transmission matrix and said predefined transmission matrix has a determinant different from zero, and the reception matrix is derived from the predefined transmission matrix through a pseudo-inverse technique.

More and more conveniently, according to WO 2015/067987 A1, the reception matrix is computed on the basis of the following formula:

$$[[GMF]] = ([[A]]^T [[A]])^{-1} [[A]]^T$$

where $[[GMF]]$ denotes the reception matrix, $[[A]]$ denotes the predefined transmission matrix, $[[A]]^T$ denotes the transpose of the predefined transmission matrix, and $([[A]]^T [[A]])^{-1}$ denotes the operation of inversion of the matrix resulting from the multiplication of the transpose of the predefined transmission matrix and the predefined transmission matrix.

Preferably, according to WO 2015/067987 A1, the time main mode comprises, within the predefined time length, P samples with sampling period equal to the symbol period, the time twisted modes comprise, within the predefined time length, P−1 samples with sampling period equal to the symbol period, each time twisted mode is time-shifted by half the symbol period with respect to the time main mode, and said M successive time instants, which, within the predefined time length, are separated by half the symbol period, are the sampling times of the time main mode and of the time twisted modes, thereby resulting that M=2P−1.

More preferably, according to WO 2015/067987 A1, the time OAM modes comprise 2N time twisted modes each of which carries a respective Orbital Angular Momentum (OAM) mode and has a respective topological-charge-related index n comprised between −N and +N, wherein N is an integer higher than one; moreover, the time main mode carries $P=2^{N+1}+1$ digital symbols and each time twisted mode having topological-charge-related index n carries $2^{N-n+1}$ digital symbols, thereby resulting that $M=2^{N+2}+1$ and $S=2^{N+2}-1$.

Conveniently, according to WO 2015/067987 A1, the predefined sampling rate depends at least on the predefined time length of each multi-mode digital signal and of each of the successive, non-overlapped portions of the incoming digital signal.

More conveniently, according to WO 2015/067987 A1, the predefined time length is equal to P times the symbol period.

More and more conveniently, according to WO 2015/067987 A1, the predefined sampling rate is determined on the basis of the following formula:

$$CR = \frac{2P+u}{2P} \cdot \frac{1}{T_s},$$

where CR denotes said predefined sampling rate, $T_S$ denotes the symbol period, and u denotes a digital-vestigial-component-related parameter whose value is an integer and depends at least on the predefined time length.

Preferably, the transmitter according to WO 2015/067987 A1 is configured to generate a multi-frame digital signal comprising successive, non-overlapped time frames each of which has the predefined time length and is occupied by a respective multi-mode digital signal; moreover, the multi-frame digital signal carries frame synchronization data related to frame synchronization of its time frames; accordingly, the radio frequency signal transmitted by the transmitter carries the multi-frame digital signal.

Additionally, the receiver according to WO 2015/067987 A1 is further configured to:

extract the frame synchronization data from the incoming digital signal;

detect, on the basis of the extracted frame synchronization data, successive, non-overlapped time frames of the incoming digital signal with the predefined time length; and, for each detected time frame of the incoming digital signal, extract, from the incoming digital signal portion within said time frame, the S digital symbols carried by said incoming digital signal portion by means of the (orthogonal) time OAM modes.

Moreover, in order to increase, in general, transmission capacity at Radio Frequency (RF) (including frequencies from a few KHz to hundreds of GHz) and, in particular, RF spectrum reuse, International Application No. PCT/FR2014/051394 (whose content is herewith enclosed by reference) filed on 10 Jun. 2014 in the name of EUTELSAT S.A. teaches, by exploiting duality between time and frequency, to use a twisted-wave-based approximation of the Hilbert transform in frequency domain.

In fact, thanks to duality principle between time and frequency it is possible to exploit twisted wave functions also in frequency domain. The results are very interesting and promising with features which are, on the one hand, similar to time domain case, but, on the other hand, rather different, for practical applications, from time domain case.

In particular, "frequency twist" can be seen as a generalization of the well-known OFDM approach, introducing an absolute novelty in the analysis and design of OFDM signals.

In detail, PCT/FR2014/051394 describes a radio communications method, which comprises carrying out, by a transmitter, the following steps:

a) providing a digital time signal carrying digital symbols to be transmitted; and b) transmitting a radio frequency signal carrying said digital time signal.

Moreover, the method according to PCT/FR2014/051394 further comprises carrying out, by a receiver, the following steps:

c) receiving the radio frequency signal transmitted by the transmitter;

d) processing the received radio frequency signal so as to obtain a corresponding incoming digital signal; and e) extracting, from the incoming digital signal, the digital symbols carried by said incoming digital signal.

The method according to PCT/FR2014/051394 is characterized in that said digital time signal carrying the digital symbols to be transmitted results from an approximation of the Hilbert transform in frequency domain, which approximation is based on a frequency main mode and one or more frequency twisted modes, wherein said frequency main and twisted modes carry, each, respective digital symbols to be transmitted.

Conveniently, according to PCT/FR2014/051394, the digital time signal is time-limited, carries a limited sequence of digital symbols to be transmitted, and results from:
  main mode frequency samples carrying respective digital symbols of said limited sequence via a frequency main mode; and
  twisted mode frequency samples carrying the other digital symbols of said limited sequence via one or more frequency twisted modes, wherein each frequency twisted mode is a complex harmonic mode (i.e., an OAM mode) that is orthogonal to the frequency main mode and to any other frequency twisted mode used.

More conveniently, according to PCT/FR2014/051394, the main mode frequency samples are at main mode frequencies spaced apart by a predetermined frequency spacing, and the twisted mode frequency samples comprise, for a frequency twisted mode, respective twisted mode frequency samples at corresponding twisted mode frequencies that:
  are related to said frequency twisted mode;
  are spaced apart by said predetermined frequency spacing; and
  are different from the main mode frequencies.

More and more conveniently, according to PCT/FR2014/051394, the one or more frequency twisted modes comprise 2N frequency twisted modes each identified by a respective integer index n that is comprised between −N and +N and is different from zero, N denoting an integer higher than zero; the limited sequence of digital symbols to be transmitted comprises $S_{TOT}$ digital symbols, $S_{TOT}$ being equal to $2^{N+2}-1$; the frequency main mode carries $M_{MFS}$ of said $S_{TOT}$ digital symbols by means of $M_{MFS}$ main mode frequency samples at corresponding main mode frequencies, that are spaced apart by said predetermined frequency spacing and that range from $B_S$ to $M_{MFS}$ times $B_S$, $B_S$ denoting said predetermined frequency spacing and $M_{MFS}$ being equal to $2^{N+1}+1$; said 2N frequency twisted modes carry the $S_{TOT}-M_{MFS}$ digital symbols not carried by the frequency main mode; and each frequency twisted mode n carries $2^{N-|n|}$ respective digital symbol(s) by means of $2^{N+1}$ respective twisted mode frequency samples at corresponding twisted mode frequencies, that are spaced apart by said predetermined frequency spacing and that are located, in frequency domain, at $$B_S\left(\frac{2^{|n|}-1}{2^{|n|}}+k\right),$$

where k denotes an integer ranging from zero to $2^{N+1}-1$, or from one to $2^{N+1}$.

Very conveniently, according to PCT/FR2014/051394, each of said $S_{TOT}$ digital symbols to be transmitted is represented by a respective symbol complex value; and, for each frequency twisted mode n, the $2^{N+1}$ respective twisted mode frequency samples comprise, for each of the $2^{N-|n|}$ respective digital symbol(s), $2^{|n|+1}$ frequency samples, that:
  carry said digital symbol;
  are at frequencies that are located, in frequency domain, at $$B_S\left[\frac{2^{|n|}-1}{2^{|n|}}+(k^*+i\cdot 2^{|n|+1})\right],$$

where k* denotes an integer ranging from zero to $2^{|n|+1}-1$, or from one to $2^{|n|+1}$, and where i is an index that identifies said digital symbol and is comprised between zero and $2^{N-|n|}-1$; and
  have, each, a respective complex value obtained by multiplying the symbol complex value representing said digital symbol by a respective complex factor related to said frequency twisted mode n and to the frequency of said frequency sample.

Again very conveniently, according to PCT/FR2014/051394, for each frequency twisted mode n and for each of the $2^{N-|n|}$ respective digital symbol(s), the $2^{|n|+1}$ respective frequency samples carrying said digital symbol have, each, a respective complex value obtained by multiplying the symbol complex value representing said digital symbol by a respective complex factor which:
  if n is higher than zero, is equal to $$\frac{e^{+jk^*\frac{\pi}{2^{|n|}}}}{2^{\frac{|n|+1}{2}}}$$

or, if n is lower than zero, is equal to $$\frac{e^{-jk^*\frac{\pi}{2^{|n|}}}}{2^{\frac{|n|+1}{2}}}$$

where j denotes the imaginary unit.

Preferably, according to PCT/FR2014/051394, said step a) includes providing the digital time signal by using a predefined transmission matrix that relates
  the $S_{TOT}$ digital symbols to be transmitted
  to time samples of the digital time signal
  through coefficients related to a transform from frequency domain to time domain of the main mode frequency samples and the twisted mode frequency samples;
  and said step e) includes extracting the digital symbols carried by the incoming digital signal by using a reception matrix derived from the predefined transmission matrix (conveniently, through a pseudo-inverse technique).

Preferably, according to PCT/FR2014/051394, the main mode frequency samples are frequency samples of Orthogonal Frequency-Division Multiplexing (OFDM) type, or of Orthogonal Frequency-Division Multiple Access (OFDMA) type.

Preferably, according to PCT/FR2014/051394, said step a) includes:
  providing a first digital time signal resulting from the main mode frequency samples and the twisted mode frequency samples; and
  providing a second digital time signal which includes a cyclic prefix followed by the first digital time signal, wherein the cyclic prefix is a replica of an end portion of said first digital time signal;

and said step b) includes transmitting a radio frequency signal carrying the second digital time signal.

For a better understanding of the present invention, in the following theory underlying radio communications based on frequency twisted waves will be presented in greater detail.

As is known, a signal can be represented in time or frequency domain, time and frequency being conjugate variables.

Considering a time-limited signal within a time window T (as usual technique in the case of OFDM-OFDMA signals), in frequency domain said signal can be represented by a series of sinc functions:

$$X(f) = \sum_{k=-\infty}^{+\infty} a_k e^{j\varphi_k} \frac{\sin\left[\pi T\left(f - \frac{k}{T}\right)\right]}{\pi T\left(f - \frac{k}{T}\right)}$$

In the case the signal X(f) can be approximated with a band-limited signal with bandwidth B, this implies that:

$$X(f-f_0) = X^+(f-f_0) + X^-(f-f_0),$$

where + and − denote positive and negative frequencies, respectively.

Taking into consideration only the positive frequencies, it is possible to write:

$$X^+(f-f_0) = X(f-f_0) \text{ for } f \geq 0, \text{ and}$$

$$X^+(f-f_0) = 0 \text{ for } f < 0,$$

and also $$X^+(f) = \sum_{k=-N}^{+N} a_k e^{j\varphi_k} \frac{\sin\left[\pi T\left(f - f_0 - \frac{k}{T}\right)\right]}{\pi T\left(f - f_0 - \frac{k}{T}\right)},$$

where N=TB.

Figure 5:
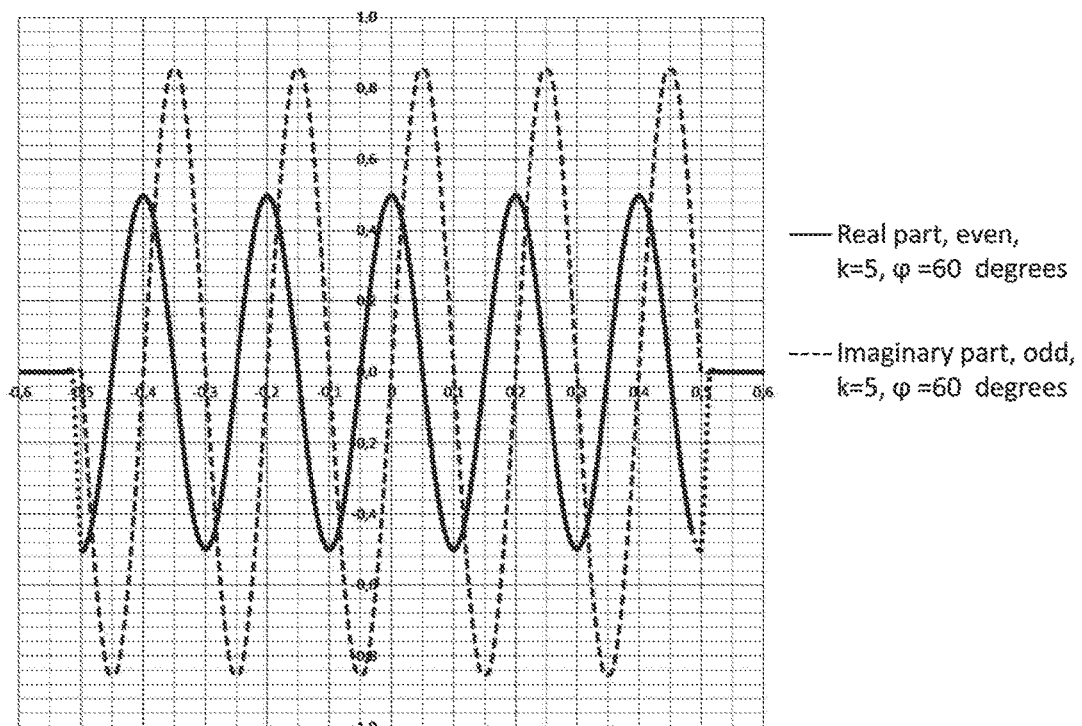
FIG. 5 schematically illustrates time behavior of a complex frequency function constituted by a real cosinusoidal function and an imaginary sinusoidal function.

Thence, each sample is constituted by a real part given by $a_k \cos \varphi_k$, and an imaginary part given by $a_k \sin \varphi_k$. The time representation of such a sample is given by one cosinusoidal function in the time window T, having an amplitude of $a_k \cos \varphi_k$, and one sinusoidal function having an amplitude of $a_k \cos \varphi_k$, as shown in FIG. 5 where time behavior of said complex frequency sample is illustrated.

Figure 6:
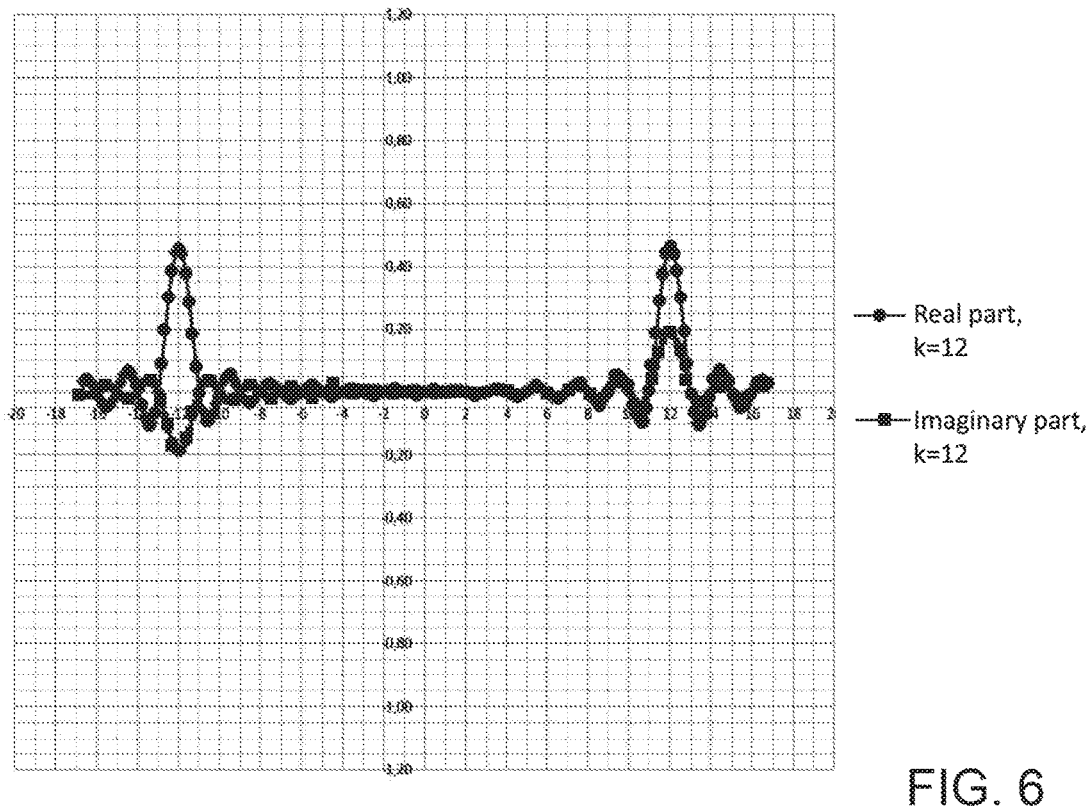
FIGS. 6 and 7 schematically illustrate complex frequency samples of a signal limited in time and of its corresponding analytical signal, respectively (assuming that the signal can be approximated as a band-limited signal too)
Figure 7:
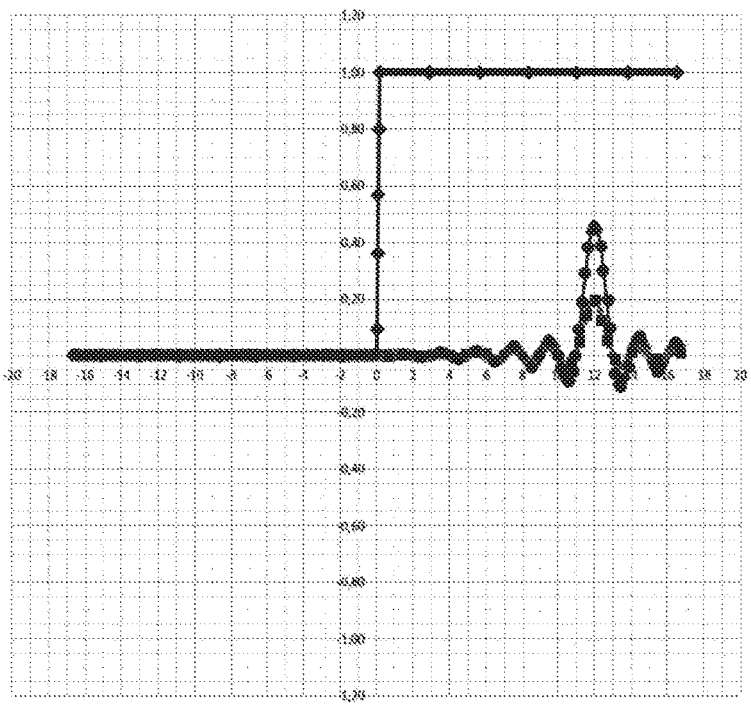

The frequency pattern is given by two couples of sinc functions, namely one for the real part and one for the imaginary part, as shown in FIGS. 6 and 7 which illustrate complex frequency samples of a signal limited in time and of its corresponding analytical signal, respectively (assuming that the signal can be approximated as a band-limited signal too).

As for analytical signals, the traditional Hilbert transform is applied in time, assuming that the total bandwidth of the signal can be considered limited and that the baseband signal has been shifted to a proper frequency such that to allow the full bandwidth to be on the positive frequency semiaxis (and, of course, replicated on the negative one). On the positive frequency semiaxis, with respect to the central frequency sample for k=0, frequency samples are complex and there results that $a_k e^{j\Phi_k} \neq a_{-k} e^{j\Phi_{-k}}$.

Taking into consideration a complex frequency sample related to a limited time window, it is possible to apply a second Hilbert transform to the function $X^+(f-f_0)$ in frequency domain (on the assumption that the signal is a limited time duration signal):

$$X_H^+(f - f_0) = \int_{-\infty}^{+\infty} \frac{X(\varphi)}{\pi(f - f_0 - \varphi)} d\varphi,$$

where the integral can be understood as the main Cauchy value.

Thence, the time function results to be:

$$x_H(t) = x(t) e^{j2\pi f_0 t}(u_0(t) - u_0(-t)),$$

where $u_0(t)$ and $u_0(-t)$ are the step functions for t>0 and t<0, respectively.

On the assumption that $$X(f)\big|_{f_k=\frac{k}{T}} = \frac{\sin[\pi(fT-k)]}{\pi(fT-k)},$$

then the time function is given by:

$$x(t) = e^{j2\pi k \frac{t}{T}}, \text{ for } |t| < \frac{T}{2}, \text{ and}$$

$$x(t) = 0, \text{ for } |t| \geq \frac{T}{2}.$$

Thence, the time transform of the frequency Hilbert transform results to be:

$$x(t)(u_0(t) - u_0(-t)) = e^{j2\pi k \frac{t}{T}} \text{ for } 0 < t < \frac{T}{2},$$

$$x(t)(u_0(t) - u_0(-t)) = -e^{j2\pi k \frac{t}{T}} \text{ for } -\frac{T}{2} < t < 0, \text{ and}$$

$$x(t)(u_0(t) - u_0(-t)) = 0 \text{ for } |t| \geq \frac{T}{2}.$$

Figure 8:
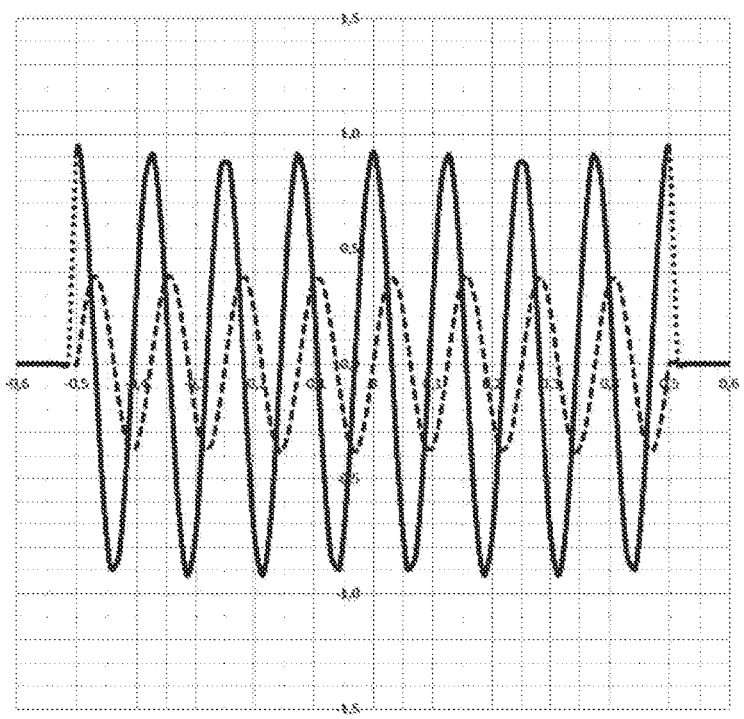
FIGS. 8 and 9 schematically illustrate time inverse Fourier transform of a complex frequency function and time inverse Fourier transform of its frequency Hilbert transform, respectively.
Figure 9:
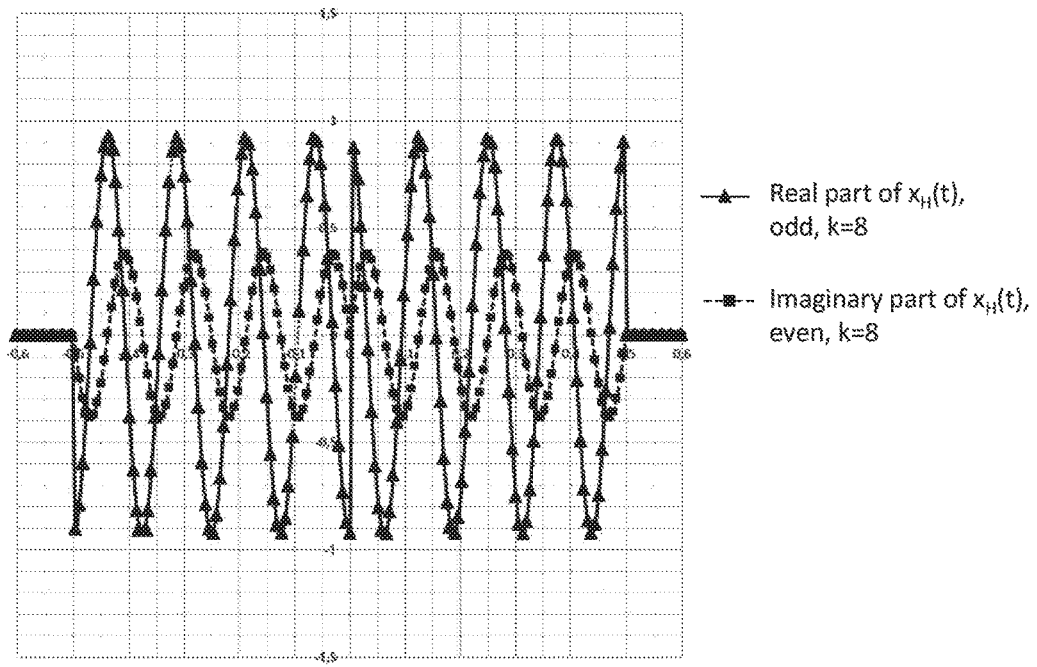

In this respect, FIGS. 8 and 9 show time inverse Fourier transform of a complex frequency function and time inverse Fourier transform of its frequency Hilbert transform, respectively.

The analysis of properties of this signal family is thence based on a sequential application of one time Hilbert transform to get the analytical signal and one frequency Hilbert transform to get the twisted wave signals, which are orthogonal to the original samples.

The process just described is similar but somewhat substantially different from time twist case. In fact, as described in WO 2015/067987 A1, in time twist the Hilbert transform is applied twice in time: the first time Hilbert transform is used to get the analytical signal, and the second time Hilbert transform is used to create the family of twisted waves orthogonal to the original samples.

Figure 10:
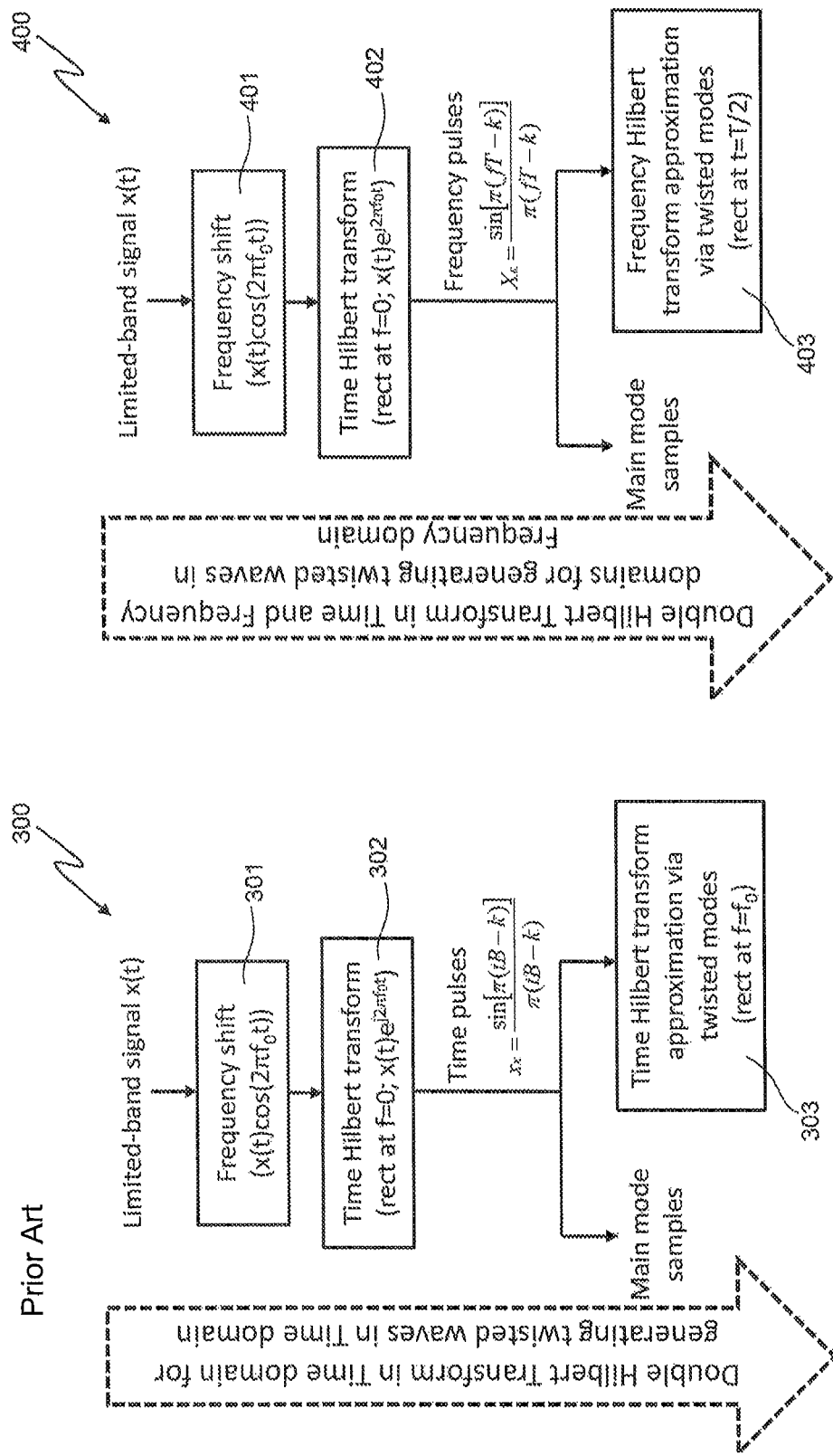
FIG. 10 schematically illustrates a comparison between a process for generating twisted waves in time domain according to WO 2015/067987 A1, and a process for generating twisted waves in frequency domain according to the present invention.

In this respect, FIG. 10 schematically shows a comparison of the processes for generating twisted waves in time domain according to WO 2015/067987 A1 and in frequency domain according to the present invention.

In particular, as shown in FIG. 10, both the process according to WO 2015/067987 A1 (denoted as a whole by 300) and the process according to the present invention (denoted as a whole by 400) are applied to a limited-band signal x(t) and include:

applying to the limited-band signal x(t) a frequency shift (block 301 and 401, respectively); and performing a time Hilbert transform of the frequency-shifted signal to get the analytical signal (block 302 and 402, respectively).

Instead, the two processes are differentiated by the fact that:

the process 300 according to WO 2015/067987 A1 exploits an approximation in time domain of the Hilbert transform of the analytical signal to create time twisted waves (block 303); and the process 400 according to the present invention exploits an approximation in frequency domain of the Hilbert transform of the analytical signal to create frequency twisted waves (block 403).

Figure 11:
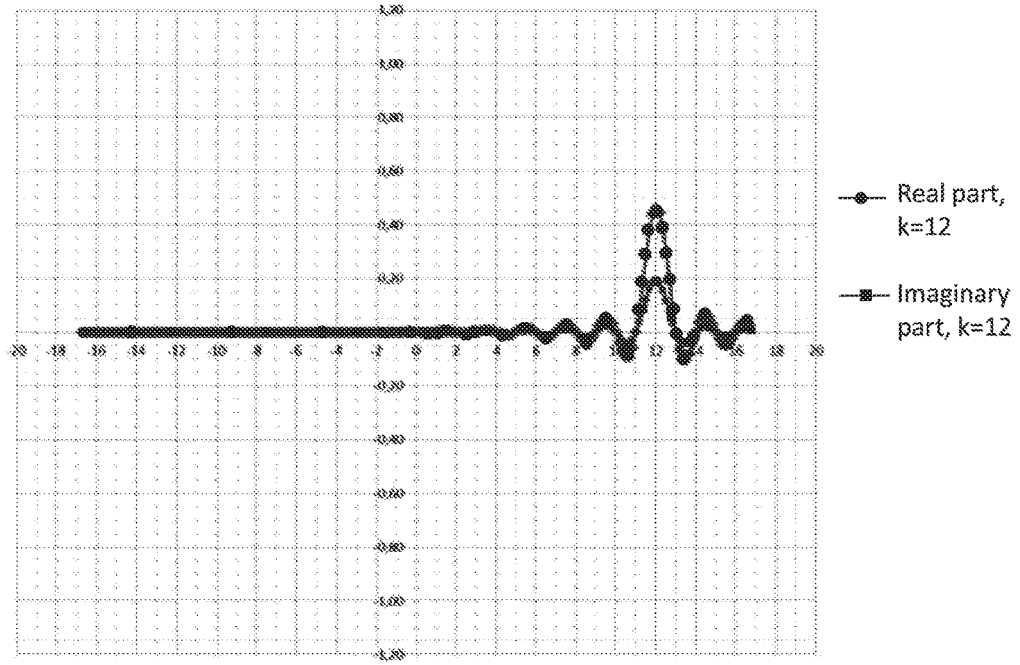
FIGS. 11 and 12 schematically illustrate a complex frequency function of an analytical signal and its Hilbert transform in frequency domain, respectively.
Figure 12:
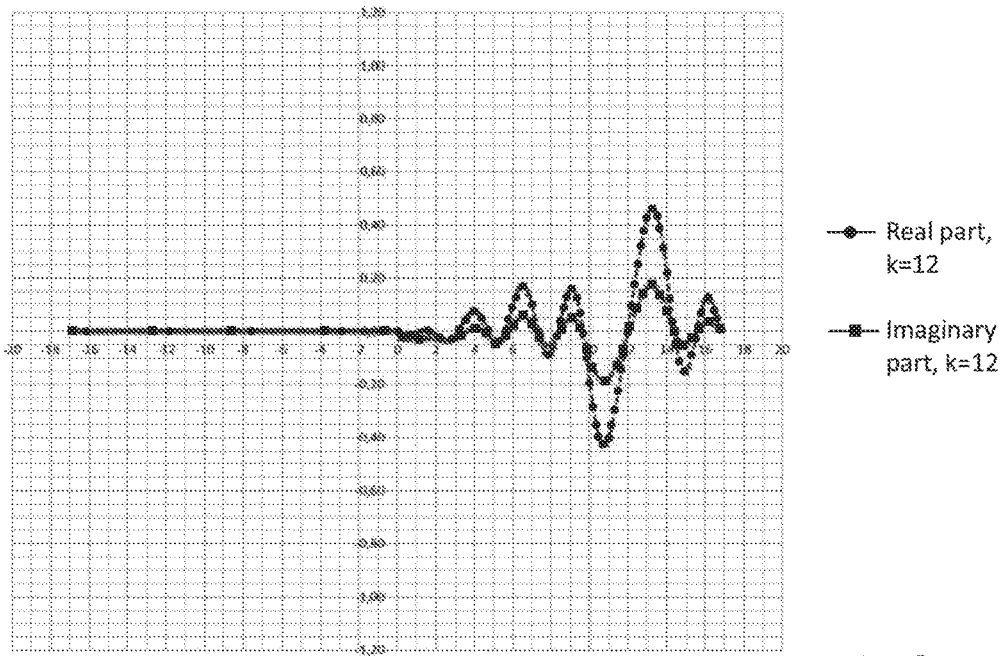

In detail, as for the process 400 according to the present invention, the Hilbert transform in frequency domain can be seen as an inverse Fourier transform of the analytical signal previously described. In this respect, FIGS. 11 and 12 show complex frequency function of the analytical signal and its Hilbert transform in frequency domain, respectively.

Figure 13:
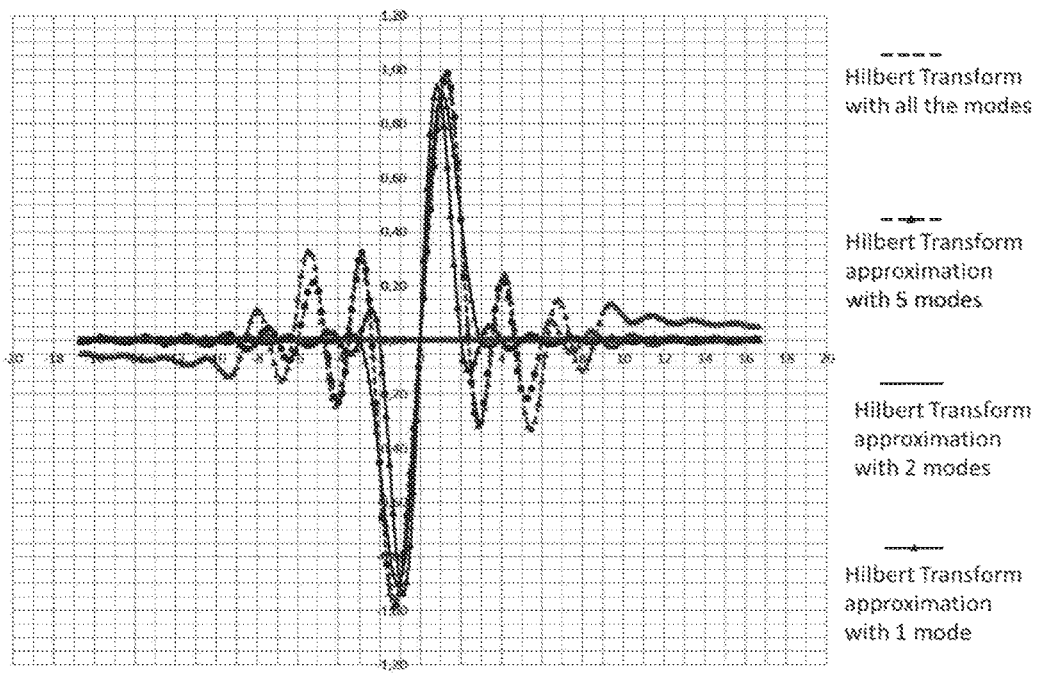
FIG. 13 schematically illustrates frequency Hilbert transform and approximations of the latter obtained by using, respectively, one, two, and five twisted modes.

The frequency Hilbert transform increases the bandwidth necessary to represent the signal, due to the presence of a discontinuity in the time function at the origin (i.e., taking into consideration the meaning of the main Cauchy value, the position of the symmetry/asymmetry axis of the integration). This aspect is similar to the situation of the Hilbert transform in time domain, and can be handled by considering a development into a series of orthogonal modes. In this respect, FIG. 13 shows frequency Hilbert transform and approximations of the latter obtained by using, respectively, one, two, and five twisted modes.

Figure 14:
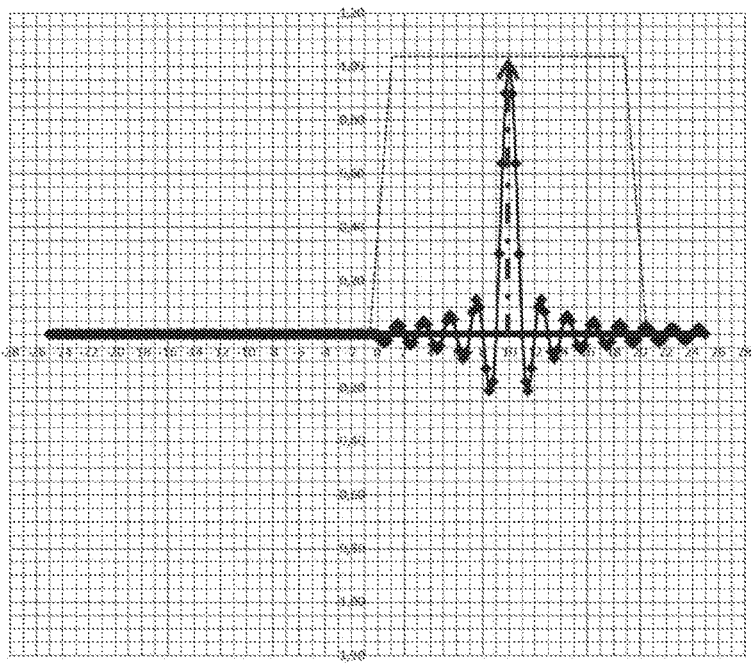
FIGS. 14, 15 and 16 schematically illustrate frequency behavior of three different twisted modes.
Figure 15:
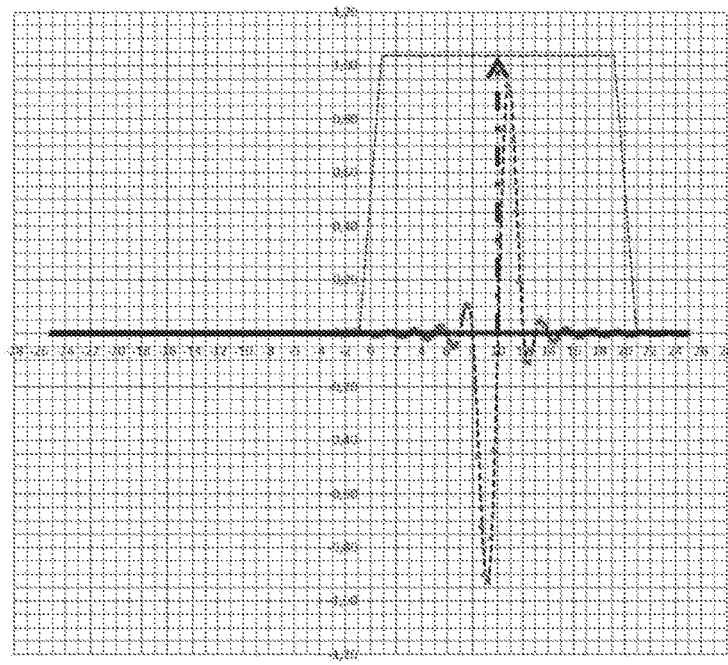
Figure 16:
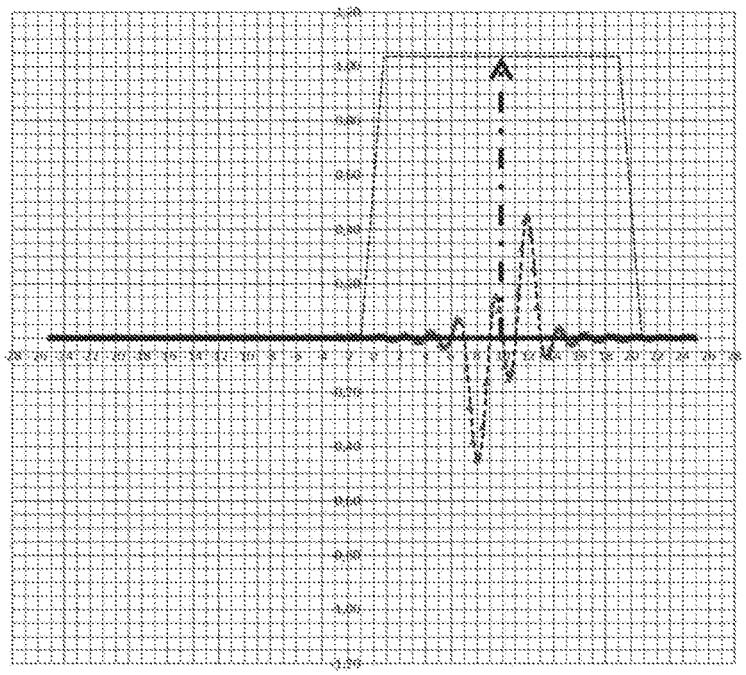

Each mode higher than mode 0 is represented by a couple of odd pulses in frequency domain, centered with respect to the frequency $f_0$. In this respect, FIGS. 14, 15 and 16 show frequency behavior of the modes 0, 1 and 2, respectively. The modes are mutually orthogonal, but the orthogonality between each of them and the main mode frequency pulses is given by the symmetry property of the full bandwidth and this could be defined as a synoptic orthogonality.

Similarly to the time domain case, the above property is similar to interferometry, which is a property depending on the space geometry and not directly on the signal.

Therefore, frequency domain can be assimilated to a sort of space (specifically, a "frequency space"), similarly to the situation of the time twist where the time is considered a space (specifically, a "time space"), with additional degrees of freedom.

It is important to note a basic difference between time and the frequency pulses: time pulses are real, while frequency pulses are in general complex.

Therefore, the frequency twist shows a more robust capability to carry an additional information channel. In fact, while for time twist it is necessary to increase the nominal Nyquist bandwidth (approximately of 33%), the frequency twist can work without this limitation.

Figure 17:
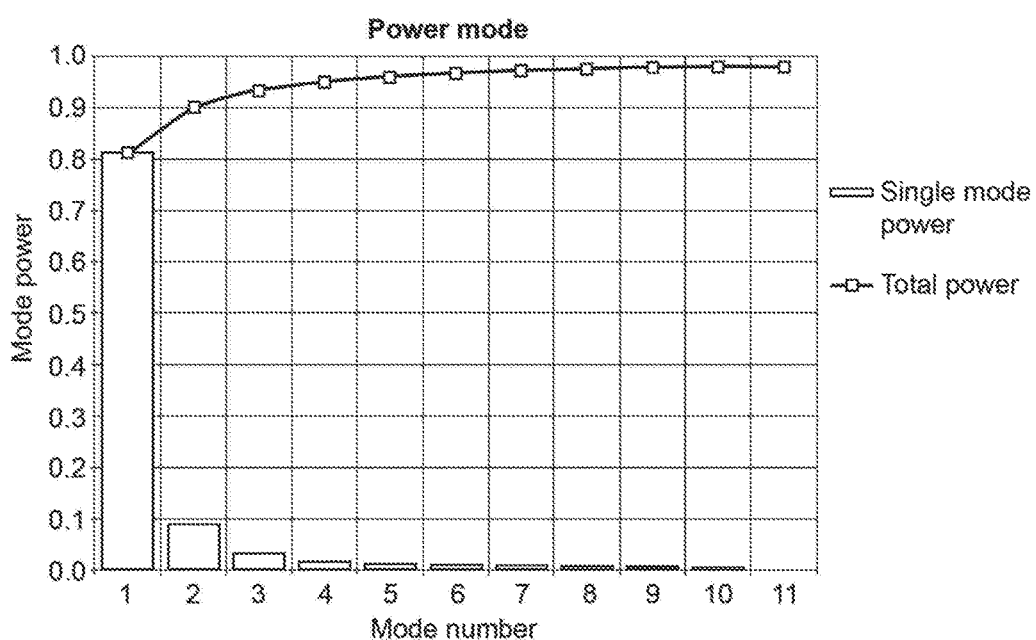
FIG. 17 schematically illustrates powers associated with twisted modes used to develop frequency Hilbert transform.

The frequency Hilbert transform allows, theoretically, to maintain all the information content of the original signal. Therefore, also the twisted mode development up to infinity of the frequency Hilbert transform allows, theoretically, to maintain all the information content of the original signal. Each mode contributes to the information content proportionally to the respective power of the mode (assuming that the overall power of the signal is equal to one). In this respect, FIG. 17 schematically shows the respective power (i.e., information content) associated with each mode up to the eleventh mode. From FIG. 17 it can be noted that with the first two or three modes it is possible to maintain about 90% of the information content of the original signal with a potential frequency reuse of 1.9. The use of additional higher-order modes results in an increase in implementation complexity rather than in an effective improvement in the performances.

Generation of frequency twist, in analogy with time twist generation, is organized by associating the complex symbol value $a_k e^{j\Phi_k}$ to a set of frequency pulses, properly phase-shifted and arranged in frequency domain.

For the sake of simplicity, it is considered to operate in an OFDM signal structure, where the main signal is represented by the Inverse Fast Fourier Transform (IFFT) of the symbol time flow.

In addition to this frequency symbol set, it is added, for each mode, a set of frequency samples.

Modes ±1 are generated repeating the same symbol at 4 different frequencies $$\frac{1}{T}\left(\frac{1}{2}+k\right),$$

changing each time their phases according to $$e^{\pm jk\frac{\pi}{2}},$$

with k=0, 1, 2, 3. This means that the associated IFFT is the sum of 4 decimated IFFT, having only 1 row for each sample and each one is weighted by $$0.5 e^{\pm jk\frac{\pi}{2}}.$$

modes ±2 are generated repeating the same symbol at 8 different frequencies $$\frac{1}{T}\left(\frac{3}{4}+k\right),$$

changing each time their phases according to $$e^{\pm jk\frac{\pi}{4}},$$

with k=0, 1, . . . , 7. This means that the associated IFFT is the sum of 8 decimated IFFT, having only 1 row for each sample and each one is weighted by $$\frac{1}{\sqrt{8}} e^{\pm jk\frac{\pi}{4}}.$$

In general, modes ±N are generated repeating the same symbol at $2^{N+1}$ different frequencies $$\frac{1}{T}\left(\frac{2^N-1}{2^N}+k\right),$$

changing each time their phases according to $$e^{\pm jk\frac{\pi}{2N}},$$

with k=0, 1, . . . , $2^{N+1}-1$. This means that the associated IFFT is the sum of 4N decimated IFFT, having only 1 row for each sample and each one is weighted as $$\frac{1}{2^{\frac{N+1}{2}}}e^{\pm jk\frac{\pi}{2N}}.$$

In practical terms, phases can be simplified (in terms of implementation) assuming the same value each π/2, in this way the rotation can be represented by a smaller number of bits.

Figure 18:
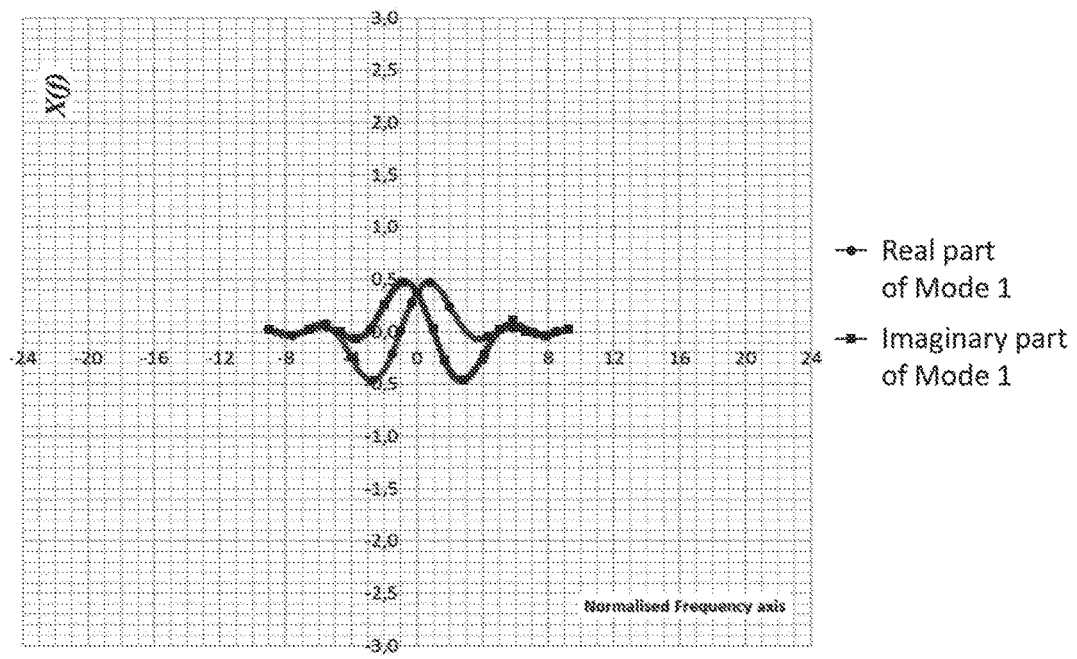
FIGS. 18 and 19 schematically illustrate frequency complex functions related to two orthogonal twisted modes.
Figure 19:
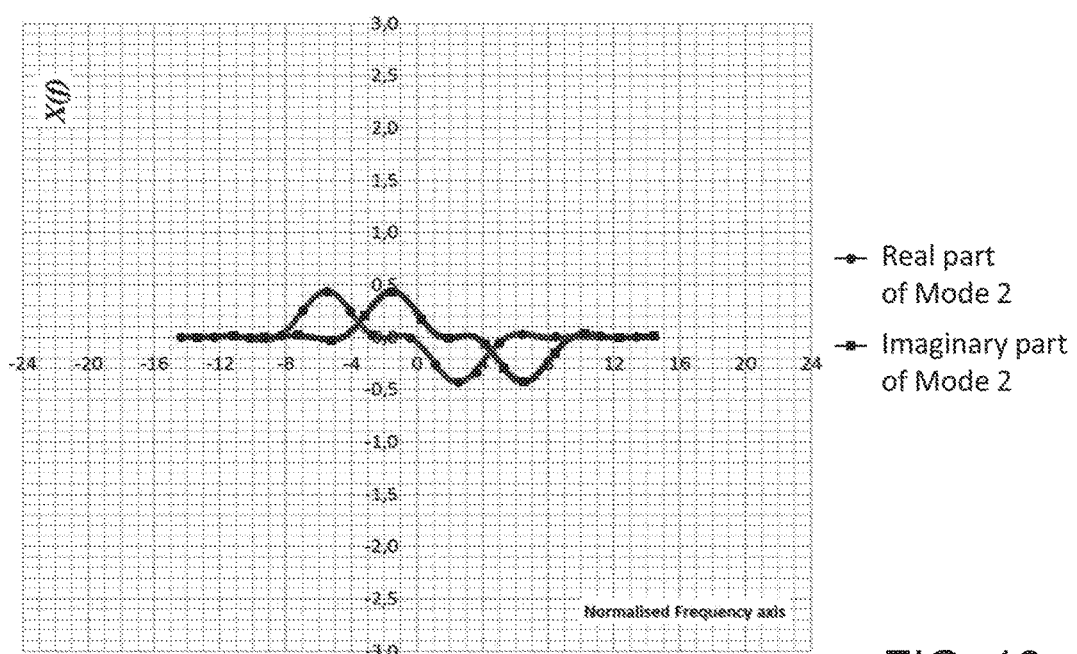

In this respect, FIGS. 18 and 19 show frequency twist complex functions for modes 1 and 2, respectively. From FIGS. 18 and 19 it can be noted that the bandwidth increases each time that the mode grows. This implies a sort of increased rigidity of the traditional OFDM structure.

Figure 20:
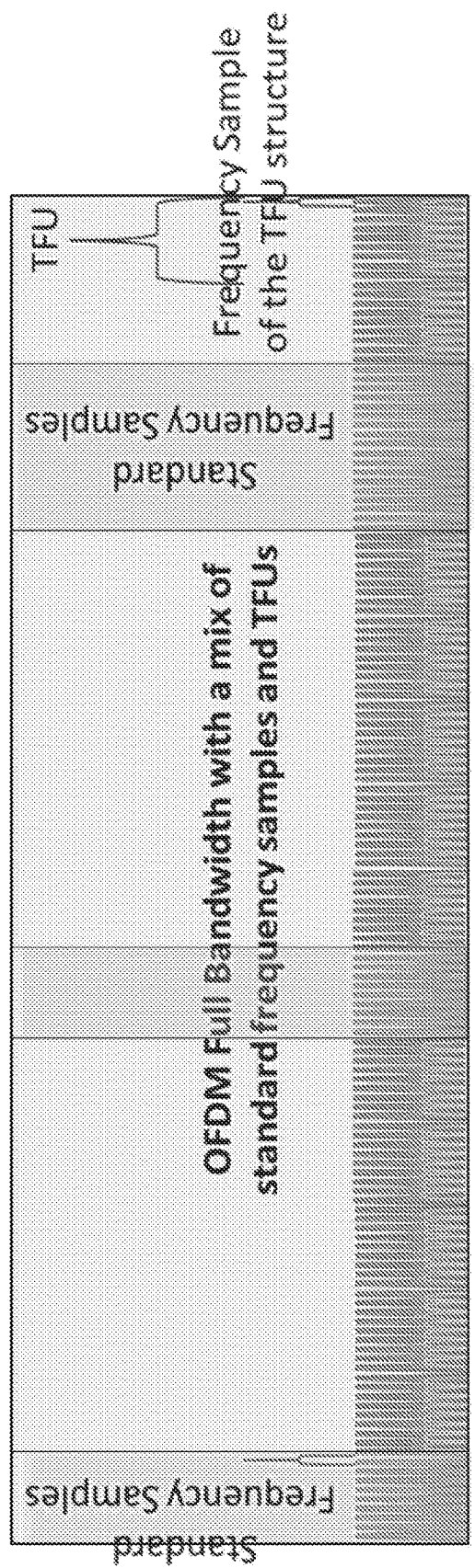
FIG. 20 schematically illustrates an OFDM super frame with additional Twisted frame Frequency Units (TFUs)

Then, let us take into consideration an OFDM signal architecture, which can be considered a sequence of frequency pulses having the shape of a sinc. In the same frequency band frequency twisted waves are added and these additional elements in the following will be called Twisted Frequency frame Units (TFUs). In this respect, FIG. 20 shows an OFDM super frame with additional TFUs.

The structure of a TFU is given by the superposition of the OFDM structure and of the structure of the twisted frequency modes previously defined.

The minimum length of a TFU bandwidth, where modes up to ±N are used, is given by:

$$\frac{2^{N+1}+1}{T},$$

where T is the time interval duration which is the inverse of the frequency pulse symbol bandwidth $B_S$ (i.e., $T=1/B_S$).

Figure 21:
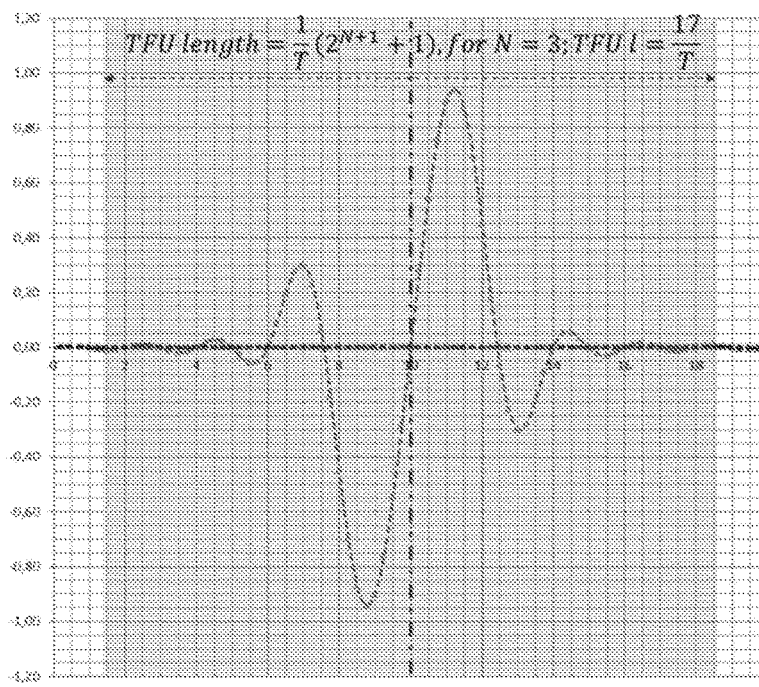
FIG. 21 schematically illustrates an approximation of the impulse response of the frequency Hilbert transform using three twisted modes.

In this respect, FIG. 21 show an approximation of the impulse response of the frequency Hilbert transform, which approximation uses three modes.

The mode structure in the TFU frame takes into account the length of each mode; therefore, using up to mode ±N, the number $M_{MFS}$ of the frequency samples of the main mode is:

$$M_{MFS}=2^{N+1}+1$$

It is worth recalling that, assuming $B_S=1/T$, the frequency samples of generic frequency twisted mode ±N are at frequencies $$\frac{1}{T}\left(\frac{2^N-1}{2^N}+k\right).$$

Moreover, the number of complex symbol values (or, at reception side, of complex unknowns) of the main mode n=0 is $M_{MFS}=2^{N+1}+1$, the number of complex symbol values (or, at reception side, of complex unknowns) of the modes +1 and −1 is $2^N$, the number of complex symbol values (or, at reception side, of complex unknowns) of the modes +2 and −2 is $2^{N-1}$, the number of complex symbol values (or, at reception side, of complex unknowns) of the modes +i and −i is $2^{N-i+1}$, and the number of complex symbol values (or, at reception side, of complex unknowns) of the modes +N and −N is $2^{N-N+1}=2$.

Therefore, the overall number $S_{TOT}$ of complex symbol values (or of complex unknowns) is given by:

$$S_{TOT}=(2^{N+1}+1)+\sum_{i=1}^{N}2^{N-i+1},$$

wherein the first addend represents the number $M_{MFS}$ of symbols (or, at reception side, of complex unknowns) of the main mode n=0, while the second addend (i.e., the summation) represents the number $S_{TOT}-M_{MFS}$ of symbols (or, at reception side, of complex unknowns) of all the other modes with n≠0.

The foregoing mathematical formula can be rewritten as:

$$S_{TOT}=1+\sum_{i=0}^{N}2^{N-i+1}=1+2^{N+1}\cdot\sum_{i=0}^{N}\left(\frac{1}{2}\right)^i.$$

Thence, since it is known that $$\sum_{i=0}^{N}x^i=\frac{x^{N+1}-1}{x-1}\text{ if }x\neq 1,$$

then it results that:

$$S_{TOT}=2^{N+2}-1.$$

The overlapping of frequency pulses associated with different symbols creates a special form of orthogonality, which depends on the structure of the TFUs. In this sense the TFUs represent a "frequency space" and the different signals are orthogonal in this space according to symmetry and antisymmetry features of the signal structure. This property can be seen as equivalent to the interferometry in the traditional geometrical space.

Anyway, even if the present invention deals with "frequency space", the procedure for determining the transmitted signals is performed in the time domain and not in the frequency domain.

Figure 22:
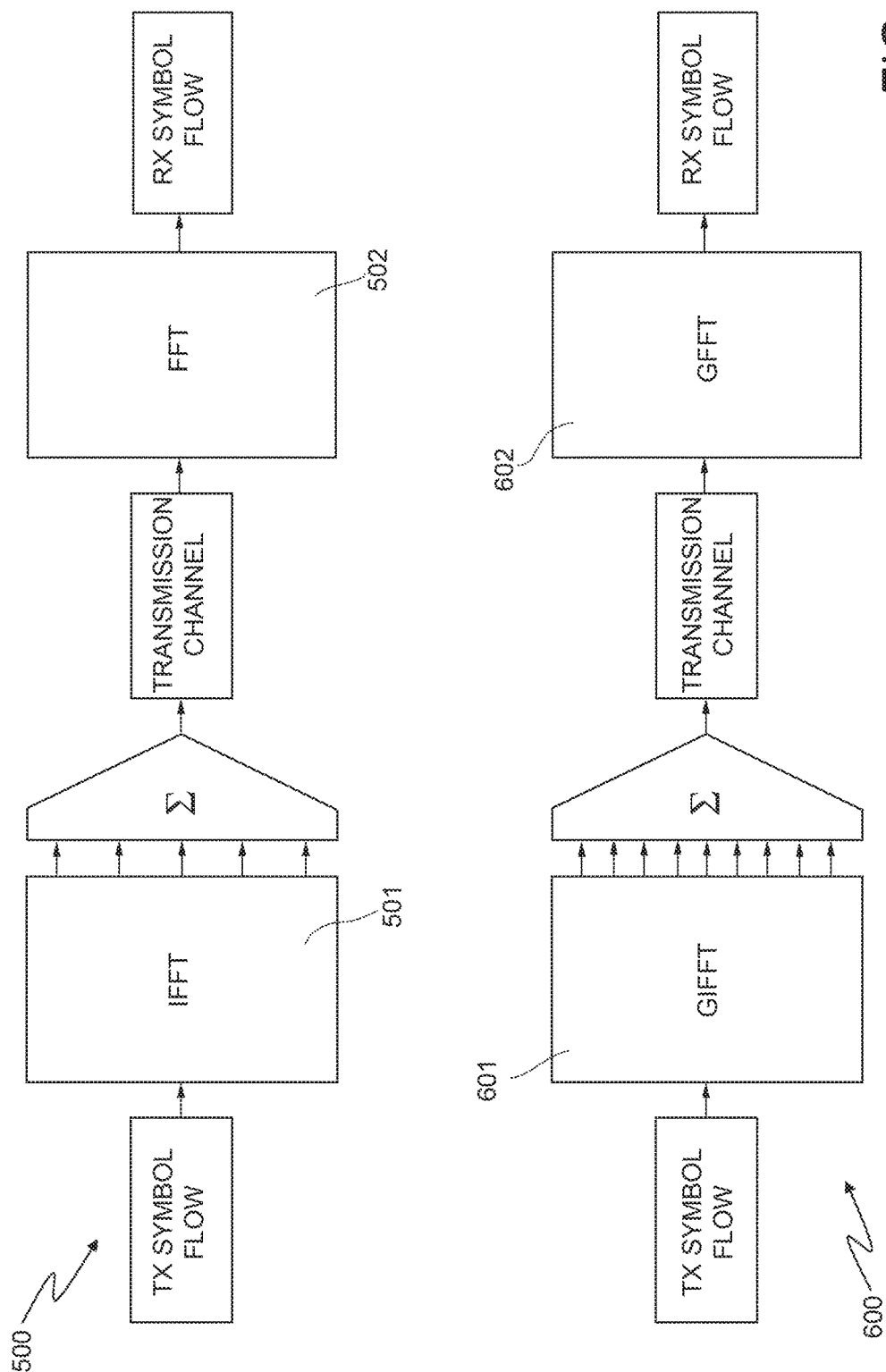
FIG. 22 schematically represents a radio communications method according to the present invention as a generalization of the traditional OFDM (or OFDMA) technique.

In particular, as shown in FIG. 22 which schematically represents the radio communications method according to the present invention (denoted as a whole by 600) as a generalization of the traditional OFDM (or OFDMA) technique (denoted as a whole by 500), the radio communications method 600 according to the present invention can be considered similar to the traditional OFDM (or OFDMA) technique 500, which, as is broadly known, comprises:
  at the transmission side, the conversion of a symbol serial time stream into a parallel independent frequency stream via an Inverse Fast Fourier Transform (IFFT) (block 501); and,
  at the reception side, the back-transformation into the original symbol serial time stream via a Fast Fourier Transform (FFT) (block 502).

Similarly, the radio communications method 600 according to the present invention exploits:
  at the transmission side, a "Generalized Inverse Fast Fourier Transform" (GIFFT) (block 601) which includes the implementation of the previously described frequency Hilbert transform approximation based on frequency twisted modes; and, at the reception side, a "Generalized Fast Fourier Transform" (GFFT) (block 602) which includes the extraction of the symbols carried by the frequency twisted modes.

Let us now consider the structure of the twisted signals in time domain and in frequency domain (on the assumption that for both the domains the first mode ±1 is used):

a time twisted mode ±1 signal can be expressed as $$x_{T\pm1}(t) = a_k e^{j\varphi_k} \left\{ \frac{1}{2}\left[rect\left(t-\frac{T}{2}\right) - rect\left(t-\frac{3T}{2}\right)\right] \pm \frac{j}{2}\left[rect(t-T) - rect\left(t-\frac{5T}{2}\right)\right]\right\}; \qquad a)$$

and a frequency twisted mode ±1 signal can be expressed as $$X_{F\pm1}(f) = a_k e^{j\varphi_k} \left\{ \frac{1}{2}\left[rect\left(f-\frac{B}{2}\right) - rect\left(f-\frac{3B}{2}\right)\right] \pm \frac{j}{2}\left[rect(f-B) - rect\left(f-\frac{5B}{2}\right)\right]\right\}.$$

The frequency twisted mode ±1 signal is analyzed in time domain thereby resulting that:

$$x_{F\pm1}(t) = \qquad b)$$
$$\frac{a_k e^{j\varphi_k}}{2}\left\{\left[e^{-j2\pi\left(f-\frac{B}{2}\right)t} - e^{-j2\pi\left(f-\frac{3B}{2}\right)t}\right] \pm j\left[e^{-j2\pi(f-B)t} - e^{-j2\pi\left(f-\frac{5B}{2}\right)t}\right]\right\}$$
$$\text{for } |t| < \frac{T}{2}.$$

Figure 23:
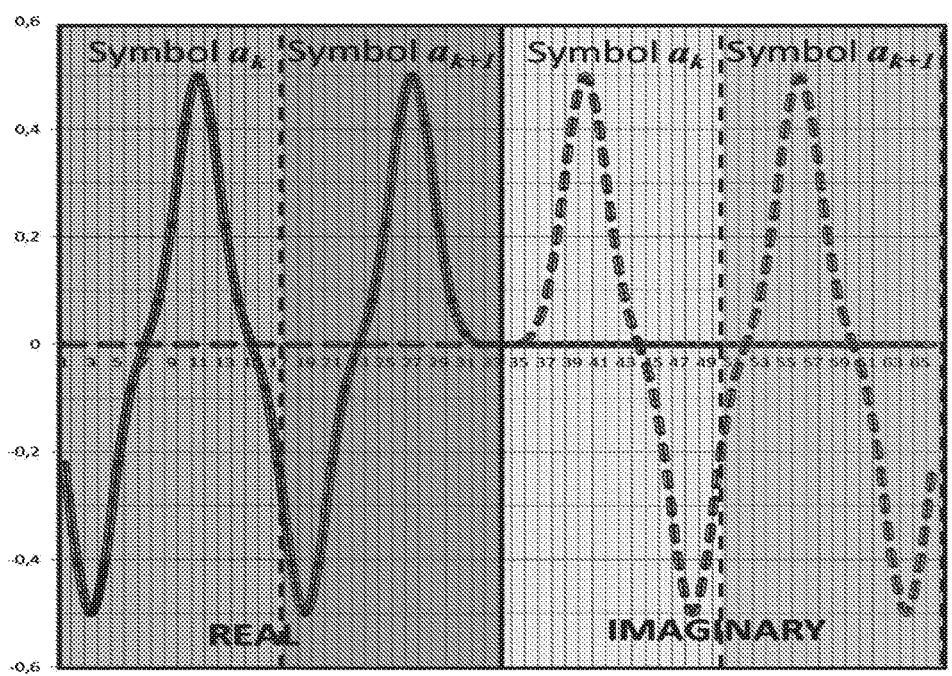
FIGS. 23 and 24 schematically illustrate time behavior of a time twisted mode +1 complex signal and of a frequency twisted mode +1 complex signal, respectively.
Figure 24:
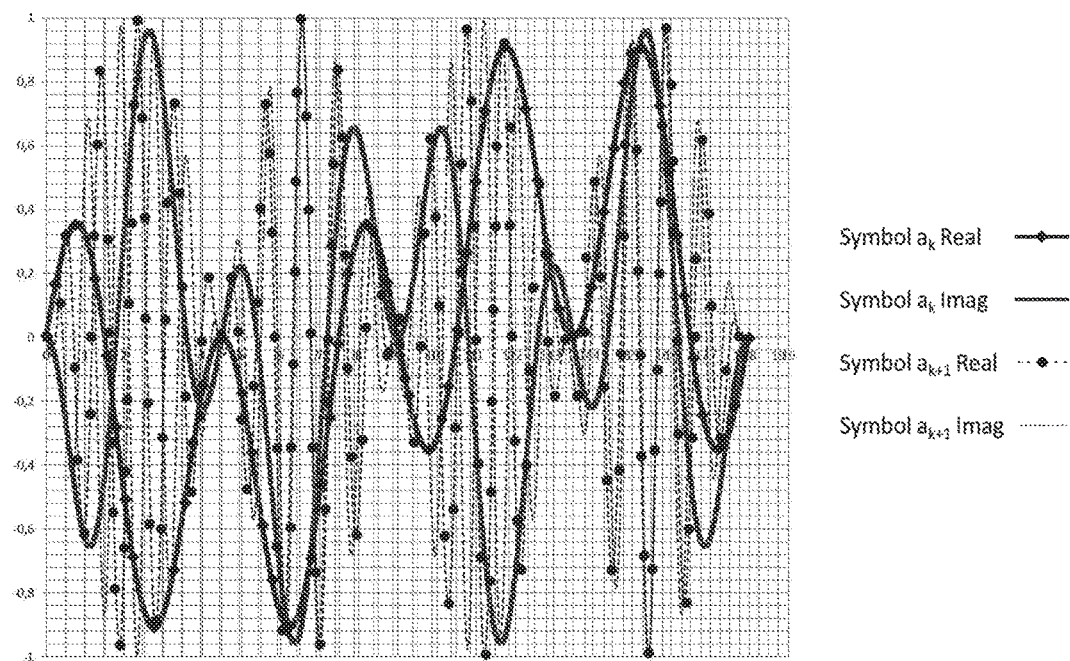

From a comparison of the signals a) and b) it is evident that the frequency twist is more robust in keeping the independence of the signal equation system. These feature is evident also from the time behavior of the twisted signals, as shown in FIGS. 23 and 24 which illustrate the time behavior of a time twisted mode +1 signal and of a frequency twisted mode +1 signal, respectively.

From an ideal point of view, the frequency Hilbert transform is applicable to a time-limited signal. Therefore, in order for the frequency Hilbert transform to be applicable to a continuous time symbol flow, it is necessary to apply said transform to successive time windows of said continuous time symbol flow and to identify the beginning and the end of each time window. This implies that the time window length is increased of a proper portion so as to render each time window detectable. This feature is similar to the bandwidth increase necessary in the case of time twisted waves.

Figure 25:
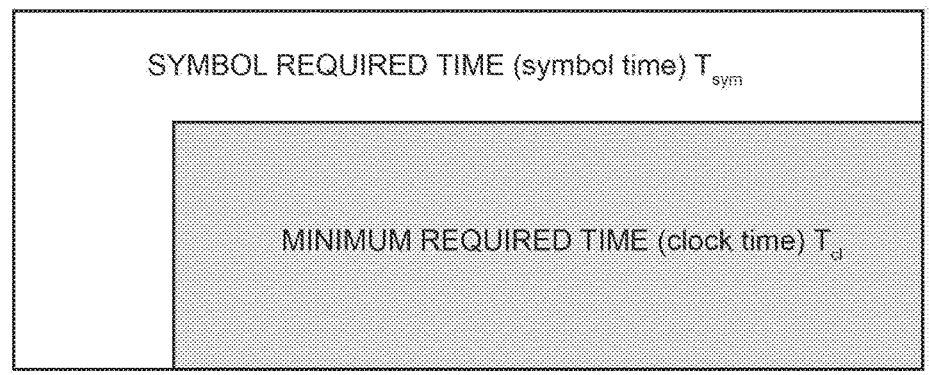
FIGS. 25 and 26 schematically illustrate symbol and clock time relation according to an aspect of the present invention.

Therefore, the frequency twist requires a time interval slightly larger than the minimum one required by the sampling theorem. This condition is equivalent to consider a symbol duration $T_{sym}$ longer than the system clock duration $T_{cl}$, as schematically illustrated in FIG. 25.

The above condition implies that, for instance, every 18 frequency bands an additional one is necessary and that, as a consequence, the bandwidth efficiency is given by $$\frac{18}{19} \cong 0.95.$$

Figure 26:
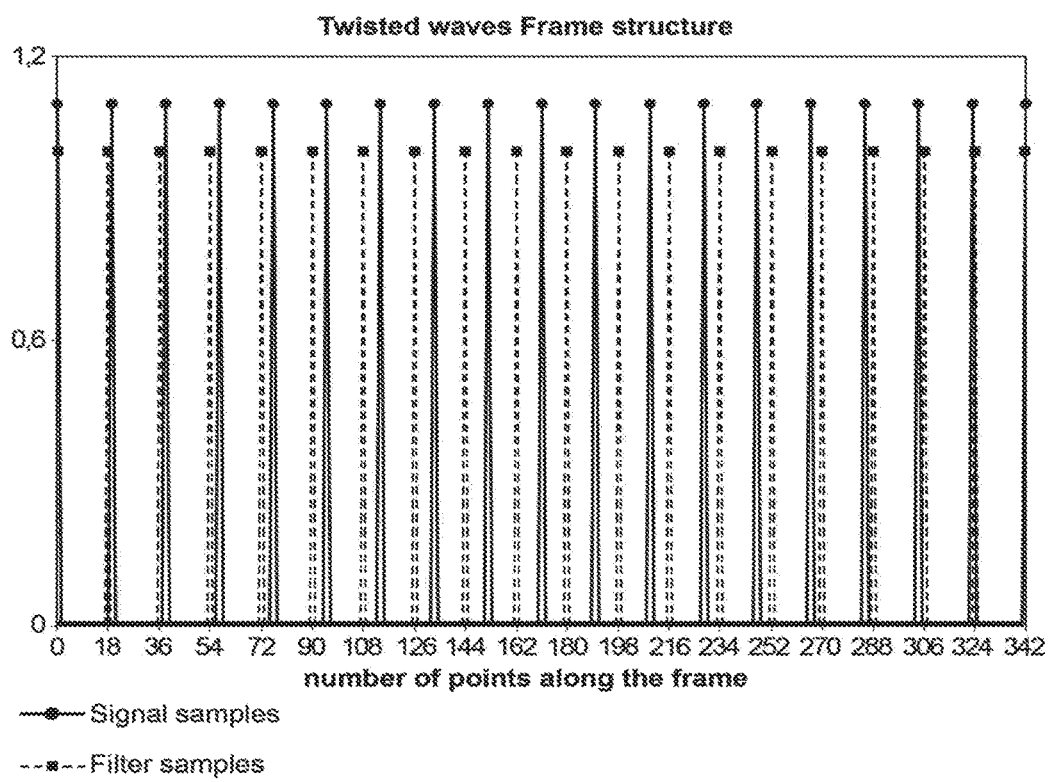

In this respect, FIG. 26 show symbol and clock period relation in the case of 18 signal samples and 19 filter samples per frame.

An interesting aspect of this condition applied to the frequency twisted waves is that it can be interpreted as equivalent to the well-known cyclic prefix already used with the OFDM technique.

For multiple path transmission the delay spread is generated by the set of different paths between the transmitter and receiver when those paths have different delays.

As an example, a signal following a direct line-of-sight path would arrive before a different version of the same signal which is reflected by a distant building.

Time domain receivers typically synchronize with each delay spread component and adjust their individual timings before combining the received signals.

When using a rake receiver, each finger belonging to the rake receiver synchronizes itself with a specific delay spread component. The number of delay spread components which can be combined is, thence, limited to the number of rake fingers. Any delay spread component which is not combined appears as interference.

LTE receivers do not need to synchronize themselves with individual delay spread components, i.e., it is not necessary to adjust the timing of delay spread components, nor it is necessary to do any combining of delay spread components. An LTE receiver can operate directly on the aggregate received signal without considering delay spread components.

The cyclic prefix represents a guard period at the start of each OFDMA symbol which provides protection against multi-path delay spread. The cyclic prefix also represents an overhead which should be minimized.

The duration of the cyclic prefix should be greater than the duration of the multi-path delay spread.

Figure 27:
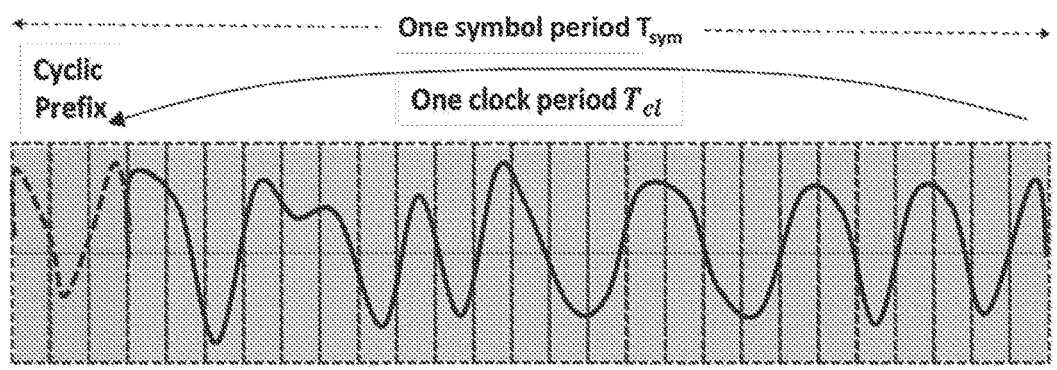
FIG. 27 schematically illustrates a traditional scheme of cyclic prefix for OFDM-OFDMA.

LTE specifies both normal and extended cyclic prefix lengths. The normal cyclic prefix is intended to be sufficient for the majority of scenarios, while the extended cyclic prefix is intended for scenarios with particularly high delay spread. Durations for the normal and extended cyclic prefix vary from 7% in the standard case up to 25% in the extended case. The cyclic prefix is generated by copying the end of the main body of the OFDMA symbol at the beginning, as shown in FIG. 27 which illustrates the traditional scheme of cyclic prefix for OFDM-OFDMA.

The signal is always continuous at the interface between the cyclic prefix and the main body of the symbol. This results from the main body of the symbol always including an integer number of subcarrier cycles.

Figure 28:
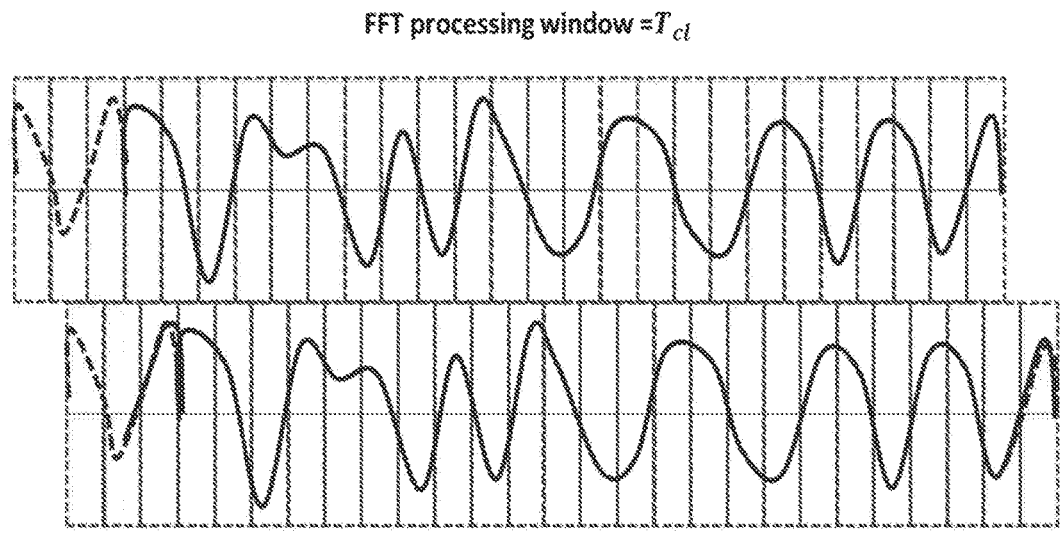
FIG. 28 schematically illustrates an example of two delay spread components with cyclic prefix.

FIG. 28 shows an example of 2 delay spread components. The second delay spread component is received later than the first delay spread component. An FFT processing window is defined at the receiver:

the processing window captures the main body of the OFDMA symbol belonging to the first delay spread component; the cyclic prefix belonging to the first delay spread component is discarded;

the processing window captures part of the cyclic prefix and the majority of the main body of the OFDMA symbol belonging to the second delay spread component; sections of the cyclic prefix and main body of the OFDMA symbol which fall outside the processing window are discarded; and, in the extreme case, where the delay spread is equal to the duration of the cyclic prefix, the FFT processing window fully captures the cyclic prefix belonging to the delay spread component and discards a section of the main body of the ODFMA symbol which has a duration equal to the cyclic prefix.

The time domain representation of each delay spread component within the processing window is different, however, the frequency domain representation of each delay spread component within the processing window is identical.

Figure 29:
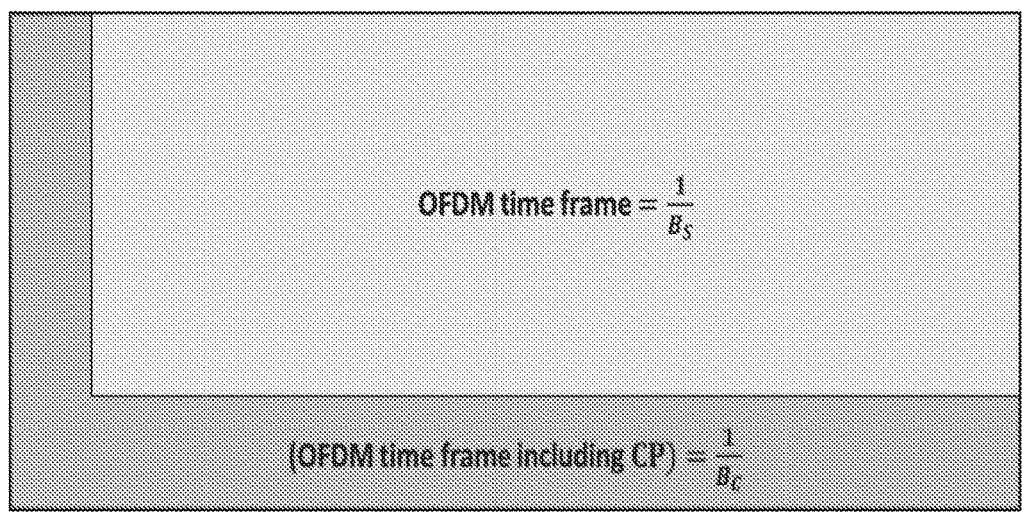
FIG. 29 schematically illustrates time frame duration increase due to cyclic prefix.

Let us now come back to the description of the present invention and let us assume that modes up to N=±2 are used, then the band occupied by the TFU configuration is given by $(2^{2+1}+1)=9$ frequency slots. To this TFU corresponds a Twisted Time frame Unit (TTU), which is increased to avoid time duration ambiguities. If one half slot is considered, the TTU increases of $1/(2B_{sym})$ and the total length of the TTU is $9.5/B_{sym}$. In this respect, FIG. 29 shows time frame duration increase due to cyclic prefix (CP).

This increase is much lower than the one required by OFDMA. This implies that in practical system there is no additional loss for including frequency twisted waves in the OFDM (or OFDMA) super frame.

The increase in time interval duration creates automatically a replica of the signal at the beginning of the time interval itself, without any change in the occupied frequency bandwidth.

This approach is, thence, much more interesting for the understanding of the physical meaning of the cyclic prefix, than the ordinary explanation about its use.

Figure 30:
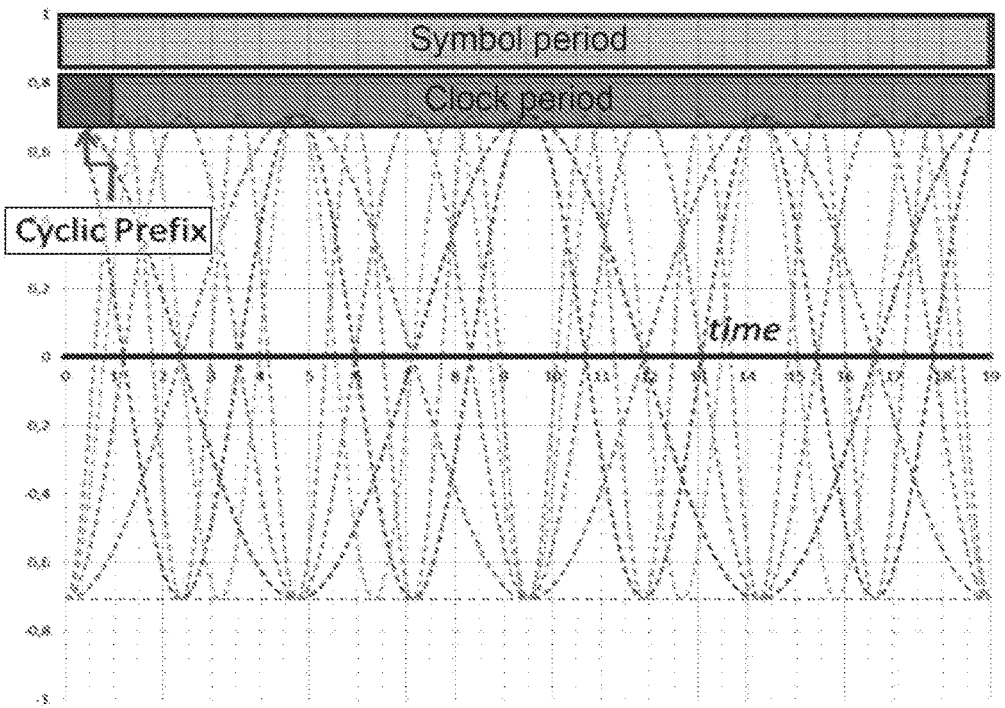
FIGS. 30 and 31 schematically illustrate time behavior of main mode and twisted modes, respectively, when a cyclic prefix is used.

Considering sampling in frequency domain at a symbol rate slightly smaller than the clock rate, the signal in time domain, on the assumption that only the main mode is used, has the time behavior shown in FIG. 30, where the sinusoid are not exactly a multiple of the symbol period: i.e., what the cyclic prefix is performing.

Figure 31:
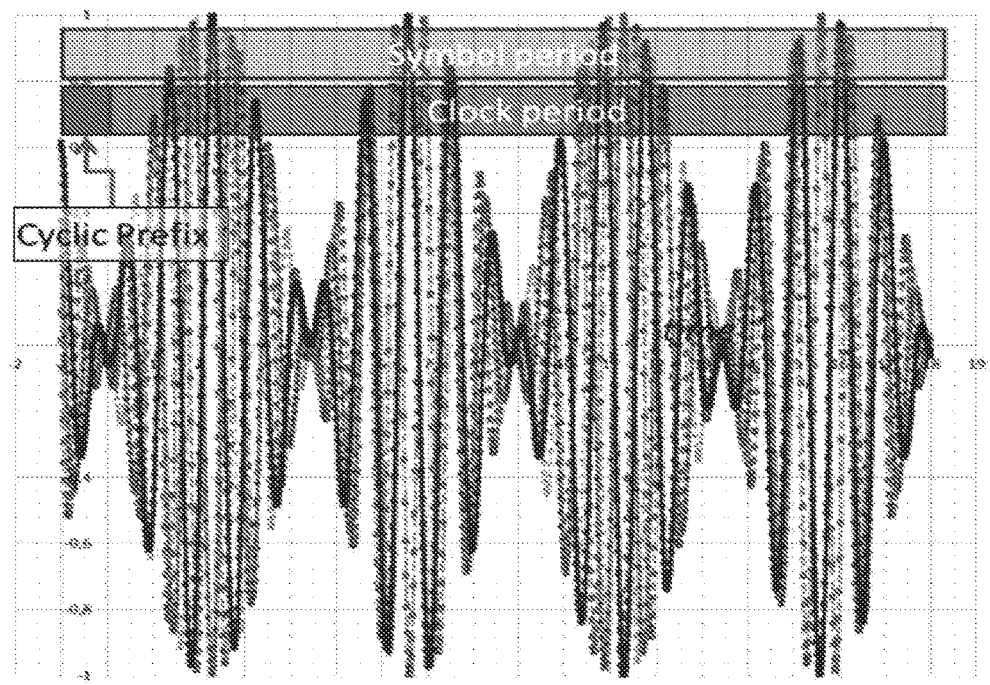

Adding the FTUs, the twisted mode signals present the same behavior of the main mode signal, as shown in FIG. 31.

Increasing the number of TTUs, the number of sinusoidal signal increases, but the ratio between $T_{cl}$ and $T_{sym}$ remains unchanged.

The OFDM-twisted frequency has two hierarchical levels:
 the former is related to the TTUs structure; and
 the latter is related to the assembly of the TFUs constituting the OFDM structure.

Both the levels have the same time duration and the difference is given by the component frequency blocks:
 each TFU corresponds to a number of samples defined by the twisted frequency structure, which introduces additional frequency samples located between the main frequency samples;
 the super frame structure is a set of TTUs, centered at the proper frequency, and a set of traditional OFDM frequency samples, if wished;
 the standard frequency samples can simplify the process of synchronization and phasing.

In order to consider the impact of thermal noise on the twisted waves, it is important to consider what happens on the time twisted waves, because there is a very interesting difference between the two families of twisted waves, which can have important applications in telecommunications, especially in the case of mobile LTE ones.

The noise level for the time twisted waves can be represented as divided into two parts:
 a first part related to the symbol rate bandwidth; and
 a second part related to the difference between the symbol rate and the clock bandwidth.

Figure 32:
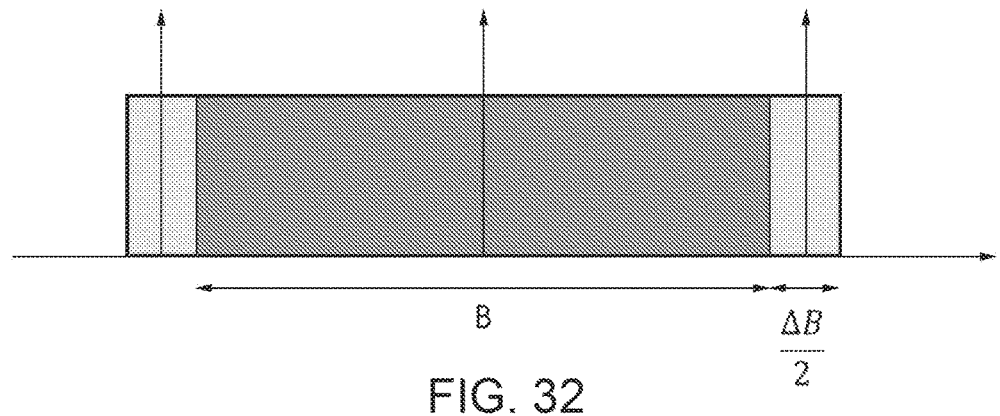
FIG. 32 schematically illustrates noise bandwidths for time twisted waves.

In this respect, FIG. 32 schematically illustrates noise bandwidths for time twisted waves: one defined according to minimum Nyquist bandwidth, the other related to the bandwidth increase for solving ambiguity aspects.

The above noise structure can be written as:

$$n_t(t)e^{j2\pi f_0 t} = n_{intB}(t)e^{j2\pi f_0 t} + \frac{1}{\sqrt{2}}n_{ext}(t)\left[e^{j2\pi(f_0+\frac{B+\Delta B/2}{2})t} + e^{j2\pi(f_0-\frac{B+\Delta B/2}{2})t}\right],$$

where $n_{intB}(t)$ denotes the noise part related to the symbol rate bandwidth, and $n_{ext}(t)=n_{ext\Delta B}(t)e^{j\varphi_{\Delta B}(t)}$ denotes the additional noise part due to the need of avoiding ambiguities on the symbol rate phasing.

$n_{intB}(t)$, when sampled at the symbol rate, is an even function (no information on the odd sampling).

Moreover, $$\sqrt{2}\, n_{ext\Delta B}(t)e^{j2\pi f_0 t}\cos\left[2\pi\left(\frac{B+\Delta B/2}{2}\right)t + \varphi_{\Delta B}(t)\right]$$

causes an additional contribution on the even and odd components.

With reference to FIG. 32, the noise in the Nyquist band can be represented by a sinc time pulse, which is an even function, while the two sidebands can be represented by an even and an odd component.

In terms of relation between the noise components, it can be written:

$$\frac{\text{noise}_{even}}{\text{noise}_{odd}} \cong \frac{B+\Delta B}{\Delta B} = 1 + \frac{B}{\Delta B}.$$

Considering the above for a simplified rect filter, the odd modes can be presented as:

$$\text{POWER MODES}_N = 2\sum_{k=1}^{N}\left(\frac{2}{k\pi}\right)^2,$$

for the first modes ±1 there results $$\frac{8}{\pi^2} \cong 0.81;$$

$$\left(\frac{C}{N}\right)_{odd} = \frac{0.81\Delta B}{B+\Delta B}\sigma_t,$$

for a bandwidth increase of 1 over 18 there results $$\left(\frac{C}{N}\right)_{odd} = -11.8 + \sigma_{tdB} dB = -11.8 + \left(\frac{C}{N}\right)_{even} dB;$$

the 11.8 dB term can be considered as the minimum gain against unwished interferences.

Figure 33:
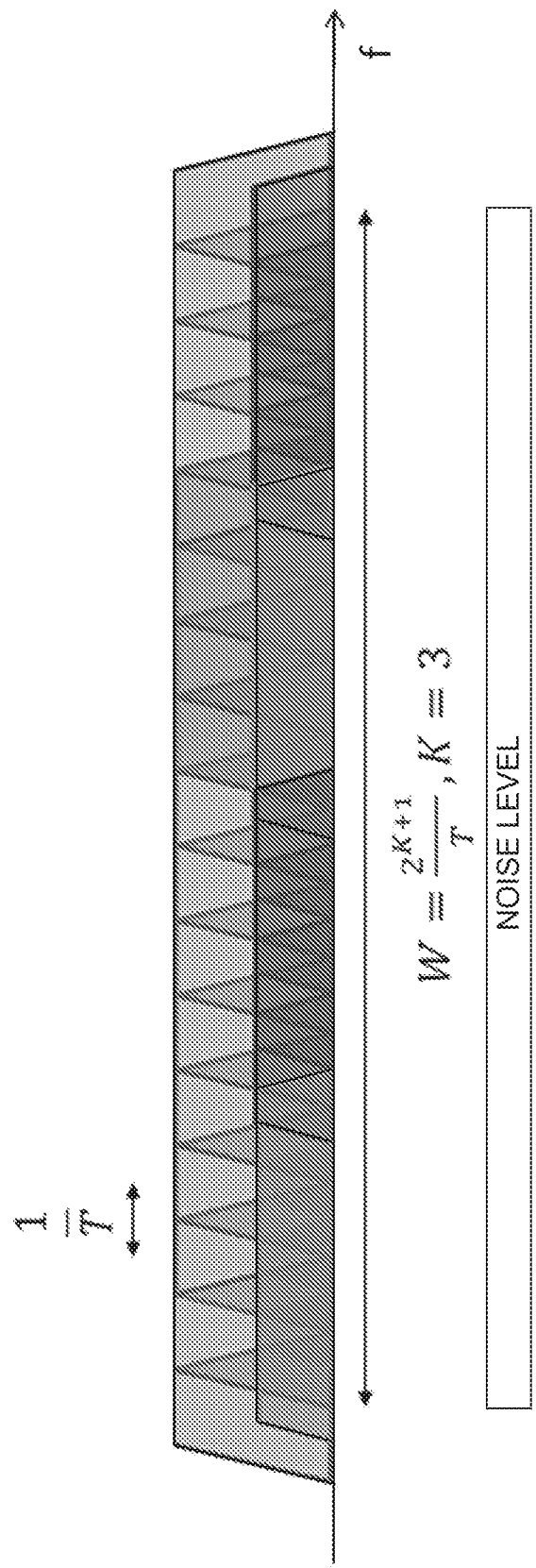
FIG. 33 schematically illustrates noise impact in the case of frequency twisted waves.

Instead, as for the case of frequency twisted waves, the noise spectrum occupies the bandwidth W and there is not any possibility of separating, in the time domain, its even and odd components for a single frequency pulse, as shown in FIG. 33 (which schematically illustrates noise impact in the case of frequency twisted waves).

In fact, in the time domain the noise signal samples are not associated with the main signal samples, but they are distributed all along the time interval, which is utilized for reconstructing the frequency sampling value (FFT). Therefore it is not possible to associate the main contribution of the noise to the main samples and there is no additional advantage for higher modes, as in the case of time twist.

The twisted waves add independent communication channels, one for each mode, and the information capacity increases with respect to the one of the single channel associated with the main mode.

The above is valid for both frequency twist and time twist, but it is very interesting to analyze the similarities and the differences in order to optimize the use of the two twisting processes according to the overall system conditions.

In general terms, it is possible to perform a system comparison on the basis of what presented in the foregoing and in WO 2015/067987 A1. In particular, the following TABLE I presents a comparison between time twisted waves and frequency twisted waves at system level, wherein supplementary references are provided for single carrier case and OFDM case.

TABLE I

| Parameter assuming as reference S/N$_{thermal}$ = 13.9 dB QPSK | Time Twist (2 modes) | Frequency Twist (2 modes) | Single carrier | OFDM (parameters from LTE) |
| --- | --- | --- | --- | --- |
| Linearity (HPA output back-off - dB) | 1.5 | 4.5 | 1.5 | 4.5 |
| S/N with interference (dB) | 10 | 12.7 | 10.5 | 12.7 |
| Bandwidth increase (with respect to 1/T$_s$, including roll-off) | 33% | 0% | 12.5% | 0% |
| Time increase (with respect to 1/B$_s$) | 0% | 5% | 0% | 7-25% |
| Self-interference (dB) | −28 | −28 | −35 | −35 |
| Additional thermal noise | 0.5 | 0 | 0 | 0 |
| BER for main mode (no code) | 6 * 10$^{-3}$ | 1.2 * 10$^{-4}$ | 3 * 10$^{-3}$ | 1.2 * 10$^{-4}$ |
| BER for higher modes (no code) | 8 * 10$^{-4}$ | 1.2 * 10$^{-4}$ | NA | NA |
| Spectral efficiency (bit/s/Hz) | 2.5 | 3.1-2.5 | 1.8 | 1.9-1.5 |
| Shannon limit (one channel - bit/s/Hz) | 3.5 | 5.4 | 3.6 | 5.4 |
| Shannon limit for twist | 5.5 | 6.9 | 5.8 | 6.9 |

In summary, time twist operates better in those cases in which the amplifiers work closer to the saturation, while frequency twist operates better when linearity can be preserved. That is a general condition for standard transmission too. In fact, it is well known that, in the case of LTE, on the Forward link (i.e., from the Base Station to mobile device) OFDM is used, while on the Return link (i.e., from the mobile device to the Base Station) Single-Carrier FDMA is preferred.

Figure 34:
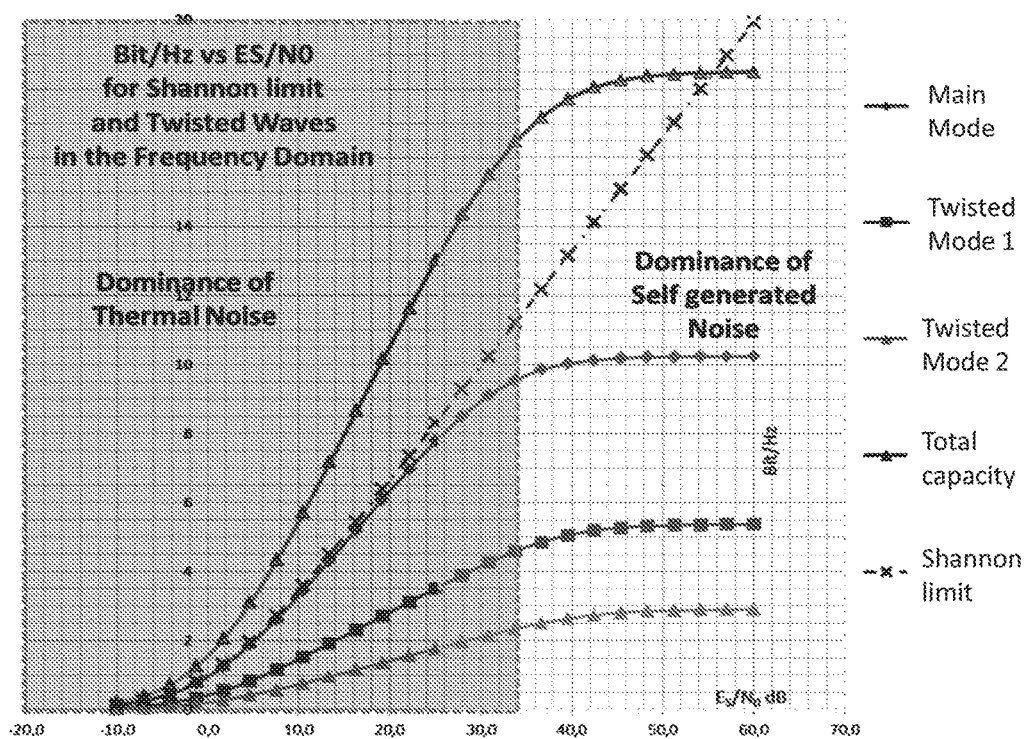
FIG. 34 schematically illustrates spectral efficiency as a function of the energy per symbol over noise density for frequency twisted waves.

FIG. 34 schematically shows (link) spectral efficiency (bit/s/Hz) as a function of the energy per symbol over noise density ($E_{symbol}/N_0$) for frequency twisted waves, on the assumption that there are present thermal noise and self-interference, which is the noise due to the interference between side-by-side frames.

In particular, FIG. 34 shows that the behavior (in terms of bit/s/Hz) of frequency twisted wave modes presents values that are always lower than the main mode, due to the absence of the noise reduction for twisted modes.

As previously explained, in the time domain the noise signal samples are not associated with the main signal samples, which are essentially complex values of frequency samples. They are distributed all along the time interval, which is utilized for reconstructing the frequency sampling value (FFT). Therefore, it is not possible to associate the main contribution of the noise with the main samples and there is no additional advantage for higher modes, as in the case of time twist.

As for the transmitter according to the present invention, the generation of transmission signals is based on the transformation of a symbol serial time flow frames into a parallel flow for each frame, which is equivalent to the generation of a number of sinusoidal signal in the time window frame.

This process is known and used for OFDM (or OFDMA) architecture; it is equivalent to an IFFT operation. In the case of OFDM, the frequency samples are spaced according to the sampling theorem applied to the frequency domain.

When using frequency twisted waves, it is necessary to oversampling the overall frequency band via the introduction of additional frequency samples, spaced as previously defined for each mode.

In this respect, it is worth recalling that generic modes ±N are generated repeating the same symbol at $2^{N+1}$ different frequencies $$\frac{1}{T}\left(\frac{2^N-1}{2^N}+k\right),$$

changing each time their phases according to $$e^{\pm jk\frac{\pi}{2^N}},$$

with k=0, 1, . . . , $2^{N+1}-1$. This means that the associated IFFT is the sum of 4N decimated IFFT, having only 1 row for each sample and each one is weighted as $$\frac{1}{2^{\frac{N+1}{2}}}e^{\pm jk\frac{\pi}{2^N}}.$$

A preferred use of frequency twisted waves is inside an OFDM-OFDMA architecture. Taking into consideration that an OFDM structure includes a very large number of frequencies, a possible architecture is proposed here below.

On the assumption that modes up to N=±2 are used, the band occupied by this configuration is given by $2^{2+1}+1=9$ frequency slots. This section is called Twisted Frequency frame Unit (TFU) and to this TFU corresponds a Twisted Time frame Unit (TTU).

The inclusion of the TFU cyclic prefix increases the time frame by $$\frac{0.5}{B_S}$$

and, thence, for the TTU there results $$\frac{9.5}{B_S}.$$

The cyclic prefix is used for each TFU present in the full OFDM-OFDMA bandwidth (and, as previously explained, is physically the same one used for OFDM, but used for each TFU).

As previously explained, the OFDM-twisted frequency has two hierarchical levels:
  the former is related to the TTUs structure, which depends on the number of modes chosen and the number of frequency slots adopted; and
  the latter is related to the assembly of the TFUs constituting the OFDM structure.

Again as previously explained, both the levels have the same time duration and the difference is given by the component frequency blocks:
  each TFU corresponds to a number of samples defined by the twisted frequency structure, which introduces additional frequency samples located between the main frequency samples;
  the super frame structure is a set of TTUs, centered at the proper frequency, and a set of traditional OFDM frequency samples, if wished;
  the standard frequency samples can simplify the process of synchronization and phasing.

The generation of the main mode signal and of the twisted mode signals via this process is called, as previously explained, Generalized Inverse Fast Fourier Transform (GIFFT).

For the sake of simplicity, it is assumed to use twisted modes ±1 and ±2. This implies, as previously explained, the presence of 9 frequency slots related to the main mode; the frequency twist requires a time interval slightly larger than the minimum one required by the sampling theorem in order to avoid ambiguities, due to the determination of the frame boundary; this implies that, for instance, every 18 frequency band slots an additional one is necessary; therefore, there are two time reference window: one defined by the clock time $T_{cl}$, and one defined by the symbol time $T_{sym}$. The relation between $T_{cl}$ and $T_{sym}$ is given by:

$$T_{sym} = \frac{2^{k+2}+3}{2^{k+2}+2}T_{cl},$$

where $$\frac{1}{2^{k+2}+2}T_{cl}$$

is equivalent to the cyclic prefix.

In the present case, $$T_{sym} = \frac{19}{18}T_{cl},$$

and $$\frac{1}{18}T_{cl}$$

is the cyclic prefix.

In order to create the correct reference between the real and the imaginary signals, it is important to avoid possible ambiguities on the zero of the reference system. In fact, this system shall be used as the reference system of the principal value of the Cauchy integral.

Therefore, it is important to have a sampling rate slightly larger than the minimum possible for the symbol rate associated with the plane wave mode.

Figure 35:
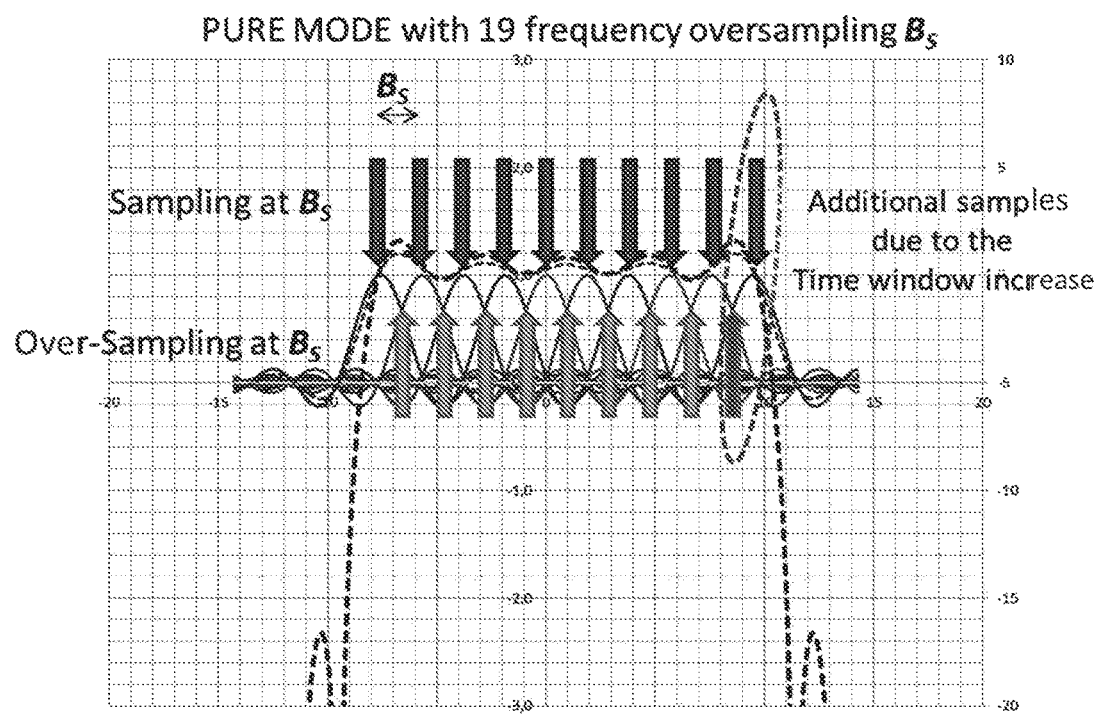
FIG. 35 schematically illustrates a frequency structure of frequency twisted waves according to an illustrative embodiment of the present invention.

The frequency representation is shown in FIG. 35, which schematically illustrates frequency slots with the additional one for ambiguity resolution (always on the assumption that twisted modes up to ±2 are used). This additional frequency slot implies that the bandwidth of each symbol is smaller than the maximum one given by Nyquist criterion, and that the additional time duration creates the repetition of part of the sinusoidal at the beginning of the time slot (as in the case of "traditional" cyclic prefix).

The main mode has the same structure of the traditional IFFT, but the sampling is performed 19 times instead of 18.

Higher-order modes are generated considering that each of them can be derived considering a set of frequency pulses properly shifted in frequency and properly phase-shifted (either 1; ±j; −1; ∓j).

The frequency pulses of each mode are properly positioned via a transformation algorithm, which is very similar to the IFFT, having in mind the fact that the starting frequency is properly positioned on the frequency axis and that more samples are associated with the same symbol, as explained in the foregoing.

Figure 36:
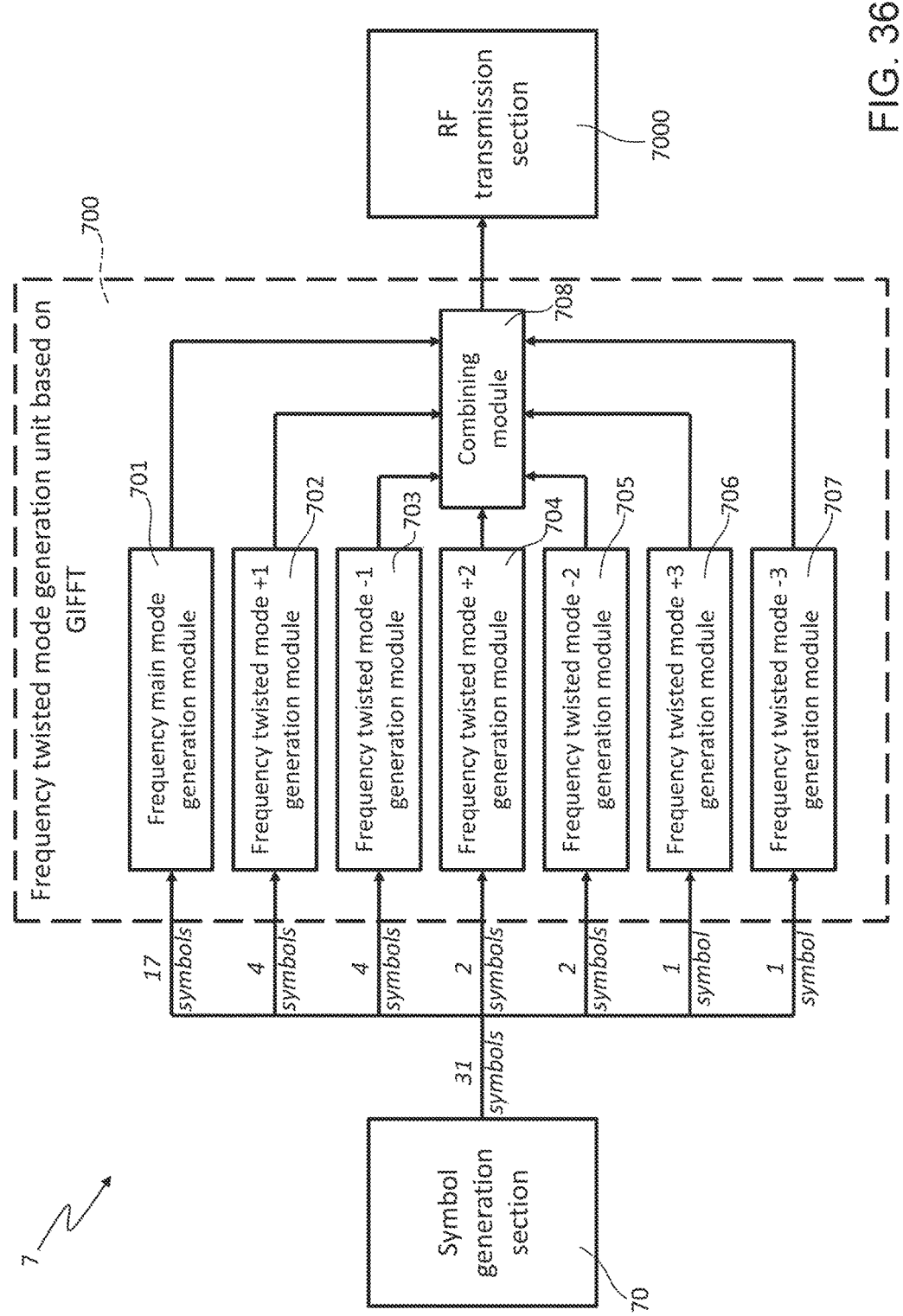
FIG. 36 schematically illustrates a transmitting system according to an illustrative embodiment of the present invention.

In order for the operation of the present invention to be better understood, reference is made to FIG. 36, which shows a functional block diagram of a transmitting system (denoted as whole by 7) according to an illustrative embodiment of the present invention.

In particular, the transmitting system 7 shown in FIG. 36 is designed to generate frequency twisted waves up to modes ±3, and comprises:
  a symbol generation section 70 configured to generate and output a digital symbol stream;
  a frequency twisted mode generation unit 700 based on GIFFT, said frequency twisted mode generation unit 700 being coupled with the symbol generation section 70 to receive the digital symbol stream outputted by the latter, and being configured to generate and output, for each sequence of $S_{TOT}$ digital symbols received from the symbol generation section 70 (in particular, in the example shown in FIG. 36, $S_{TOT}$=31), a respective digital time signal obtained by transforming from frequency domain to time domain
  main mode frequency samples carrying $M_{MFS}$ of said $S_{TOT}$ received digital symbols (in particular, in the example shown in FIG. 36, $M_{MFS}$=17) via a frequency main mode (preferably, as previously explained, the main mode frequency samples are OFDM/OFDMA-type frequency samples), and
  twisted mode frequency samples carrying the other $S_{TOT}$-$M_{MFS}$ received digital symbols via frequency twisted modes, wherein, in the example shown in FIG. 36, the twisted mode frequency samples include
    frequency samples which are related to frequency twisted mode +1 and which carry four respective digital symbols via the frequency twisted mode +1,
    frequency samples which are related to frequency twisted mode −1 and which carry four respective digital symbols via the frequency twisted mode −1,
    frequency samples which are related to frequency twisted mode +2 and which carry two respective digital symbols via the frequency twisted mode +2,
    frequency samples which are related to frequency twisted mode −2 and which carry two respective digital symbols via the frequency twisted mode −2,
    frequency samples which are related to frequency twisted mode +3 and which carry one respective digital symbol via the frequency twisted mode +3, and
    frequency samples which are related to frequency twisted mode −3 and which carry one respective digital symbol via the frequency twisted mode −3; and
  an RF transmission section 7000 which is coupled with the frequency twisted mode generation unit 700 to receive the digital time signals outputted by the latter, and which is configured to transmit at predefined radio frequencies the received digital time signals by means of a single antenna or a plurality of antennas/antenna elements (not shown in FIG. 36 for the sake of illustration simplicity).

Conveniently, the aforesaid predefined radio frequencies can range from a few KHz to hundreds of GHz depending on the specific application for which the transmitting system 7 is designed.

Preferably, the transmitting system 7 is a device/system for wireless communications based on OFDM and/or OFDMA, or, more preferably, on LTE and/or WiMAX.

Conveniently, the symbol generation section 70 is designed to generate the digital symbol stream by performing several operations, such as the following operations (not necessarily all performed and not necessarily performed in the following sequence): information encoding (conveniently by performing one or more signal modulations), one or more frequency shifting operations, one or more analog-to-digital conversion operations, and one or more filtering operations.

Again conveniently, the RF transmission section 7000 can be designed to transmit at the predefined radio frequencies the digital time signals by performing several operations, such as the following operations (not necessarily all performed and not necessarily performed in the following sequence): frequency up-shifting (in particular from Intermediate Frequency (IF) up to RF), one or more filtering operations, one or more digital-to-analog conversion operations, and power amplification.

More in detail, as shown in FIG. 36, the frequency twisted mode generation unit 700 includes:

a frequency main mode generation module 701, which, in use,
  determines, for each of said $M_{MFS}$=17 digital symbols, a corresponding symbol complex value $a_p e^{j\Phi_p}$ (with p=1, 2, . . . , $M_{MFS}$) which represents said digital symbol,
  allocates each of the $M_{MFS}$ symbol complex values to a respective frequency p/T, or (since T=1/$B_S$) p·$B_S$ (as in the case of traditional OFDM/OFDMA technique), thereby obtaining $M_{MFS}$ main mode frequency samples, and
  performs an IFFT of all the $M_{MFS}$ main mode frequency samples, thereby generating a digital time signal related to the frequency main mode;

a frequency twisted mode +1 generation module 702, which, in use,
  determines, for the first of the four respective digital symbols, a corresponding symbol complex value $a_{+1;1} e^{j\Phi_{+1;1}}$ which represents said digital symbol,
  allocates said symbol complex value $a_{+1;1} e^{j\Phi_{+1;2}}$ to four respective frequencies $$B_S\left(\frac{1}{2}+k\right)$$

(with k=0, 1, 2, 3) changing, for each frequency sample, the respective phase according to $$e^{+jk\frac{\pi}{2}}$$

and weighting each frequency sample by ½ (i.e., multiplying, for each of the four respective frequencies, the symbol complex value $a_{+1;1} e^{j\Phi_{+1;1}}$ by a respective complex coefficient $$\frac{e^{+jk\frac{\pi}{2}}}{2}),$$

thereby obtaining four twisted mode frequency samples which are related to the frequency twisted mode +1 and which carry said first respective digital symbol via said frequency twisted mode +1,
  determines, for the second of the four respective digital symbols, a corresponding symbol complex value $a_{+1;2} e^{j\Phi_{+1;2}}$ which represents said digital symbol,
  allocates said symbol complex value $a_{+1;2} e^{j\Phi_{+1;2}}$ to four respective frequencies $$B_S\left(\frac{1}{2}+k\right)$$

(with k=4, 5, 6, 7) changing, for each frequency sample, the respective phase according to $$e^{+j(k-4)\frac{\pi}{2}}$$

and weighting each frequency sample by ½ (i.e., multiplying, for each of the four respective frequencies, the symbol complex value $a_{+1;2}e^{j\Phi_{+1;2}}$ by a respective complex coefficient $$\frac{e^{+j(k-4)\frac{\pi}{2}}}{2}),$$

thereby obtaining four further twisted mode frequency samples which are related to the frequency twisted mode +1 and which carry said second respective digital symbol via said frequency twisted mode +1, determines, for the third of the four respective digital symbols, a corresponding symbol complex value $a_{+1;3}e^{j\Phi_{+1;3}}$ which represents said digital symbol, allocates said symbol complex value $a_{+1;3}e^{j\Phi_{+1;3}}$ to four respective frequencies $$B_S\left(\frac{1}{2}+k\right)$$

(with k=8, 9, 10, 11) changing, for each frequency sample, the respective phase according to $$e^{+j(k-8)\frac{\pi}{2}}$$

and weighting each frequency sample by ½ (i.e., multiplying, for each of the four respective frequencies, the symbol complex value $a_{+1;3}e^{j\Phi_{+1;3}}$ by a respective complex coefficient $$\frac{e^{+j(k-8)\frac{\pi}{2}}}{2}),$$

thereby obtaining four further twisted mode frequency samples which are related to the frequency twisted mode +1 and which carry said third respective digital symbol via said frequency twisted mode +1, determines, for the fourth of the four respective digital symbols, a corresponding symbol complex value $a_{+1;4}e^{j\Phi_{+1;4}}$ which represents said digital symbol, allocates said symbol complex value $a_{+1;4}e^{j\Phi_{+1;4}}$ to four respective frequencies $$B_S\left(\frac{1}{2}+k\right)$$

(with k=12, 13, 14, 15) changing, for each frequency sample, the respective phase according to $$e^{+j(k-12)\frac{\pi}{2}}$$

and weighting each frequency sample by ½ (i.e., multiplying, for each of the four respective frequencies, the symbol complex value $a_{+1;4}e^{j\Phi_{+1;4}}$ by a respective complex coefficient $$\frac{e^{+j(k-12)\frac{\pi}{2}}}{2}),$$

thereby obtaining four final twisted mode frequency samples which are related to the frequency twisted mode +1 and which carry said fourth respective digital symbol via said frequency twisted mode +1, and performs an IFFT of all the sixteen twisted mode frequency samples related to the frequency twisted mode +1, thereby generating a digital time signal related to the frequency twisted mode +1;

a frequency twisted mode −1 generation module 703, which, in use, determines, for the first of the four respective digital symbols, a corresponding symbol complex value $a_{-1;1}e^{j\Phi_{-1;1}}$ which represents said digital symbol, allocates said symbol complex value $a_{-1;1}e^{j\Phi_{-1;1}}$ to four respective frequencies $$B_S\left(\frac{1}{2}+k\right)$$

(with k=0, 1, 2, 3) changing, for each frequency sample, the respective phase according to $$e^{-jk\frac{\pi}{2}}$$

and weighting each frequency sample by ½ (i.e., multiplying, for each of the four respective frequencies, the symbol complex value $a_{-1;1}e^{j\Phi_{-1;1}}$ by a respective complex coefficient $$\frac{e^{-jk\frac{\pi}{2}}}{2}),$$

thereby obtaining four twisted mode frequency samples which are related to the frequency twisted mode −1 and which carry said first respective digital symbol via said frequency twisted mode −1, determines, for the second of the four respective digital symbols, a corresponding symbol complex value $a_{-1;2}e^{j\Phi_{-1;2}}$ which represents said digital symbol, allocates said symbol complex value $a_{-1;2}e^{j\Phi_{-1;2}}$ to four respective frequencies $$B_S\left(\frac{1}{2}+k\right)$$

(with k=4, 5, 6, 7) changing, for each frequency sample, the respective phase according to $$e^{-j(k-4)\frac{\pi}{2}}$$

and weighting each frequency sample by ½ (i.e., multiplying, for each of the four respective frequencies, the symbol complex value $a_{-1;2}e^{j\Phi_{-1;2}}$ by a respective complex coefficient $$\frac{e^{-j(k-4)\frac{\pi}{2}}}{2}),$$

thereby obtaining four further twisted mode frequency samples which are related to the frequency twisted mode −1 and which carry said second respective digital symbol via said frequency twisted mode −1, determines, for the third of the four respective digital symbols, a corresponding symbol complex value $a_{-1;3}e^{j\Phi_{-1;3}}$ which represents said digital symbol, allocates said symbol complex value $a_{-1;3}e^{j\Phi_{-1;3}}$ to four respective frequencies $$B_S\left(\frac{1}{2}+k\right)$$

(with k=8, 9, 10, 11) changing, for each frequency sample, the respective phase according to $$e^{-j(k-8)\frac{\pi}{2}}$$

and weighting each frequency sample by ½ (i.e., multiplying, for each of the four respective frequencies, the symbol complex value $a_{-1;3}e^{j\Phi_{-1;3}}$ by a respective complex coefficient $$\frac{e^{-j(k-8)\frac{\pi}{2}}}{2}),$$

thereby obtaining four further twisted mode frequency samples which are related to the frequency twisted mode −1 and which carry said third respective digital symbol via said frequency twisted mode −1, determines, for the fourth of the four respective digital symbols, a corresponding symbol complex value $a_{-1;4}e^{j\Phi_{-1;4}}$ which represents said digital symbol, allocates said symbol complex value $a_{-1;4}e^{j\Phi_{-1;4}}$ to four respective frequencies $$B_S\left(\frac{1}{2}+k\right)$$

(with k=12, 13, 14, 15) changing, for each frequency sample, the respective phase according to −j(k−12)π/2 and weighting each frequency sample by ½ (i.e., multiplying, for each of the four respective frequencies, the symbol complex value $a_{-1;4}e^{j\Phi_{-1;4}}$ by a respective complex coefficient $$\frac{e^{-j(k-12)\frac{\pi}{2}}}{2}),$$

thereby obtaining four final twisted mode frequency samples which are related to the frequency twisted mode −1 and which carry said fourth respective digital symbol via said frequency twisted mode −1, and performs an IFFT of all the sixteen twisted mode frequency samples related to the frequency twisted mode −1, thereby generating a digital time signal related to the frequency twisted mode −1;

a frequency twisted mode +2 generation module 704, which, in use, determines, for the first of the two respective digital symbols, a corresponding symbol complex value $a_{+2;1}e^{j\Phi_{+2;1}}$ which represents said digital symbol, allocates said symbol complex value $a_{+2;1}e^{j\Phi_{+2;1}}$ to eight respective frequencies $$B_S\left(\frac{3}{4}+k\right)$$

(with k=0, 1, . . . , 7) changing, for each frequency sample, the respective phase according to $$e^{+jk\frac{\pi}{4}}$$

and weighting each frequency sample by $$\frac{1}{\sqrt{8}}$$

(i.e., multiplying, for each of the eight respective frequencies, the symbol complex value $a_{+2;1}e^{j\Phi_{+2;1}}$ by a respective complex coefficient $$\frac{e^{+jk\frac{\pi}{4}}}{\sqrt{8}}),$$

thereby obtaining eight twisted mode frequency samples which are related to the frequency twisted mode +2 and which carry said first respective digital symbol via said frequency twisted mode +2, determines, for the second of the two respective digital symbols, a corresponding symbol complex value $a_{+2;2}e^{j\Phi_{+2;2}}$ which represents said digital symbol, allocates said symbol complex value $a_{+2;2}e^{j\Phi_{+2;2}}$ to eight respective frequencies $$B_S\left(\frac{3}{4}+k\right)$$

(with k=8, 9, . . . , 15) changing, for each frequency sample, the respective phase according to and weighting each frequency sample by $$\frac{1}{\sqrt{8}}$$

(i.e., multiplying, for each of the eight respective frequencies, the symbol complex value $a_{+2;2}e^{j\Phi_{+2;2}}$ by a respective complex coefficient $$\frac{e^{+j(k-8)\frac{\pi}{4}}}{\sqrt{8}}),$$

thereby obtaining eight further twisted mode frequency samples which are related to the frequency twisted mode +2 and which carry said second respective digital symbol via said frequency twisted mode +2, and performs an IFFT of all the sixteen twisted mode frequency samples related to the frequency twisted mode +2, thereby generating a digital time signal related to the frequency twisted mode +2;

a frequency twisted mode −2 generation module 705, which, in use, determines, for the first of the two respective digital symbols, a corresponding symbol complex value $a_{-2;1}e^{j\Phi_{-2;1}}$ which represents said digital symbol, allocates said symbol complex value $a_{-2;1}e^{j\Phi_{-2;1}}$ to eight respective frequencies $$B_S\left(\frac{3}{4}+k\right)$$

(with k=0, 1, . . . , 7) changing, for each frequency sample, the respective phase according to $$e^{-jk\frac{\pi}{4}}$$

and weighting each frequency sample by $$\frac{1}{\sqrt{8}}$$

(i.e., multiplying, for each of the eight respective frequencies, the symbol complex value $a_{-2;1}e^{j\Phi_{-2;1}}$ by a respective complex coefficient $$\frac{e^{+jk\frac{\pi}{4}}}{\sqrt{8}}),$$

thereby obtaining eight twisted mode frequency samples which are related to the frequency twisted mode −2 and which carry said first respective digital symbol via said frequency twisted mode −2, determines, for the second of the two respective digital symbols, a corresponding symbol complex value $a_{-2;2}e^{j\Phi_{-2;2}}$ which represents said digital symbol, allocates said symbol complex value $a_{-2;2}e^{j\Phi_{-2;1}}$ to eight respective frequencies $$B_S\left(\frac{3}{4}+k\right)$$

(with k=8, 9, . . . , 15) changing, for each frequency sample, the respective phase according to $$e^{-j(k-8)\frac{\pi}{4}}$$

and weighting each frequency sample by $$\frac{1}{\sqrt{8}}$$

(i.e., multiplying, for each of the eight respective frequencies, the symbol complex value $a_{-2;2}e^{j\Phi_{-2;2}}$ by a respective complex coefficient $$\frac{e^{-j(k-8)\frac{\pi}{4}}}{\sqrt{8}}),$$

thereby obtaining eight further twisted mode frequency samples which are related to the frequency twisted mode −2 and which carry said second respective digital symbol via said frequency twisted mode −2, and performs an IFFT of all the sixteen twisted mode frequency samples related to the frequency twisted mode −2, thereby generating a digital time signal related to the frequency twisted mode −2;

a frequency twisted mode +3 generation module 706, which, in use, determines, for the respective digital symbol, a corresponding symbol complex value $a_{+3}e^{j\Phi_{+3}}$ which represents said digital symbol, allocates said symbol complex value $a_{-3}e^{j\Phi_{+3}}$ to sixteen respective frequencies $$B_S\left(\frac{7}{8}+k\right)$$

(with the respective phase according to $$e^{+jk\frac{\pi}{8}}$$

and weighting each frequency sample by ¼ (i.e., multiplying, for each of the sixteen respective frequencies, the symbol complex value $a_{+3}e^{j\Phi_{+3}}$ by a respective complex coefficient $$\frac{e^{+jk\frac{\pi}{8}}}{4}),$$

thereby obtaining sixteen twisted mode frequency samples which are related to the frequency twisted mode +3 and which carry said respective digital symbol via said frequency twisted mode +3, and performs an IFFT of all the sixteen twisted mode frequency samples related to the frequency twisted mode +3, thereby generating a digital time signal related to the frequency twisted mode +3;

a frequency twisted mode −3 generation module 707, which, in use, determines, for the respective digital symbol, a corresponding symbol complex value $a_{-3}e^{j\phi_{-3}}$ which represents said digital symbol, allocates said symbol complex value $a_{-3}e^{j\phi_{-3}}$ to sixteen respective frequencies $$B_S\left(\frac{7}{8}+k\right)$$

(with k=0, 1, . . . , 15) changing, for each frequency sample, the respective phase according to $$e^{-jk\frac{\pi}{8}}$$

and weighting each frequency sample by ¼ (i.e., multiplying, for each of the sixteen respective frequencies, the symbol complex value $a_{-3}e^{j\phi_{-3}}$ by a respective complex coefficient $$\frac{e^{-jk\frac{\pi}{8}}}{4}),$$

thereby obtaining sixteen twisted mode frequency samples which are related to the frequency twisted mode −3 and which carry said respective digital symbol via said frequency twisted mode −3, and performs an IFFT of all the sixteen twisted mode frequency samples related to the frequency twisted mode −3, thereby generating a digital time signal related to the frequency twisted mode −3; and a combining module 708, which, in use, combines (namely, adds together) the digital time signals outputted by the frequency main mode generation module 701 (i.e., the digital time signal related to the frequency main mode), by the frequency twisted mode +1 generation module 702 (i.e., the digital time signal related to the frequency twisted mode +1), by the frequency twisted mode −1 generation module 703 (i.e., the digital time signal related to the frequency twisted mode −1), by the frequency twisted mode +2 generation module 704 (i.e., the digital time signal related to the frequency twisted mode +2), by the frequency twisted mode −2 generation module 705 (i.e., the digital time signal related to the frequency twisted mode −2), by the frequency twisted mode +3 generation module 706 (i.e., the digital time signal related to the frequency twisted mode +3), and by the frequency twisted mode −3 generation module 707 (i.e., the digital time signal related to the frequency twisted mode −3), thereby generating an overall digital time signal.

Linearity of the frequency twisted mode generation unit 700 is important, due to the presence of a wide multicarrier architecture.

Conveniently, the frequency twisted mode generation unit 700 carries out all the aforesaid operations of by using an overall complex transmission matrix [[GIFFT]] designed to implement, in a combined way and at one and the same time, all the aforesaid operations so that, when applied to a sequence of $S_{TOT}$ digital symbols received from the symbol generation section 70, time samples of the corresponding digital time signal are automatically computed by the frequency twisted mode generation unit 700.

Preferably, for each digital time signal generated and outputted by the combining module 708, the frequency twisted mode generation unit 700 is further designed to insert, at the beginning of said digital time signal, a respective cyclic prefix which is a replica of an end portion of said digital time signal (in accordance with what was previously explained). Conveniently, the transmission matrix [[GIFFT]] is designed to implement also cyclic prefix generation so that, when applied to a sequence of $S_{TOT}$ digital symbols received from the symbol generation section 70, a corresponding digital time signal is automatically generated by the frequency twisted mode generation unit 700, wherein the generated digital time signal already includes, at the beginning, a respective cyclic prefix.

Figure 37:
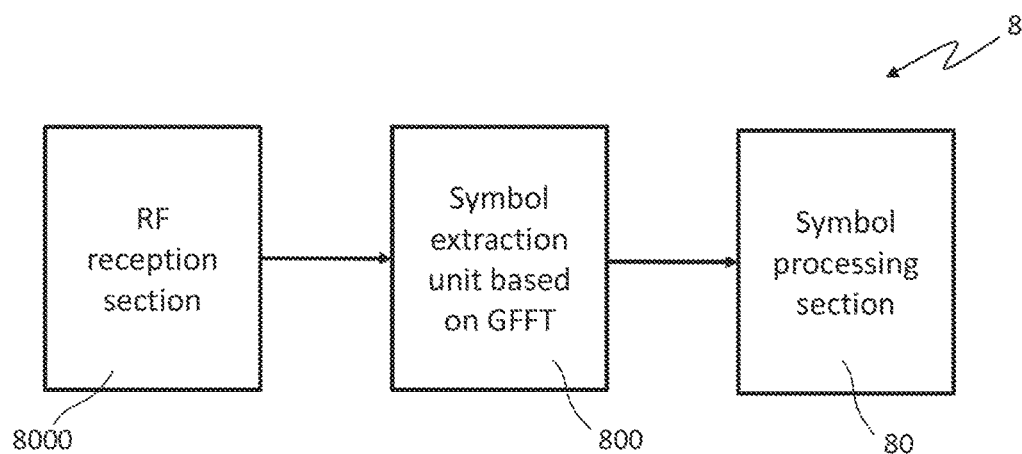
FIG. 37 schematically illustrates a receiving system according to an illustrative embodiment of the present invention.

Let us now consider the operation of the present invention at reception side, and, in this respect, reference is made to FIG. 37, which shows a functional block diagram of a receiving system (denoted as whole by 8) according an illustrative embodiment of the present invention.

In particular, as shown in FIG. 37, the receiving system 8 comprises:

an RF reception section 8000, which is designed to receive the RF signals transmitted at the predefined radio frequencies by the transmitting system 7 (in particular, by the RF transmission section 7000); said RF reception section 8000 being designed to receive the RF signals by means of a single antenna or a plurality of antennas/antenna elements (not shown in FIG. 37 for the sake of illustration simplicity), and to process the received RF signals so as to obtain, on the basis of said received RF signals, an incoming digital signal;

a symbol extraction unit 800 based on GFFT, which is coupled with said RF reception section 8000 to receive the incoming digital signal therefrom, and which is designed to process said incoming digital signal so as to extract the digital symbols carried by said incoming digital signal, and output a stream of extracted digital symbols; and a symbol processing section 80, which is coupled with said symbol extraction unit 800 to receive the stream of extracted digital symbols outputted by the latter, and which is designed to process said stream of extracted digital symbols.

The aforesaid predefined radio frequencies coincide with the radio frequencies used in transmission by the transmitting system 7, in particular by the RF transmission section 7000. Conveniently, as already said, the predefined radio frequencies can range from a few KHz to hundreds of GHz depending on the specific application which the overall radio communications system comprising the transmitting system 7 and the receiving system 8 is designed for.

Preferably, the receiving system 8 is a device/system for wireless communications based on OFDM and/or OFDMA, or, more preferably, on LTE and/or WiMAX.

Conveniently, the RF reception section 8000 is designed to obtain the incoming digital signal by performing several operations upon the received RF signals, such as the following operations (not necessarily all performed and not necessarily performed in the following sequence): low-noise amplification, one or more frequency down-shifting operations (in particular from RF down to IF), one or more filtering operations, and one or more analog-to-digital conversion operations.

Again conveniently, the symbol processing section 80 is designed to process the stream of extracted digital symbols by performing several operations, such as the following operations (not necessarily all performed and not necessarily performed in the following sequence): one or more filtering operations, one or more digital-to-analog conversion operations, one or more frequency shifting operations, and information decoding (conveniently by performing one or more signal demodulations).

At the reception side the parallel signal flow is to be considered, as in the case of OFDM (or OFDMA), and a reception matrix [[GFFT]] is used by the symbol extraction unit 800 to extract the digital symbols carried by the incoming digital signal.

The main difference with respect to the standard OFDM signal is that OFDM exploits Hermitian matrices, while in the case of frequency twisted waves the transmission matrix [[GIFFT]] is rectangular and, thence, in order for the reception matrix [[GFFT]] to be obtained, pseudo-inverse approach is exploited. The use of such a procedure is called Generalized Fast Fourier Transform (GFFT) and is somewhat similar to the Generalized Matched Filter used for the time twisted waves and described in WO 2015/067987 A1.

In use, the symbol extraction unit 800 processes the incoming digital signal by using a time window $T_{Sym}$ (including the cyclic prefix) so as to process successive, non-overlapped portions of the incoming digital signal each having a time duration equal to $T_{Sym}$, and to extract the digital symbols respectively carried by each incoming digital signal portion.

The input sequence in the time window $T_{Sym}$ is oversampled with the same law of the transmission flow; on the assumption that modes up to $\pm N$ are used, the size of the reception matrix is given by:

the number of unknowns (i.e., symbol complex values) $S_{TOT}=2^{N+2}-1$ in a frequency frame of $M_{MFS}=2^{N+1}+1$ main mode frequency pulses; and the number of equations, which represents also the overall number $M_{TS}$ of the samples in time domain, which is given by $$M_{TS} = \left(1 + \frac{N(N+1)}{2}\right)2^{N+1} + 1.$$

More in detail, in order to solve the equation system at the reception side, a reception matrix [[GFFT]] is used by the symbol extraction unit 800, which reception matrix [[GFFT]] is derived from the transmission matrix [[GIFFT]] through a generalized inversion technique, such as the pseudo-inverse technique.

In mathematical terms, given the transmission matrix [[GIFFT]] with $M_{TS} \times S_{TOT}$ complex coefficients, and given also the vector [S] of the $S_{TOT}$ symbol complex values to be transmitted, at transmission side there results that:

$$[[GIFFT]][S]=[TTU]$$

where [TTU] denote the vector of the $M_{TS}$ complex values of the time samples of a digital time signal outputted by the frequency twisted mode generation unit 700.

Let us now consider the reception side, where it is useful to use a generalized inversion technique, such as the pseudo-inverse technique, to invert the foregoing matrix equation:

$$[[GIFFT]]^T[[GIFFT]][S]=[[GIFFT]]^T[TTU],$$

and thence $$[S]=([[GIFFT]]^T[[GIFFT]])^{-1}[[GIFFT]]^T[TTU], \quad (1)$$

where $[[GIFFT]]^T$ denotes the transpose of the matrix [[GIFFT]] and $([[GIFFT]]^T[[GIFFT]])^{-1}$ denotes the operation of inversion of the square matrix resulting from the multiplication $[[GIFFT]]^T[[GIFFT]]$.

In particular, at reception side [S] becomes the vector of the $S_{TOT}$ unknown symbol complex values to be determined by the symbol extraction unit 800, and [TTU] becomes the vector of the $M_{TS}$ complex values of the time samples determined by the symbol extraction unit 800 on the basis of an incoming digital signal portion.

Condition for the existence of a set of solutions for the unknown vector [S] is that the square matrix resulting from the multiplication $[[GIFFT]]^T[[GIFFT]]$ has a determinant different than zero, i.e., in mathematical terms, $$det([[GIFFT]]^T[[GIFFT]]) \neq 0. \quad (2)$$

Therefore, if the transmission matrix [[GIFFT]] is designed so as to satisfy the condition (2), then the $S_{TOT}$ unknown symbol complex values can be determined by the symbol extraction unit 800 by solving the equation system resulting from the matrix equation (1).

Thence, the reception matrix [[GFFT]], which is a non-Hermitian matrix, can be defined as:

$$[[GFFT]]=([[GIFFT]]^T[[GIFFT]])^{-1}[[GIFFT]]^T$$

Figure 38:
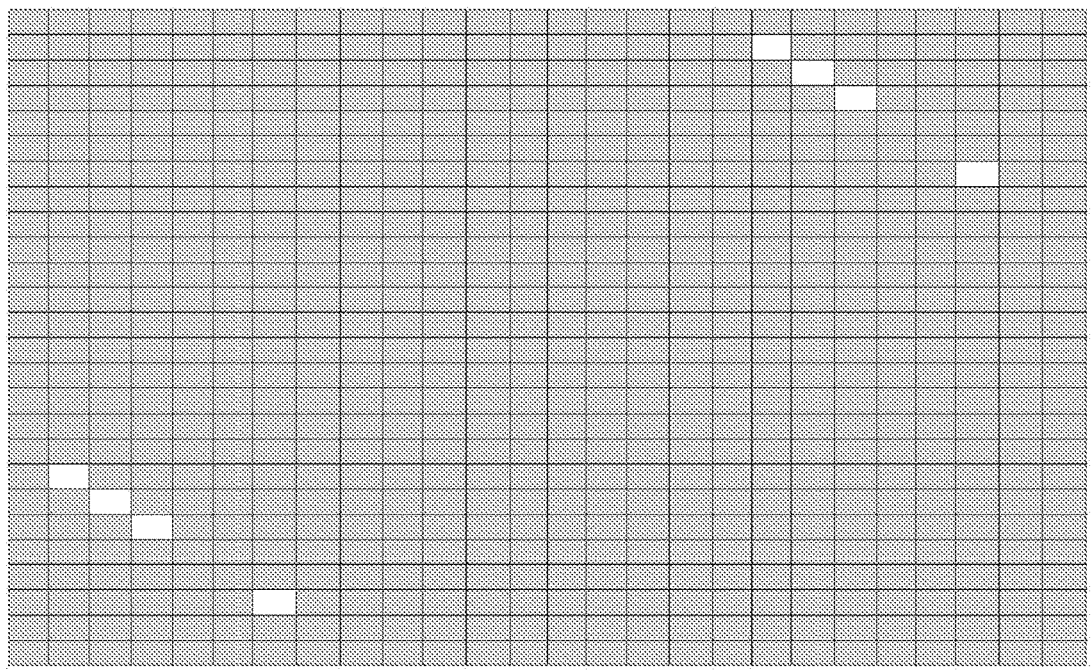
FIG. 38 schematically illustrates an example of square matrix resulting from the multiplication of the transpose of a transmission matrix according to an aspect of the present invention by said transmission matrix.

In this respect, FIG. 38 schematically shows an example of square matrix resulting from the multiplication $[[GIFFT]]^T[[GIFFT]]$ on the assumption that modes up to $\pm 1$ are used. In particular, the matrix shown in FIG. 38 includes cells which are blank or grey, wherein the grey cells represent the matrix cells actually occupied by coefficients, while the blank cells represent the matrix cells not occupied by any coefficient. This representation of the matrix stems from the fact that the FIG. 38 is mainly intended to show the matrix structure (and not the matrix coefficients).

The condition (2) is satisfied more easily in the frequency twist case than in the time twist one, as it can inferred by looking at the shape of the time signals. The main reason for such a behaviour is based on the fact that a frequency function is intrinsically complex, while a time signal is real. In other words, the square matrix resulting from the multiplication $[[GIFFT]]^T[[GIFFT]]$ is much more robust than the similar matrix obtained in the case of time twisted waves.

It is important to note that the determinant is well sized and does not require an increase in the bandwidth as in the time twisted wave case. In fact, changing from 19 to 18 samples the determinant relative value changes from 1 to about 0.1, which are both values valid for the matrix inversion.

Ideally, the use of cyclic prefix allows interference level to be limited close to zero. This is true when a large number of side lobes are present outside the useful bandwidth. For the TFUs the bandwidth is limited to the first side-lobe of the frequency pattern, therefore the interference level is of the order of about −30/−35 dB. This can be considered self-generated noise due to inter-frame interference.

The presence of self-generated noise produces a limitation on the information transmission capacity when the $E_{symbol}/N_0$ is very high (namely, higher than 40 dB), as shown in FIG. 34. This limitation is present in all the cases where the physical resource is reused (e.g. orthogonal polarization limit 35-40 dB).

Sizing and configuration of a transmitter and a receiver using frequency twisted waves according to the present invention can be considered an innovative updating of the OFDM, OFDMA and COFDM (i.e., Coded OFDM) architectures.

Figure 39:
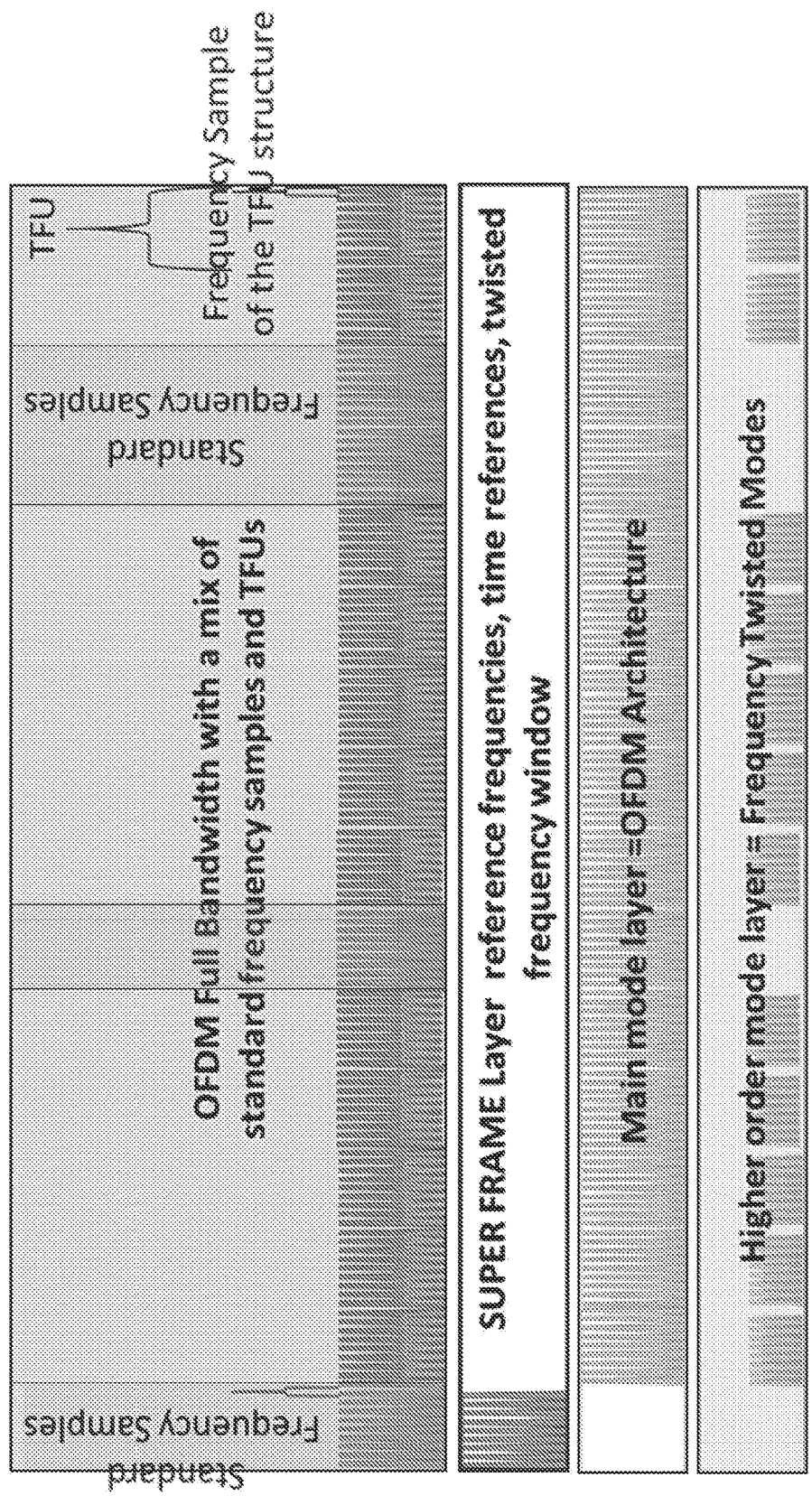
FIG. 39 schematically illustrates a multilayer architecture wherein a frame structure of frequency twisted waves according to an aspect of the present invention is embedded in a traditional OFDM architecture.

In this respect, FIG. 39 schematically shows a multilayer architecture wherein the frame structure of the frequency twisted waves is embedded in a traditional OFDM architecture.

The proposed architecture allows the OFDM basic structure to be used with the additional layer of frequency twisted waves (including the size and the references of the frequency twisted wave frame, i.e., the frequency slot positions, their phases and the association of these frequencies with the transmitted symbols, as described in detail in the foregoing).

The advantage of frequency twisted waves with respect to time twisted waves is evident in this aspect; in fact, for frequency twisted waves there is no need to build up a dedicated "space reference system" as in the case of time twist and this is due to the important consideration that OFDM and similar transmission techniques are already "block signal transmission" techniques (i.e., implement simultaneous transmission of signals using IFFT).

The size of transmission block is increased by a factor related to the number of frequency twisted modes used. In fact, as previously explained, each twisted frequency mode ±n exploits a sequence of $2^{N+1}$ additional frequency carriers (where ±N are the highest modes used) positioned at $$B_S\left(\frac{2^n-1}{2^n}+k\right),$$

where $0 \leq k \leq 2^{N+1}-1$.

The receiver (in particular, the symbol extraction unit 800) handles a number of unknowns $S_{TOT}$ smaller than the number of equations $M_{TS}$ (as previously explained), this implies the use of the pseudo-inverse technique and an increase in the computational complexity with respect to the usual OFDM block signal computation, which, as is known, produces square matrixes $L_{SF} \times L_{SF}$, where $L_{SF}$ is the length of the super frame.

Instead, in the case of frequency twisted waves, assuming the same super frame length $L_{SF}$ and a frame length $L_{TFU}$ equal to $2^{N+1}+1$, the number of equation for said super frame is:

$$M_{TS}\frac{L_{SF}}{2^{N+1}+1}=\left[\left(1+\frac{N(N+1)}{2}\right)2^{N+1}+1\right]\frac{L_{SF}}{2^{N+1}+1},$$

where, if N=2 and $L_{SF}$=2016, the number of equations is 7392 and the number of the unknowns is given by $$\frac{2^{N+2}+1}{2^{N+1}+1}L_{SF}=3808.$$

The increased complexity factor of the matrix operations is given by the ratio between the number of operations of twisted waves and the number of OFDM operations:

$$\frac{\left(\frac{2^{N+2}+1}{2^{N+1}+1}L_{SF}\right)\times\left[\left(1+\frac{N(N+1)}{2}\right)2^{N+1}+1\right]\frac{L_{SF}}{2^{N+1}+1}}{(L_{SF})^2}=6.1.$$

Figure 40:
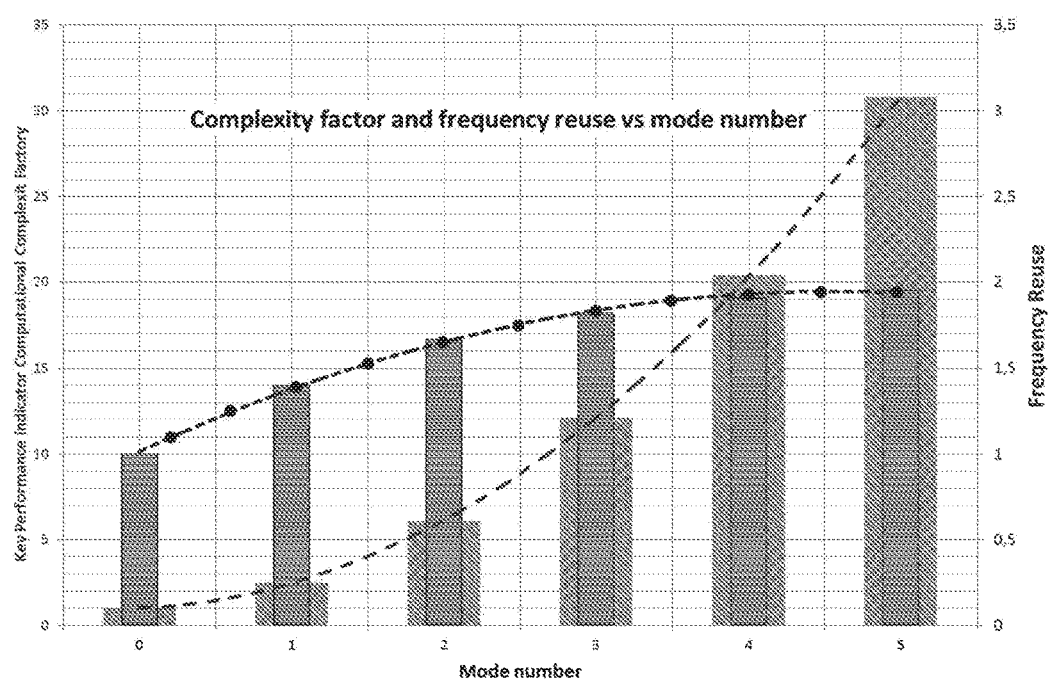
FIG. 40 schematically illustrates computational complexity of the present invention and frequency reuse according to the present invention as a function of the number of frequency twisted modes used.

In this respect, FIG. 40 shows computational complexity of the present invention and frequency reuse according to the latter as a function of N (where, as previously said, ±N are the highest twisted frequency modes used). From FIG. 40 it is evident that a reasonable compromise is obtained with N=2, with a very good frequency reuse and a limited increase in computational complexity.

Figure 41:
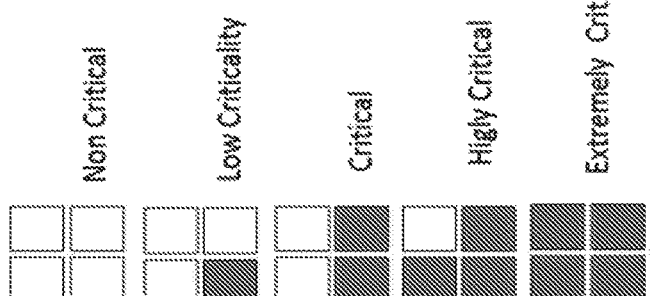
FIG. 41 schematically illustrates flexibility in using OFDM modularity, complex equation number and implementation criticality of the present invention as a function of the number of frequency twisted modes used.

The introduction of an additional layer in the super frame organization is somewhat limiting the possibility of OFDM adapting itself to the channel characteristics; i.e., in a traditional OFDM frame the adaptability is given by the single carrier bandwidth $B_S$, while for the frequency twisted wave case the adaptability is given by $(2^{N+1}+1)B_S$. This is a limitation on the system adaptability and has the same trend of the computational complexity. In this respect, FIG. 41 schematically illustrates flexibility in using OFDM modularity, complex equation number and implementation criticality of the present invention as a function of N (where, as previously said, ±N are the highest twisted frequency modes used).

As is known, OFDM has high sensitivity to synchronization errors, that can cause Inter-Symbol Interference (ISI) and Inter-Carrier Interference (ICI).

Synchronization step can conveniently include:
symbol timing synchronization;
carrier frequency synchronization; and
sampling clock synchronization.

In particular, symbol timing synchronization can be affected by the following factors:
ISI;
phase shift in the frequency domain symbols;
a delayed FFT window (partially) overlapping with the following OFDM symbol (high interference); and
an advanced FFT window including samples of the data segment and the guard interval (no interference).

Therefore, symbol timing synchronization is performed at reception side, preferably by using a portion of the bandwidth. In particular, symbol timing synchronization is conveniently based on the presence of the cyclic prefix. In detail, symbol timing synchronization procedure conveniently exploits a correlation function, whose peaks in time domain indicate the start of a symbol.

Conveniently, also carrier frequency synchronization is performed at reception side in order to tackle the (potential) mismatch between the local oscillators of the transmitter and the receiver, i.e., the (potential) Doppler shift.

In fact, the presence of this mismatch can introduce ICI, affect the orthogonality of OFDM sub-carriers and add an additional phase factor for each subcarrier, due to the frequency shift.

Carrier Frequency Offset (CFO) estimation methods can be conveniently based on the use of:
- training symbols or pilot frequencies (data-aided methods);
- intrinsic structure of OFDM symbols, e.g. cyclic prefix (non-data-aided methods);
- blind approaches, which rely on signal statistics and often have very high computational complexity.

Typical errors of CFO estimation should be lesser than 1% of sub-carrier spacing.

In particular, with the presence of frequency twisted waves there are additional autocorrelation and cross-correlation functions generated by the presence of said twisted waves, but the synchronization process is very similar to that related only to OFDM.

Preferably, CFO estimation is performed at reception side on the basis of training symbols, and/or pilot frequencies, and/or the intrinsic structure of OFDM symbols and frequency twisted wave symbols (for example on the basis of the cyclic prefix).

Moreover, the mismatch between the sampling clocks of the crystal oscillators of the transmitter and the receiver can cause sampling errors at reception side. Additionally, other factors may cause sampling errors at reception side, such as multi-path fading and noise disturbance.

Therefore, also sampling clock synchronization is conveniently performed at reception side in order to tackle these sampling errors.

Figure 42:
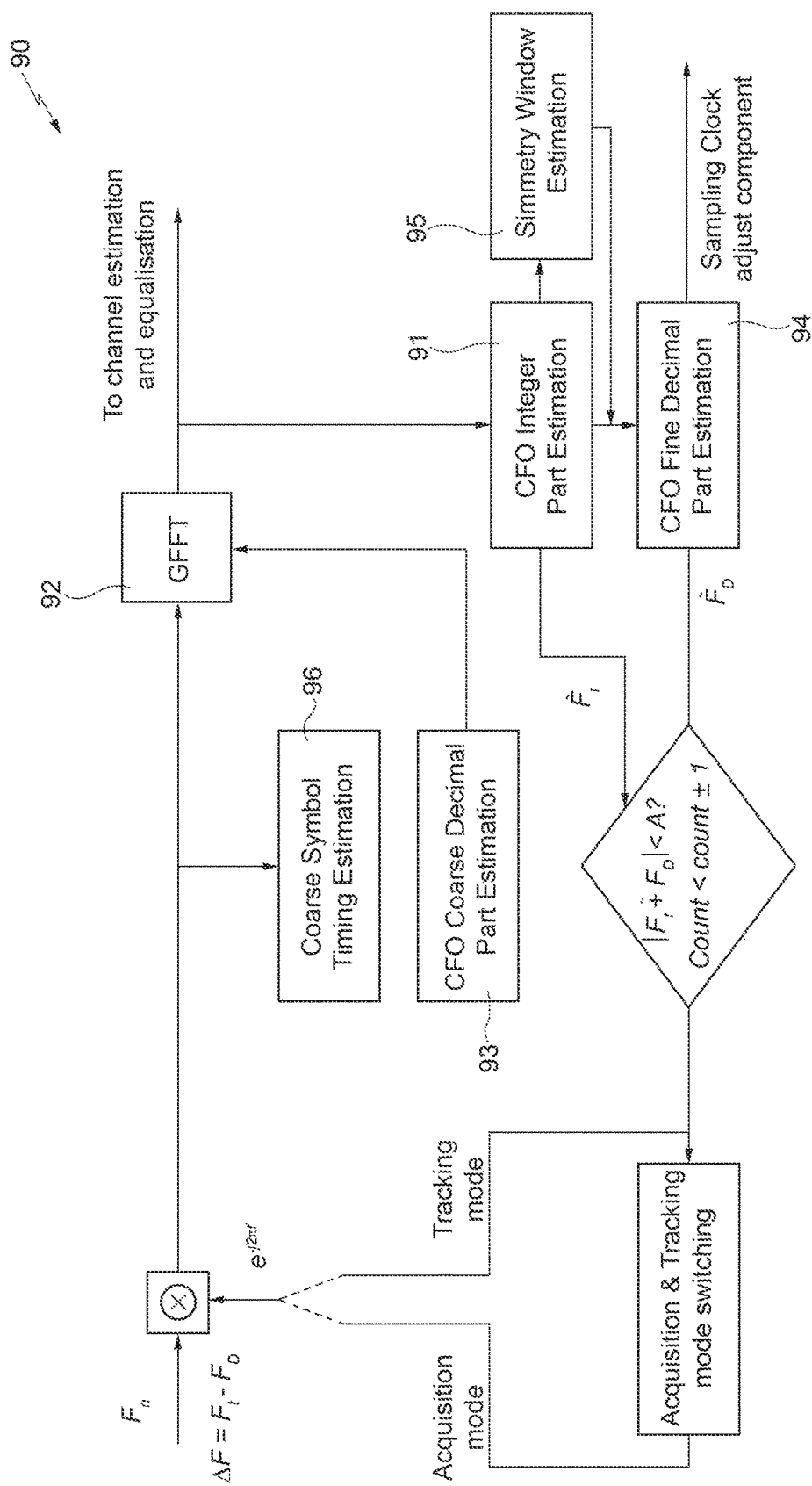
FIG. 42 schematically illustrates symbol timing, sampling clock and carrier frequency synchronizations performed at reception side according to an illustrative embodiment of the present invention.

In this connection, FIG. 42 shows a functional block diagram conceptually representing an architecture (denoted as whole by 90) for performing, at reception side, symbol timing, sampling clock and carrier frequency synchronizations according to an illustrative embodiment of the present invention. For example, the functional architecture 90 shown in FIG. 42 can be conveniently implemented by the receiving system 8 shown in FIG. 37 and previously described.

With reference to FIG. 42, it is worth noting that the functional architecture 90 is immediately understandable for a person skilled in OFDM. Thence, in the following only parts of the architecture 90, which are important for understanding the embodiment of the present invention shown in FIG. 42, will be described in detail.

The frequency and phases are synchronized for t=0. The CFO is normalized by sub-carrier spacing and is divided into an integer part (multiple of the sub-carrier spacing) and a decimal part (less than half of the sub-carrier spacing, cause of attenuation, rotation and ICI).

The CFO estimation is organized into three main parts:
- CFO integer part estimation (block 91) performed in frequency domain, in particular downstream of GFFT (block 92);
- CFO coarse decimal part estimation (block 93) performed in time domain; and
- CFO fine decimal part estimation (block 94) performed in frequency domain, in particular downstream of the CFO integer part estimation (block 91).

Conveniently, the CFO integer part estimation (block 91) can be based on:
- the so-called Nagami's algorithm based on transmission of symbols known at the receiver (correlation of known pilots and cyclically shifted received pilots and its maximization give coarse offset estimation); and/or
- the so-called Taura's model based on reverse modulation of known pilot symbols and cyclically shifted versions of received pilot symbols (the GFFT is processed and the function that maximizes the output of the GFFT is the estimated offset).

Moreover, the CFO fine decimal part estimation can be conveniently based on the presence of the carrier offset (in fact, the received signal loses its repetitive structure; the estimation is performed by considering two complex variables A=a+jb and B=(a+jb)$e^{j\theta}$ and finding the phase between A and B through $\theta$=−phase(A;B)*).

As for sampling clock synchronization, Sampling Clock Offset (SCO) can be divided into two main parts: sampling clock phase offset and sampling clock frequency offset. With the use of frequency twisted waves, reference timing of the twisted wave layer (i.e., reference for even and odd functions) is evaluated through a symmetry window estimation (block 95), in particular downstream of the CFO integer part estimation (block 91) and upstream of the CFO fine decimal part estimation (block 94).

Lastly, as shown in FIG. 42, a coarse symbol timing estimation (block 96) is performed upstream of the GFFT (block 92).

Some features of the present invention are briefly summarized here below:
- due the structure of the OFDM signal there is no additional noise due to the introduction of frequency twisted waves;
- the OFDM cyclic prefix includes the equivalent cyclic prefix necessary for frequency twisted waves; anyway, it is clear that, if the cyclic prefix is fully used for OFDM, it should be accordingly increased; and
- there is no practical advantage of performance in using frequency twisted mode higher than ±3, but, on the contrary, computational complexity grows quite rapidly.

As explained in the foregoing, the implementation of the frequency twisted waves according to the present invention can be regarded as an approximation of the frequency Hilbert transform. This fact implies, on the one hand, a bandwidth increase, and, on the other hand, the presence of an absolute limitation on the increase in frequency reuse, which is lower than two. In this respect, the following TABLE II lists some features related to the use of frequency twisted waves according to the present invention.

TABLE II

| Parameter | Parameter value (considering using up to modes ± N) | Parameter approximate value for N = 2 |
|---|---|---|
| Frequency reuse | $\dfrac{2^{N+2} - 1}{2^{N+1} + 1}$ | 1.67 |
| Vestigial time interval increase | $\dfrac{2^{N+2} + 3}{2^{N+2} + 2}$ | 1.056 |
| Total frame bandwidth/symbol bandwidth | $\dfrac{B_F}{B_S} = \dfrac{2^{N+2} + 3}{2}$ | 9.5 |
| Super Frame loss | <1% | 0.99 |
| Additional bandwidth noise (dB) | $10\log\left(\dfrac{2^{N+3} + 3}{2^{N+3} + 2}\right)$ dB | 0.25 dB |
| Digitalization noise <−30 dB phase error | $\dfrac{N}{2^N - 1}$ | 9 bits |

TABLE II-continued

| Parameter | Parameter value (considering using up to modes ± N) | Parameter approximate value for N = 2 |
|---|---|---|
| Maximum inter-frame interference (dB) | <−19 − 3N dB | <−25 dB |

For N=3, the frame length is smaller than 32 symbols, the necessary number of bits is about 10, the increase in the thermal noise is close to 0 dB, and the frequency reuse close to 1.7.

As for practical implementation of the present invention, the frequency twisted mode generation unit 700 based on GIFFT and the symbol extraction unit 800 based on GFFT are preferably implemented by means of Field-Programmable Gate Array (FPGA), Application-Specific Integrated Circuit (ASIC), and Software Defined Radio (SDR) technologies.

From the foregoing, it may be immediately appreciated that the present invention allows to increase frequency reuse and transmission capacity by exploiting an original application of the Hilbert transform in frequency domain.

The present invention can be considered very interesting and almost revolutionary to develop a new theory for digital communications beyond the classical approach based on analytical signals.

In particular, as previously explained in detail, according to the present invention radio vorticity is considered as a way to approximate the Hilbert transform and is applied in frequency domain so as to generate independent radio channels within one and the same bandwidth. These channels have an available bandwidth decreasing with the radio vorticity mode number and the total bandwidth advantage is growing as $\frac{1}{2}^N$, limited by 2, which represents the maximum possible use of the imaginary channel of the Hilbert transform.

From a mathematical (and physical) perspective, this Hilbert-transform-based approach is very similar to an interferometry measurement performed in "frequency space" instead of in geometrical space.

The present invention can be advantageously exploited, in general, in all kinds of radio communications, and, in particular, in radio communications based, in general, on OFDM and/or OFDMA, and, specifically, on LTE and/or WiMAX.

Finally, it is worth noting that a combined use of frequency twist according to the present invention and time twist according to WO 2015/067987 A1 is particularly advantageous in asymmetrical radio communications systems, such as mobile radio communications systems, for example based on LTE and/or WiMAX. In fact, in such a scenario, frequency twist according to the present invention can be advantageously applied to the Forward channel from a Base Station to a mobile device, while time twist according to WO 2015/067987 A1 can be advantageously applied to the Return channel from a mobile device to a Base Station.

In conclusion, it is clear that numerous modifications and variants can be made to the present invention, all falling within the scope of the invention, as defined in the appended claims.

The invention claimed is:

1. A radio communications method comprising carrying out, by a transmitter, the following steps:
   a) generating a digital time signal, that is time-limited, carrying a limited sequence of digital symbols to be transmitted and resulting from an approximation of the Hilbert transform in frequency domain, which approximation is based on
      a frequency main mode, that is associated with an orbital angular momentum mode with topological charge equal to zero, and that includes main mode frequency samples carrying respective digital symbols of said limited sequence via said orbital angular momentum mode with topological charge equal to zero, and
      one or more frequency twisted modes carrying the other digital symbols of said limited sequence, wherein each frequency twisted mode is associated with a corresponding orbital angular momentum mode with a respective topological charge different than zero, and includes respective twisted mode frequency samples carrying one or more respective digital symbols of said limited sequence via said corresponding orbital angular momentum mode with said respective topological charge different than zero; and
   b) transmitting a radio frequency signal carrying the digital time signal generated; the method further comprising carrying out, by a receiver, the following steps:
   c) receiving the radio frequency signal transmitted by the transmitter;
   d) processing the received radio frequency signal so as to obtain a corresponding incoming digital signal; and
   e) extracting, from the incoming digital signal, the digital symbols carried by said incoming digital signal.

2. The method of claim 1, wherein, for each frequency twisted mode, the respective twisted mode frequency samples are mutually phase-shifted on the basis of phase shifts related to the corresponding orbital angular momentum mode with the respective topological charge different than zero.

3. The method according to claim 1, wherein the main mode frequency samples are at main mode frequencies spaced apart by a predetermined frequency spacing;
   and wherein the respective twisted mode frequency samples of each frequency twisted mode are at respective twisted mode frequencies that are:
   related to said frequency twisted mode;
   spaced apart by said predetermined frequency spacing; and
   different from the main mode frequencies.

4. The method of claim 3, wherein the one or more frequency twisted modes comprise 2N frequency twisted modes, each identified by a respective topological-charge-related index n, that is an integer comprised between −N and +N and different than zero, N being an integer higher than zero;
   wherein the limited sequence of digital symbols to be transmitted comprises $S_{TOT}$ digital symbols, $S_{TOT}$ being equal to $2^{N+2}-1$;
   wherein the frequency main mode carries $M_{MFS}$ of said $S_{TOT}$ digital symbols by means of $M_{MFS}$ main mode frequency samples at corresponding main mode frequencies, that are spaced apart by said predetermined frequency spacing and that range from $B_s$ to $M_{MFS}$ times $B_s$, $B_s$ denoting said predetermined frequency spacing and $M_{MFS}$ being equal to $2^{N+1}+1$;
   wherein said 2N frequency twisted modes carry the $S_{TOT}-M_{MFS}$ digital symbols not carried by the frequency main mode;
   and wherein each frequency twisted mode n carries $2^{N-|n|}$ respective digital symbol(s) by means of $2^{N+1}$ respective twisted mode frequency samples at corresponding twisted mode frequencies, that are spaced apart by said predetermined frequency spacing and that are located, in frequency domain, at $$B_s\left(\frac{2^{|n|}-1}{2^{|n|}}+k\right)$$

where k denotes an integer ranging from zero to $2^{N+1}-1$, or from one to $2^{N+1}$.

5. The method of claim 4, wherein each of said $S_{TOT}$ digital symbols to be transmitted is represented by a respective symbol complex value;

and wherein, for each frequency twisted mode n, the $2^{N+1}$ respective twisted mode frequency samples comprise, for each of the $2^{N-|n|}$ respective digital symbol(s), $2^{|n|+1}$ frequency samples, that:

carry said digital symbol;

are at frequencies that are located, in frequency domain, at $$B_s\left[\frac{2^{|n|}-1}{2^{|n|}}+(k^*+i\cdot 2^{|n|+1})\right]$$

where k* denotes an integer ranging from zero to $2^{|n|+1}-1$, or from one to $2^{|n|+1}$, and where i is an index that identifies said digital symbol and is comprised between zero and $2^{N-|n|}-1$; and have, each, a respective complex value obtained by multiplying the symbol complex value representing said digital symbol by a respective complex factor related to said frequency twisted mode n and to the frequency of said frequency sample.

6. The method of claim 5, wherein, for each frequency twisted mode n and for each of the $2^{N-|n|}$ respective digital symbol(s), the $2^{|n|+1}$ respective frequency samples carrying said digital symbol have, each, a respective complex value obtained by multiplying the symbol complex value representing said digital symbol by a respective complex factor which:

if n is higher than zero, is equal to $$\frac{e^{+jk^*\frac{\pi}{2^{|n|}}}}{2^{\frac{|n|+1}{2}}}$$

or, if n is lower than zero, is equal to $$\frac{e^{-jk^*\frac{\pi}{2^{|n|}}}}{2^{\frac{|n|+1}{2}}}$$

where j denotes the imaginary unit.

7. The method according to claim 4, wherein said step a) includes generating the digital time signal by using a predefined transmission matrix that relates the $S_{TOT}$ digital symbols to be transmitted to time samples of the digital time signal through coefficients related to a transform from frequency domain to time domain of the main mode frequency samples and the twisted mode frequency samples;

and wherein said step e) includes extracting the digital symbols carried by the incoming digital signal by using a reception matrix derived from the predefined transmission matrix.

8. The method of claim 7, wherein the predefined transmission matrix is such that the matrix resulting from the multiplication of the transpose of said predefined transmission matrix and said predefined transmission matrix has a determinant different from zero; and wherein the reception matrix is derived from the predefined transmission matrix through a pseudo-inverse technique.

9. The method of claim 8, wherein the reception matrix is computed on the basis of the following formula:

[[GFFT]]=([[GIFFT]]$^T$[[GIFFT]])$^{-1}$[[GIFFT]]$^T$, where [[GFFT]] denotes the reception matrix, [[GIFFT]] denotes the predefined transmission matrix, [[GIFFT]]$^T$ denotes the transpose of the predefined transmission matrix, and ([[GIFFT]]$^T$[[GIFFT]])$^{-1}$ denotes the operation of inversion the matrix resulting from the multiplication of the transpose of the predefined transmission matrix and the predefined transmission matrix.

10. The method according to claim 7, wherein the digital time signal comprises a number of time samples equal to $$\left[1+\frac{N(N+1)}{2}\right]2^{N+1}+1$$

and wherein the predefined transmission matrix comprises $M_{TS}\times S_{TOT}$ coefficients, $M_{TS}$ denoting said number of time samples of the digital time signal.

11. The method according to claim 1, wherein the main mode frequency samples are frequency samples of Orthogonal Frequency-Division Multiplexing (OFDM) type, or of Orthogonal Frequency-Division Multiple Access (OFDMA) type.

12. The method according to claim 1, wherein said step a) includes generating a digital time signal that includes a cyclic prefix followed by a time signal portion; wherein said time signal portion results from the approximation of the Hilbert transform in frequency domain based on the frequency main and twisted modes; and wherein the cyclic prefix is a replica of an end portion of said time signal portion.

13. The method of claim 12, wherein said step e) includes:

e1) performing synchronization operations on the basis of the incoming digital signal; and e2) extracting, on the basis of the synchronization operations performed, the digital symbols carried by the incoming digital signal;

and wherein said step e1) includes performing a symbol timing synchronization based on the presence of the cyclic prefix in the incoming digital signal.

14. The method according to claim 12, wherein said step e) includes:

e1) performing synchronization operations on the basis of the incoming digital signal; and e2) extracting, on the basis of the synchronization operations performed, the digital symbols carried by the incoming digital signal;

and wherein said step e1) includes performing a carrier frequency synchronization by carrying out a carrier frequency offset estimation based on the presence of the cyclic prefix in the incoming digital signal.

15. The method according to claim 1, wherein said step e) includes:

e1) performing synchronization operations on the basis of the incoming digital signal; and e2) extracting, on the basis of the synchronization operations performed, the digital symbols carried by the incoming digital signal.

16. The method of claim 15, wherein said step e1) includes performing a carrier frequency synchronization by carrying out a carrier frequency offset estimation based on training symbols transmitted by the transmitter and/or pilot frequencies used by the transmitter.

17. The method according to claim 15, wherein said step e1) includes performing a carrier frequency synchronization by carrying out a carrier frequency offset estimation based on the presence of the frequency main and twisted modes in the incoming digital signal.

18. The method according to claim 15, wherein said step e1) includes performing a carrier frequency synchronization by carrying out:

a carrier frequency offset integer part estimation in frequency domain;

a carrier frequency offset coarse decimal part estimation in time domain; and a carrier frequency offset fine decimal part estimation in frequency domain.

19. The method according to claim 15, wherein said step e1) includes performing a sampling clock synchronization by carrying out a sampling clock offset estimation.

20. The method of claim 19, wherein the sampling clock offset estimation includes a sampling clock phase offset estimation and a sampling clock frequency offset estimation.

21. A radio communications system comprising a transmitter and a receiver; wherein the transmitter is designed to carry out the steps a) and b), and the receiver is designed to carry out the steps c), d) and e), of the radio communications method claimed in claim 1.

22. A device or system for radio communications designed to carry out the steps a) and b) of the radio communications method claimed in claim 1.

23. A non-transitory tangible computer product comprising software code portions which are:

executable by a processor of a device or system for radio communications; and such that to cause, when executed, said device or system to become configured to carry out the steps a) and b), of the radio communications method claimed in claim 1.

24. A device or system for radio communications configured to:

radio communicate with another device or system configured to carry out the steps a) and b); and carry out the steps c), d) and e), of the radio communications method claimed in claim 1.

25. A non-transitory tangible computer product comprising software code portions which are:

executable by a processor of a first device or system configured to radio communicate with a second device or system designed to carry out the steps a) and b); and such that to cause, when executed, said first device or system to become configured to carry out the steps c), d) and e), of the radio communications method claimed in claim 1.

* * * * *